US008593445B2

(12) United States Patent
Yamamoto et al.

(10) Patent No.: US 8,593,445 B2
(45) Date of Patent: Nov. 26, 2013

(54) DISPLAY APPARATUS, DRIVING METHODS AND ELECTRONIC INSTRUMENTS

(75) Inventors: Tetsuro Yamamoto, Kanagawa (JP); Katsuhide Uchino, Kanagawa (JP); Naobumi Toyomura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1107 days.

(21) Appl. No.: 12/433,014

(22) Filed: Apr. 30, 2009

(65) Prior Publication Data

US 2009/0295785 A1 Dec. 3, 2009

(30) Foreign Application Priority Data

Jun. 2, 2008 (JP) ................................ 2008-144359

(51) Int. Cl.
*G06F 3/038* (2013.01)

(52) U.S. Cl.
USPC ................ 345/211; 345/55; 345/76; 345/77; 345/78; 345/79; 345/80; 345/81; 345/82; 345/83; 345/84; 345/204; 345/205; 345/206; 345/207; 345/208; 345/209; 345/210; 345/212; 345/213; 345/214; 345/215

(58) Field of Classification Search
USPC ................................ 345/76–84, 55, 204–215
See application file for complete search history.

(56) References Cited

U.S. PATENT DOCUMENTS

2003/0103022 A1 6/2003 Noguchi et al.
2004/0256617 A1 12/2004 Yamada et al.
2005/0206590 A1 9/2005 Sasaki et al.
2006/0176250 A1 8/2006 Nathan et al.
2006/0208975 A1 9/2006 Ono
2007/0247398 A1 10/2007 Nathan et al.
2008/0111774 A1 5/2008 Lida et al.
2009/0122047 A1 * 5/2009 Yamamoto et al. ........... 345/211
2009/0278834 A1 * 11/2009 Tomida et al. ................ 345/211

FOREIGN PATENT DOCUMENTS

EP 1 860 637 A2 11/2007
JP 2003-255856 9/2003
JP 2003-255897 9/2003
JP 2003-271095 9/2003
JP 2004-029791 1/2004
JP 2004-093682 3/2004
JP 2004-133240 4/2004
JP 2006-251322 9/2006
JP 2007-310311 11/2007
JP 2008-287139 11/2008
JP 2009-139928 6/2009
JP 2009-168969 7/2009
WO WO 2006-005033 1/2006
WO WO 2007-118332 10/2007

* cited by examiner

*Primary Examiner* — Alexander S Beck
*Assistant Examiner* — Amen Bogale
(74) *Attorney, Agent, or Firm* — Rader, Fishman & Grauer PLLC

(57) ABSTRACT

A display apparatus employs a pixel array section including pixel circuits forming a matrix, signal lines as columns, scan lines as rows and power-supply lines, and driving sections. The driving sections are a signal selector, a write scanner and a drive scanner. The signal selector provides an electric potential representing a gradation or a predetermined reference electric potential. The write scanner provides a control signal. The drive scanner provides a power-supply voltage changing the electric potential from high to low. The drive scanner drives adjacent power-supply lines as a group. The number of lines as a group is determined in advance. The drive scanner switches a power-supply voltage from high to low and vice versa, and applies the voltage to groups by shifting the phase from group to group. The voltage is supplied to a group at the same phase and switched the electric potential.

15 Claims, 37 Drawing Sheets

(1)

(2), (3)

(4)

(5)

(5a)

(6)

DISPLAY APPARATUS, DRIVING METHODS AND ELECTRONIC INSTRUMENTS

BACKGROUND OF THE INVENTION

1. Field of the Invention

The present invention relates to an active-matrix display apparatus employing pixel circuits each including a light emitting device and relates to a driving method provided for the display apparatus. In addition, the present invention also relates to electronic instruments each including the active-matrix display apparatus as the display unit thereof.

2. Description of the Related Art

In recent years, planar display apparatus of a self-light-emission type are developed intensively as well as extensively as display apparatus each employing organic EL (Electro Luminance) devices which each serve as a light emitting device. The organic EL light emitting device is a device taking advantage of a phenomenon in which light is emitted when an electric field is applied to an organic thin film employed in the device. Since the organic EL light emitting device can be driven to operate by applying a voltage not higher than 10 V, the organic EL light emitting device consumes little power. In addition, since the organic EL light emitting device is a device of a self-light emission type capable of emitting light by itself, the display apparatus employing the organic EL light emitting devices does not require an illumination member. Thus, the display apparatus employing the organic EL light emitting devices can be made light and thin with ease. On top of that, since the organic EL light emitting device is a very fast device having a response time of about several microseconds, the display apparatus employing the organic EL light emitting devices does not generate a residual image.

Planar display apparatus, which each employ pixel circuits each including an organic EL light emitting device and serve as a display apparatus of the self-light-emission type, include among others an active-matrix display apparatus employing pixel circuits each having thin-film transistors integrated therein to serve as an active device. In recent years, such active-matrix display apparatus are developed intensively as well as extensively. Active-matrix planar display apparatus of the self-light-emission type are described in documents as follows: Japanese Patent Laid-open Nos. 2003-255856, 2003-271095, 2004-133240, 2004-029791, 2004-093682, 2006-251322, and 2007-310311.

FIG. 29 is a model circuit diagram showing a typical example of the existing display apparatus of the active-matrix type. The display apparatus is configured to include a pixel array section 1 and driving sections surrounding the pixel array section 1. The driving sections are a horizontal selector 3 also referred to hereafter as a signal selector and a write scanner 4. The pixel array section 1 resembling a matrix of pixel circuits 2 has signal lines SL each laid as one of the columns of the matrix and scan lines WS each laid as one of the rows of the matrix. Each of the pixel circuits 2 is located at an intersection of one of the signal lines SL and one of the scan lines WS. In order to make the following explanation easy to understand, the diagram of FIG. 29 shows only one pixel circuit 2 at one intersection. The write scanner 4 has a shift register. The write scanner 4 operates in accordance with a clock signal ck received from an external source. The write scanner 4 also receives start pulses sp supplied by an external source sequentially. Receiving the clock signal ck and such start pulses sp, the write scanner 4 asserts control signals sequentially on the scan lines WS. The horizontal selector 3 asserts a video signal on the signal line SL with a timing adjusted to the row-after-row sequential scan operation carried out by the write scanner 4.

The pixel circuit 2 employs a signal sampling transistor T1, a device driving transistor T2, a signal holding capacitor C1 and a light emitting device EL. The device driving transistor T2 is a transistor of the P-channel type. A specific one of the two current terminals of the device driving transistor T2 serves as the source electrode of the device driving transistor T2. The specific current terminal serving as the source electrode is connected to a power-supply line. The other one of the two current terminals of the device driving transistor T2 serves as the drain electrode of the device driving transistor T2. The other current terminal serving as the drain electrode is connected to the anode electrode of the light emitting device EL. The gate electrode of the device driving transistor T2 is used as the control electrode of the device driving transistor T2. The gate electrode of the device driving transistor T2 is connected to the signal line SL through the signal sampling transistor T1. A control signal asserted on the scan line WS puts the signal sampling transistor T1 in a turned-on state. The signal sampling transistor T1 put in a turned-on state samples a video signal asserted by the horizontal selector 3 on the signal line SL and stores the video signal in the signal holding capacitor C1. The video signal stored in the signal holding capacitor C1 is applied to the gate electrode of the device driving transistor T2 as a gate-source voltage Vgs which drives the device driving transistor T2 to output a drain-source current Ids to the light emitting device EL. Thus, the light emitting device EL emits light having a luminance according to the video signal. The gate-source voltage Vgs represents an electric potential appearing on the gate electrode of the device driving transistor T2 as an electric potential taking an electric potential appearing on the source electrode of the device driving transistor T2 as a reference. On the other hand, the drain-source current Ids is a current flowing between the drain and source electrodes of the device driving transistor T2.

The device driving transistor T2 operates in a saturated region. The relation between the gate-source voltage Vgs and the drain-source current Ids is expressed by Eq. (1) given as follows:

$$Ids=(1/2)\mu(W/L)Cox(Vgs-Vth)^2 \quad (1)$$

In the above equation, reference notation μ denotes the mobility of the device driving transistor T2 whereas reference notation W denotes the width of the channel of the device driving transistor T2. Reference notation L denotes the length of the channel of the device driving transistor T2 whereas reference notation Cox denotes the gate insulation film capacitance per unit area of the device driving transistor T2. Reference notation Vth denotes the threshold voltage of the device driving transistor T2. As is obvious from the characteristic expressed by Eq. (1), when the device driving transistor T2 is operating in a saturated region, the device driving transistor T2 functions as a constant-current source supplying a drain-source current Ids according to the gate-source voltage Vgs to the light emitting device EL.

FIG. 30 is a diagram showing graphs each representing a relation between a voltage applied to the light emitting device EL and a driving current flowing through the light emitting device EL. That is to say, FIG. 30 is a diagram showing graphs each representing a voltage-to-current characteristic of the light emitting device EL. As is obvious from the above description, the driving current flowing through the light emitting device EL is the drain-source current Ids generated by the device driving transistor T2. The voltage applied to the light emitting device EL is a voltage V appearing on the anode electrode of the light emitting device EL. The horizontal axis represents the voltage V appearing on the anode electrode of the light emitting device EL whereas the vertical axis represents the drain-source current Ids which is also referred to hereafter as the driving current cited above. The voltage V appearing on the anode electrode of the light emitting device EL is the voltage appearing on the drain electrode of the device driving transistor T2. The voltage-to-current characteristic of the light emitting device EL changes with the lapse of time as indicated by a change from the solid-line curve to the dashed-line curve. To be more specific, as time lapses, the voltage-to-current characteristic of the light emitting device EL tends to be shifted to the right. Thus, even if the driving current Ids is held at a constant magnitude, the anode-electrode voltage V (or the drain voltage V) changes with the lapse of time. To be more specific, even if the driving current Ids is held at a constant magnitude, the anode-electrode voltage V (or the drain voltage V) increases. Fortunately, however, the device driving transistor T2 employed in the pixel circuit 2 shown in the diagram of FIG. 29 is operating in a saturated region to generate a drain-source current Ids dependent on the gate-source voltage Vgs without regard to changes in drain voltage V. Thus, the luminance of light generated by the light emitting device EL can be sustained at a fixed value independently of the changes of the voltage-to-current characteristic of the light emitting device EL with the lapse of time.

FIG. 31 is another model circuit diagram showing a typical example of the existing display apparatus of the active-matrix type. The pixel circuit 2 shown in the diagram of FIG. 31 is different from the pixel circuit 2 shown in the diagram of FIG. 29 in that, in the case of the pixel circuit 2 shown in the diagram of FIG. 31, the device driving transistor T2 is a transistor of the N-channel type in place of a transistor of the P-channel type as is the case with the pixel circuit shown in the diagram of FIG. 29. By employing transistors of the N-channel type as both the signal sampling transistor T1 and the device driving transistor T2, the process of manufacturing the pixel circuit 2 becomes easier to carry out in many cases.

SUMMARY OF THE INVENTION

The device driving transistor T2 employed in each of the pixel circuits 2 shown in the diagrams of FIGS. 29 and 31 operates in a saturated region, controlling the magnitude of the drain-source current Ids supplied to the light emitting device EL to serve as a driving current. However, the threshold voltage Vth of the thin-film transistor serving as the device driving transistor T2 varies from transistor to transistor. As is obvious from Eq. (1) expressing the characteristic of the device driving transistor T2, if the threshold voltage Vth of the device driving transistor T2 varies from transistor to transistor, the drain-source current Ids generated by the device driving transistor T2 also varies from transistor to transistor. Thus, the uniformity of the display screen is lost. For this reason, in the past, there has been proposed a configuration employing pixel circuits 2 each including a built-in threshold-voltage compensation function for compensating the drain-source current Ids generated by the device driving transistor T2 employed in the pixel circuit 2 for variations of the threshold voltage Vth of the device driving transistor T2 from transistor to transistor. Basically, each of the pixel circuits 2 shown in the diagrams of FIGS. 29 and 31 has a configuration employing two transistors (i.e., the signal sampling transistor T1 and the device driving transistor T2), a capacitor (that is, the signal holding capacitor C1) and a light emitting device (that is, the light emitting device EL). If the threshold-voltage compensation function is to be built in such a relatively simple configuration as described above, it is necessary to assert an electric potential on each of the signal lines SL and an electric potential on each of the power-supply lines DS in scan operations each carried out with a timing adjusted to one of the row-after-row sequential scan operations carried out by the write scanner 4 on the scan lines WS. As a result, the sequence of operations becomes complicated.

In a conventional pixel circuit 2 disclosed in Japanese Patent Laid-Open No. 2007-310311, prior to a process of storing a video signal into the pixel circuit 2, a sequence of complex operations are carried out in order to compensate the drain-source current Ids generated by the device driving transistor T2 for variations of the threshold voltage Vth of the device driving transistor T2. Since the sequence of such compensation operations is complicated, however, it is quite within the bounds of possibility that any of the compensation operations are carried out incorrectly. Thus, the drain-source current Ids generated by the device driving transistor T2 cannot be necessarily compensated for variations of the threshold voltage Vth of the device driving transistor T2 in some cases. If the threshold-voltage compensation function becomes instable due to the sequence of complex compensation operations, the uniformity of the display screen is negatively affected, raising a problem which needs to be solved.

Addressing the problems described above, inventors of the embodiments of the present invention have innovated a display apparatus that is capable of carrying out a threshold-voltage compensation process with a high degree of reliability and a high degree of stability on every pixel circuit. The inventors of the embodiments of the present invention have also innovated a driving method for the display apparatus. In order to implement the display apparatus and the driving method, the following means is provided.

The display apparatus according to an embodiment of the present invention employs a pixel array section and driving sections. The pixel array section resembling a matrix of pixel circuits has signal lines each laid as one of the columns of the matrix and scan lines each laid as one of the rows of the matrix in addition to the pixel circuits themselves. Each of the pixel circuits is located at an intersection of one of the signal lines and one of the scan lines. In addition, the pixel array section also includes power-supply lines parallel to the scan lines.

The driving sections are a signal selector, a write scanner and a drive scanner. The signal selector is a section configured to assert a driving signal having an electric potential representing a gradation or a reference electric potential determined in advance on the signal lines each laid as a column of the pixel matrix. The write scanner is a section configured to assert a control signal on the scan lines each laid as a row of the pixel matrix. The drive scanner is a section configured to assert a power-supply voltage changing from a high electric potential to a low electric potential alternately on the power-supply lines.

Each of the pixel circuits includes a signal sampling transistor, a device driving transistor, a signal holding capacitor and a light emitting device. A specific one of current terminals of the signal sampling transistor is connected to one of the signal lines whereas the gate electrode of the signal sampling transistor is used as the control terminal of the signal sampling transistor and is connected to one of the scan lines. A specific one of current terminals of the device driving transistor serves as the drain electrode of the device driving transistor whereas the gate electrode of the device driving transistor is used as the control terminal of the device driving transistor. The drain electrode of the device driving transistor is connected to one of the power-supply lines whereas the gate terminal of the device driving transistor is connected to the other current terminal of the signal sampling transistor. The other one of the current terminals of the device driving transistor serves as the source electrode of the device driving transistor. The source electrode of the device driving transistor is connected to the light emitting device. The signal holding capacitor is wired between the gate and source electrodes of the device driving transistor.

First of all, if an operation to put the signal sampling transistor in a turned-on state by making use of the control signal is carried out after the high electric potential has been asserted on the power-supply line and the reference electric potential has been asserted on the signal line, a light extinction process is performed. The light extinction process is a process to switch the light emitting device from a light emission state to a no-light emission state.

Thereafter, the signal sampling transistor is put in a turned-off state and, then, the power-supply line is switched from the high electric potential to the low electric potential. Thus, the voltage appearing on the source electrode of the device driving transistor is lowered without putting back the signal sampling transistor in a turned-on state. The process of lowering the voltage appearing on the source electrode of the device driving transistor is referred to as a threshold-voltage compensation preparatory process.

Subsequently, the power-supply line is switched back from the low electric potential back to the high electric potential. Then, with the signal line sustained at the reference electric potential, the signal sampling transistor is put in a turned-on state by making use of the control signal, causing the voltage appearing on the source electrode of the device driving transistor to rise gradually in a process of electrically charging the signal holding capacitor. Thus, the voltage appearing between the gate and source electrodes of the device driving transistor is reduced gradually in a direction toward the threshold voltage of the device driving transistor. The process to reduce the voltage appearing between the gate and source electrodes of the device driving transistor in a direction toward the threshold voltage of the device driving transistor is referred to as a threshold-voltage compensation process.

It is desirable to provide a configuration in which the drive scanner drives adjacent power-supply lines each laid as one of the rows of the matrix as a power-supply line group. The number of adjacent power-supply lines to be driven by the drive scanner as a power-supply line group is determined in advance. In this configuration, the drive scanner switches a power-supply voltage common to adjacent power-supply lines pertaining to the same power-supply line group from the high electric potential to the low electric potential and vice versa alternately, and sequentially applies the common power-supply voltage to power-supply line groups by shifting the phase of the power-supply voltage from group to group. In this way, the common power-supply voltage is supplied to a power-supply line group at the same phase determined for the power-supply line group and switched from the high electric potential to the low electric potential and vice versa alternately.

In an embodiment of the display apparatus, after the light extinction process has been carried out to switch the light emitting device from a light emission state to a no-light emission state, with the power-supply line sustained at the high electric potential and the signal line sustained at the reference electric potential, the signal sampling transistor is put in a turned-on state at least once by making use of the control signal supplied to the gate electrode of the signal sampling transistor through the scan line in order to again execute at least another additional light extinction process.

In addition, it is possible to provide the embodiment with a configuration in which the write scanner supplies a control signal to each of the scan lines sequentially for every horizontal period and the signal sampling transistor carries out the light extinction process and the additional light extinction processes in accordance with the control signals received at intervals each having a length at least equal to one aforementioned horizontal period.

On top of that, it is possible to provide the embodiment with another configuration in which adjacent scan lines each laid as one of the rows of the matrix are treated as a scan line group and the number of adjacent scan lines to be treated as a scan line group is determined in advance. In this case, the write scanner provides each of the scan line groups sequentially with a control signal common to adjacent scan lines pertaining to the same scan line group by shifting the phase of the control signal from group to group. Thus, a control signal is supplied to adjacent scan lines pertaining to the same scan line group at the same phase determined for the scan line group in order to carry out the additional light extinction processes with timings common to the adjacent scan lines pertaining to the scan line group.

In another embodiment of the display apparatus, after the execution of the light extinction process to switch the light emitting device from a light emission state to a no-light emission state has been completed but before said threshold-voltage compensation preparatory process is carried out, the drive scanner switches the power-supply line from the high electric potential to a middle electric potential between the high and low electric potentials.

In addition, it is possible to provide the other embodiment with a configuration in which the drive scanner sequentially switches each of the power-supply line groups from the high electric potential to the middle electric potential by shifting the phase of a switching signal from group to group. In this case, the drive scanner sequentially switches each of adjacent power-supply lines pertaining to the same power-supply line group from the high electric potential to the middle electric potential at the same phase of a switching signal.

On top of that, it is possible to provide the other embodiment with another configuration in which, with the power-supply line sustained at the middle electric potential and the signal line sustained at the reference electric potential, the signal sampling transistor is put in a turned-on state by making use of the control signal supplied to the gate electrode of the signal sampling transistor through the scan line.

Moreover, it is possible to provide the other embodiment with a further configuration in which adjacent power-supply lines each laid as one of the rows of the matrix are treated as a power-supply line group and the number of adjacent power-supply lines to be treated as a power-supply line group is determined in advance. In this case, the drive scanner provides each of the power-supply line groups sequentially with a power-supply voltage common to adjacent power-supply lines pertaining to the same power-supply line group by shifting the phase of the power-supply voltage from group to group in order to drive the power-supply lines pertaining to the same power-supply line group. Thus, a power-supply voltage is supplied to adjacent power-supply lines pertaining to the same power-supply line group at the same phase determined for the group so as to drive the power-supply lines pertaining to the power-supply line group.

In a further embodiment of the display apparatus, the signal selector asserts a first reference electric potential on the signal line in the light extinction process and asserts a second reference electric potential different from the first reference electric potential on the signal line in the threshold-voltage compensation process.

In addition, it is possible to provide the further embodiment with a configuration in which the magnitude of the first reference electric potential asserted on the signal line by the signal selector is larger than the magnitude of the second reference electric potential but smaller than the sum of an electric potential appearing on the cathode electrode of the light emitting device, the threshold voltage of the light emitting device and the threshold voltage of the device driving transistor.

On top of that, it is possible to provide the further embodiment with another configuration in which, after the threshold-voltage compensation process has been carried out, with the signal line sustained at a video-signal electric potential and the power-supply line sustained at the high electric potential, the signal sampling transistor is put in a turned-on state by making use of the control signal supplied to the gate electrode of the signal sampling transistor through the scan line in order to perform a signal write process of storing the video-signal electric potential into the signal holding capacitor.

Moreover, it is possible to provide the further embodiment with a further configuration in which the signal selector asserts a first video-signal electric potential representing a gradation on the signal line, and the signal sampling transistor is put in a turned-on state by making use of the control signal supplied to the gate electrode of the signal sampling transistor through the scan line in order to perform a first signal write process of storing the first video-signal electric potential into the signal holding capacitor. Subsequently, the signal selector asserts a second video-signal electric potential representing a gradation on the signal line, and the signal sampling transistor is put in a turned-on state by making use of another control signal supplied to the gate electrode of the signal sampling transistor through the scan line in order to perform a second signal write process of storing the second video-signal electric potential into the signal holding capacitor.

In accordance with the embodiments of the present invention, when the high electric potential has been asserted on the power-supply line and the reference electric potential has been asserted on the signal line, a light extinction process of switching the light emitting device from a light emission state to a no-light emission state is performed.

Thereafter, the signal sampling transistor is put in a turned-off state and, then, the power-supply line is switched from the high electric potential to the low electric potential. Thus, the voltage appearing on the source electrode of the device driving transistor is lowered in the so-called threshold-voltage compensation preparatory process in order to set a voltage appearing between the gate and source electrodes of the device driving transistor without putting back the signal sampling transistor in a turned-on state.

Subsequently, the power-supply line is switched back from the low electric potential back to the high electric potential. Then, with the signal line sustained at the reference electric potential, the signal sampling transistor is put in a turned-on state so that the voltage appearing on the gate electrode of the device driving transistor is abruptly raised to the reference electric potential, causing the voltage appearing on the source electrode of the device driving transistor to rise gradually in a process of electrically charging the signal holding capacitor. Thus, the voltage appearing between the gate and source electrodes of the device driving transistor is reduced gradually in a direction toward the threshold voltage of the device driving transistor in the so-called threshold-voltage compensation process.

As described above, by carrying out the light extinction process, the threshold-voltage compensation preparatory process and the threshold-voltage compensation process sequentially one process after another, incorrect operations can be avoided so that it is possible to carry out a threshold-voltage compensation process of the device driving transistor with a high degree of reliability and a high degree of stability in every pixel circuit. In particular, in the threshold-voltage compensation preparatory process, the voltage appearing on the source electrode of the device driving transistor is lowered without putting back the signal sampling transistor in a turned-on state. Thus, incorrect operations can be avoided so that it is possible to carry out a threshold-voltage compensation process of the device driving transistor with a high degree of stability in every pixel circuit.

DETAILED DESCRIPTION OF THE PREFERRED EMBODIMENTS

Figure 1:
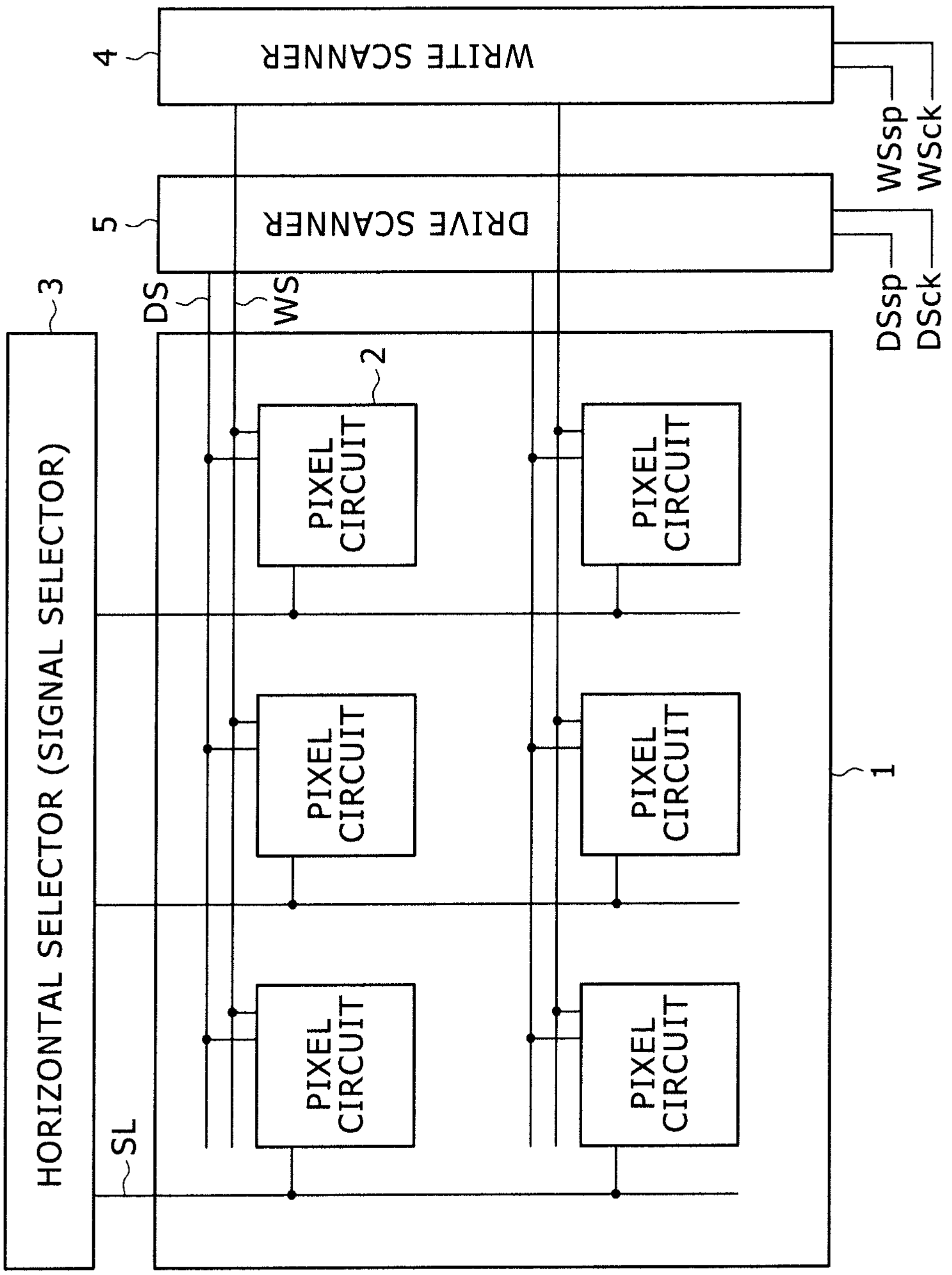
FIG. 1 is a block diagram showing the entire configuration of a display apparatus according to a first embodiment of the present invention.

Preferred embodiments of the present invention are described in detail by referring to diagrams as follows. FIG. 1 is a block diagram showing the entire configuration of a display apparatus according to a first embodiment of the present invention. As shown in the block diagram of FIG. 1, the display apparatus employs a pixel array section 1 and driving sections 3, 4 and 5 used for driving the pixel array section 1. The pixel array section 1 resembling a matrix of pixel circuits 2 has signal lines SL each laid as one of the columns of the matrix and scan lines WS each laid as one of the rows of the matrix and power-supply lines DS parallel to the scan lines WS in addition to the pixel circuits 2 themselves. Each of the pixel circuits 2 is located at an intersection of one of the signal lines SL and one of the scan lines WS. The driving section 4 is a control scanner also referred to as a write scanner for carrying out a row-after-row sequential scan operation on the pixel circuits 2 in row units by sequentially asserting a control signal on the scan lines WS. The driving section 5 is a power-supply scanner also referred to as a drive scanner for carrying out a row-after-row sequential scan operation adjusted to the row-after-row sequential scan operation of the write scanner 4 on the pixel circuits 2 in row units by sequentially asserting a power-supply voltage on the power-supply lines DS. The drive scanner 5 switches the power-supply voltage from a high electric potential Vcc to a low electric potential Vss and vice versa. The driving section 3 is a signal selector also referred to as a horizontal selector for carrying out a column-after-column sequential scan operation adjusted to the row-after-row sequential scan operations on the pixel circuits 2 in column units by sequentially asserting an input signal on the signal lines SL. The horizontal selector 3 switches the signal from an electric potential Vsig representing a video signal (or a gradation) to a reference electric potential Vofs and vice versa. It is to be noted that the write scanner 4 operates in accordance with a clock signal WSck received from an external source. The write scanner 4 also receives start pulses WSsp supplied by an external source sequentially. Receiving the clock signal WSck and such start pulses WSsp, the write scanner 4 asserts the control signal sequentially on the scan lines WS. By the same token, the drive scanner 5 operates in accordance with a clock signal DSck received from an external source. The drive scanner 5 also receives start pulses DSsp supplied by an external source sequentially. Receiving the clock signal DSck and such start pulses DSsp, the drive scanner 5 switches the power-supply voltage to be asserted sequentially on the power-supply lines DS.

Figure 2:
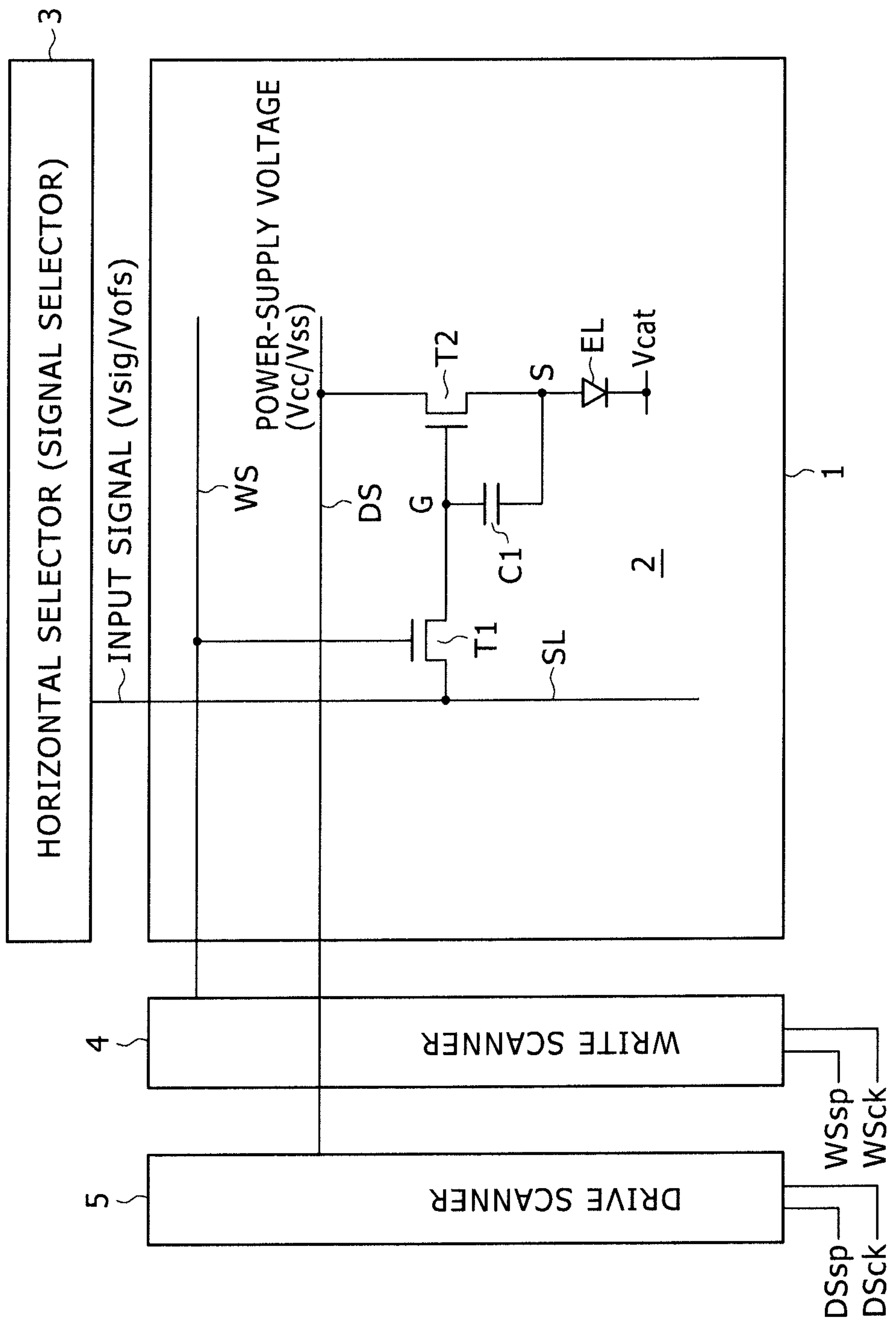
FIG. 2 is a circuit diagram showing the concrete configuration of a pixel circuit employed in the display apparatus according to the first embodiment.

FIG. 2 is a circuit diagram showing the concrete configuration of the pixel circuit 2 employed in the display apparatus shown in the block diagram of FIG. 1. As shown in the circuit diagram of FIG. 2, the pixel circuit 2 has a configuration including a light emitting device EL of a two-terminal type also referred to as a diode type, a signal sampling transistor T1 of the N-channel type, a device driving transistor T2 also of the N-channel type and a signal holding capacitor C1 of a thin-film type. A typical example of the light emitting device EL employed in the pixel circuit 2 is an organic EL (electroluminescence) light emitting device. The gate electrode of the signal sampling transistor T1 is used as a control terminal whereas the two current terminals of the signal sampling transistor T1 serve as the source and drain electrodes respectively. The gate electrode of the signal sampling transistor T1 is connected to the scan line WS. A specific one of the two current terminals of the signal sampling transistor T1 is connected to the signal line SL whereas the other current terminal of the signal sampling transistor T1 is connected to the gate electrode G of the device driving transistor T2.

Much like the signal sampling transistor T1, the gate electrode G of the device driving transistor T2 also serves as a control terminal whereas the two current terminals of the device driving transistor T2 serve as the source and drain electrodes respectively. A specific one of the two current terminals of the device driving transistor T2 is connected to the light emitting device EL whereas the other current terminal of the device driving transistor T2 is connected to the power-supply line DS. To put it more concretely, in the embodiments of the present invention, the device driving transistor T2 is a transistor of the N-channel type. The drain electrode of the device driving transistor T2 is connected to the power-supply line DS whereas the source electrode S of the device driving transistor T2 is connected to the anode electrode of the light emitting device EL. The cathode electrode of the light emitting device EL is fixed at a constant cathode electric potential Vcat. The signal holding capacitor C1 is connected between the source electrode S of the device driving transistor T2 and the gate electrode G of the device driving transistor T2. In the configuration described above, the control scanner 4 also referred to as the write scanner 4 carries out a row-after-row sequential scan operation on the pixel circuits 2 in row units by sequentially asserting a control signal on the scan lines WS. The write scanner 4 switches the control signal from a high electric potential (or the pulse top) to a low electric potential (or the pulse bottom) and vice versa. The power-supply scanner 5 also referred to as the drive scanner 5 carries out a row-after-row sequential scan operation adjusted to the row-after-row sequential scan operation of the write scanner 4 on the pixel circuits 2 in row units by sequentially asserting a power-supply voltage on the power-supply lines DS. The drive scanner 5 switches the power-supply voltage from a high electric potential Vcc to a low electric potential Vss and vice versa. The signal selector 3 also referred to as the horizontal selector 3 carries out a column-after-column sequential scan operation adjusted to the row-after-row sequential scan operations on the pixel circuits 2 in column units by sequentially asserting an input signal on the signal lines SL. The horizontal selector 3 switches the signal from an electric potential Vsig representing a video signal (or a gradation) to a reference electric potential Vofs and vice versa.

In the configuration described above, first of all, an operation to put the signal sampling transistor T1 in a turned-on state by making use of the control signal is carried out after the high electric potential Vcc has been asserted on the power-supply line DS and the reference electric potential Vofs has been asserted on the signal line SL in order to perform a light extinction process of switching the light emitting device EL from a light emission state to a no-light emission state. Thereafter, the signal sampling transistor T1 is put in a turned-off state by making use of the control signal and, then, the power-supply line DS is switched from the high electric potential Vcc to the low electric potential Vss. Thus, the voltage Vs appearing on the source electrode S of the device driving transistor T2 is lowered in the so-called threshold-voltage compensation preparatory process in order to set a voltage Vgs appearing between the gate and source electrodes of the device driving transistor T2 at a magnitude greater than the threshold voltage Vth of the device driving transistor T2 without putting back the signal sampling transistor T1 in a turned-on state after the power-supply line DS has been switched from the high electric potential Vcc to the low electric potential Vss. Subsequently, the power-supply line DS is switched back from the low electric potential Vss to the high electric potential Vcc. Then, with the signal line SL sustained at the reference electric potential Vofs, the signal sampling transistor T1 is put in a turned-on state by making use of the control signal so that the voltage Vg appearing on the gate electrode G of the device driving transistor T2 is abruptly raised to the reference electric potential Vofs, causing the voltage Vs appearing on the source electrode S of the device driving transistor T2 to rise gradually in a process of electrically charging the signal holding capacitor C1. Thus, the voltage Vgs appearing between the gate and source electrodes of the device driving transistor T2 is reduced gradually in a direction toward the threshold voltage Vth of the device driving transistor T2 in the so-called threshold-voltage compensation process.

In accordance with a driving method provided by an embodiment of the present invention, first of all, after the high electric potential Vcc has been asserted on the power-supply line DS and the reference electric potential Vofs has been asserted on the signal line SL, an operation to perform a light extinction process of switching the light emitting device EL from a light emission state to a no-light emission state is carried out.

Thereafter, the signal sampling transistor T1 is put in a turned-off state by making use of the control signal and, then, the power-supply line DS is switched from the high electric potential Vcc to the low electric potential Vss. Thus, the voltage Vs appearing on the source electrode S of the device driving transistor T2 is lowered in the so-called threshold-voltage compensation preparatory process in order to set a voltage Vgs appearing between the gate and source electrodes of the device driving transistor T2 at a magnitude greater than the threshold voltage Vth of the device driving transistor T2 without putting back the signal sampling transistor T1 in a turned-on state after the power-supply line DS has been switched from the high electric potential Vcc to the low electric potential Vss. Subsequently, the power-supply line DS is switched back from the low electric potential Vss to the high electric potential Vcc. Then, with the signal line SL sustained at the reference electric potential Vofs, the signal sampling transistor T1 is put in a turned-on state so that the voltage Vg appearing on the gate electrode G of the device driving transistor T2 is abruptly raised to the reference electric potential Vofs, causing the voltage Vs appearing on the source electrode S of the device driving transistor T2 to rise gradually in a process of electrically charging the signal holding capacitor C1. Thus, the voltage Vgs appearing between the gate and source electrodes of the device driving transistor T2 is reduced gradually in a direction toward the threshold voltage Vth of the device driving transistor T2 in the so-called threshold-voltage compensation process. As described above, by carrying out the light extinction process, the threshold-voltage compensation preparatory process and the threshold-voltage compensation process sequentially one process after another, incorrect operations can be avoided so that it is possible to carry out a threshold-voltage compensation process of the device driving transistor T2 with a high degree of reliability and a high degree of stability in every pixel circuit. In particular, in the threshold-voltage compensation preparatory process, the voltage Vs appearing on the source electrode S of the device driving transistor T2 is lowered without putting back the signal sampling transistor T1 in a turned-on state. Thus, incorrect operations can be avoided so that it is possible to carry out a threshold-voltage compensation process of the device driving transistor T2 with a high degree of stability in every pixel circuit 2.

Figure 3:
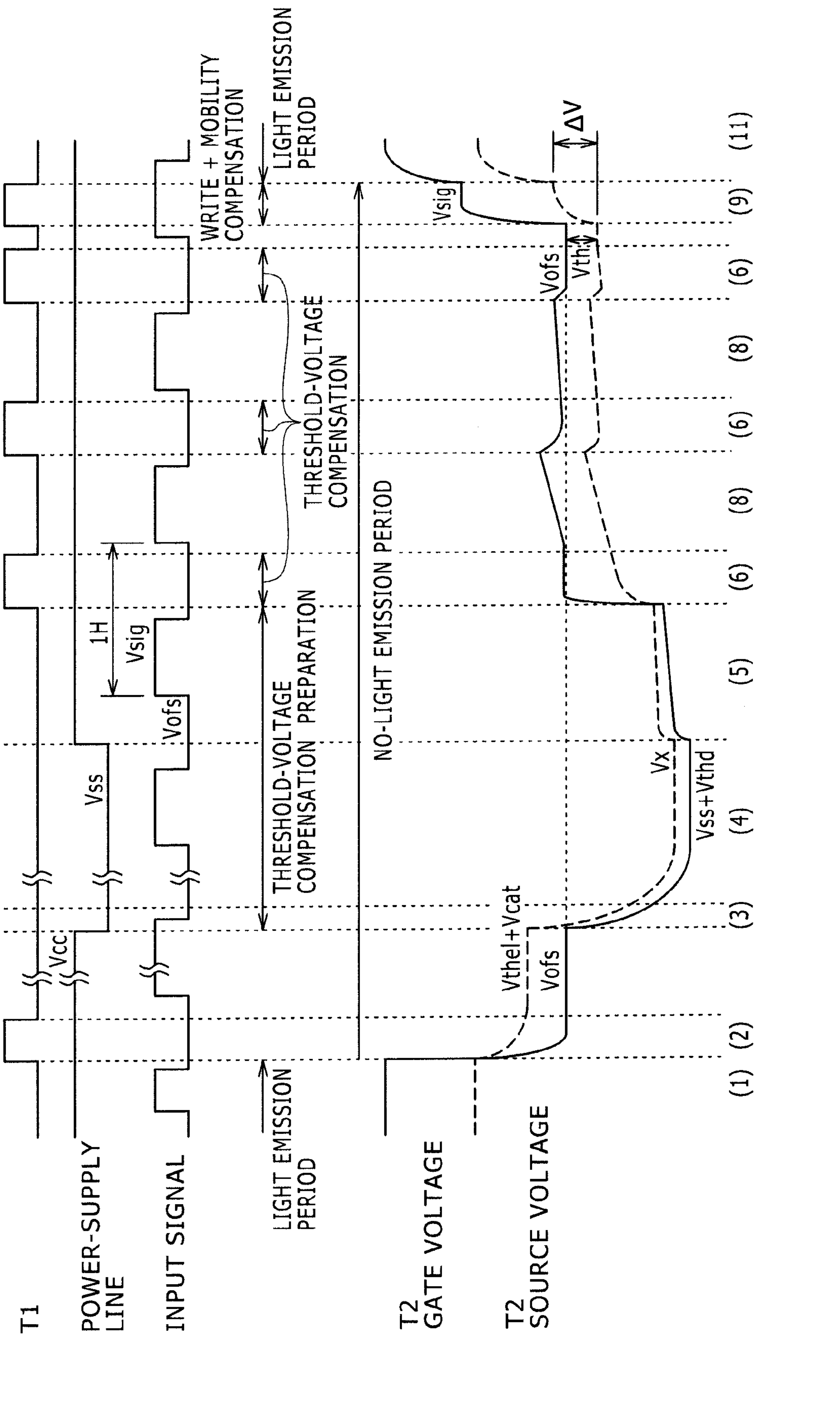
FIG. 3 is a timing diagram showing a timing chart of each signal relevant to a driving method for driving the pixel circuit employed in the display apparatus according to the first embodiment.

FIG. 3 is a timing diagram showing a timing chart of each signal relevant to the driving method described above by referring to the circuit diagram of FIG. 2 as a method for driving the pixel circuit 2. The horizontal axis of the timing charts represents the lapse of time. The three top time charts represent changes of electric potentials appearing on the scan line WS, the power-supply line DS and the signal line SL respectively. The changes of the electric potential appearing on the scan line WS are changes of the control signal which switches the signal sampling transistor T1 whereas the changes of the electric potential appearing on the power-supply line DS are changes of the power-supply voltage from the low electric potential Vss to the high electric potential Vcc and vice versa. The changes of the electric potential appearing on the signal line SL are changes of the input signal from the video-signal electric potential Vsig representing the video signal to the reference electric potential Vofs and vice versa. The two bottom time charts represent changes of the gate electric potential Vg appearing on the gate electrode G of the pixel circuit 2 and changes of the source electric potential Vs appearing on the source electrode S of the pixel circuit 2 respectively. As described earlier, the difference between the gate electric potential Vg appearing on the gate electrode G of the pixel circuit 2 and the source electric potential Vs appearing on the source electrode S of the pixel circuit 2 is referred to as the gate-source voltage Vgs appearing between the gate and source electrodes of the device driving transistor T2.

The horizontal axis of the timing charts includes periods (1) to (11) during which the pixel circuit 2 carries out a sequence of operations for descriptive purposes. In the light emission period (1), the pixel circuit 2 is in a light emission state which is a state of emitting light from the light emitting device EL of the pixel circuit 2. In the no-light emission period (2), the pixel circuit 2 is in a no-light emission state which is a state of emitting no light from the light emitting device EL of the pixel circuit 2. Then, in the preparatory periods (3) to (5), the pixel circuit 2 carries out the threshold-voltage compensation preparatory process described before as a preparation for the threshold-voltage compensation process explained previously. Subsequently, in the threshold-voltage compensation period (6), the pixel circuit 2 carries out the actual threshold-voltage compensation process. In the typical time diagram, there are three threshold-voltage compensation periods (6) before the signal write period (9) and the wait period (8) between any two successive threshold-voltage compensation periods (6). That is to say, prior to the signal write period (9), the threshold-voltage compensation process is carried out three times. Then, the execution of the threshold-voltage compensation process is ended. In the signal write period (9), the electric potential of the video-signal electric potential Vsig is stored in the signal holding capacitor C1, and a mobility compensation process of the signal sampling transistor T1 is also carried out as well. Then, the pixel circuit 2 starts another light emission period (11) by making a transition from the no-light emission state to the light emission state.

In the embodiment described so far by referring to the timing diagram of FIG. 3, as explained above, the threshold-voltage compensation process is carried out three times in three different threshold-voltage compensation periods (6) on a time-division basis. Between any two successive threshold-voltage compensation periods (6), a wait period (8) is inserted. By carrying out the threshold-voltage compensation process repeatedly a plurality of times in the same plurality of different threshold-voltage compensation periods (6) in this way, a voltage having a magnitude equal to the threshold voltage Vth of the device driving transistor T2 is stored in the signal holding capacitor C1. However, implementations of the present invention are by no means limited to this driving method. For example, the threshold-voltage compensation process can also be carried out one time in one threshold-voltage compensation period (6).

Then, the pixel circuit 2 enters the period (9) allocated to a signal write process and a mobility compensation process. In the period (9), the video-signal electric potential Vsig of the input signal is stored in the signal holding capacitor C1 in the signal write process, being added to the a voltage which has already been stored in the signal holding capacitor C1 at a magnitude equal to the threshold voltage Vth of the device driving transistor T2. At the same time, in the mobility compensation process, a voltage ΔV for the mobility compensation process is subtracted from a voltage stored in the signal holding capacitor C1. In the period (9) allocated to a signal write process and a mobility compensation process, it is necessary to sustain the signal line SL at the video-signal electric potential Vsig and, then, put the signal sampling transistor T1 in a turned-on state. Then, the pixel circuit 2 enters the light emission period (11) in which the light emitting device EL is emitting light at a luminance determined by the magnitude of the video-signal electric potential Vsig. The video-signal electric potential Vsig is adjusted by the threshold voltage Vth of the device driving transistor T2 and the voltage ΔV for the mobility compensation process. Thus, the luminance of light emitted by the light emitting device EL is by no means affected by variations of the threshold voltage Vth of the device driving transistor T2 and variations of the mobility μ of the device driving transistor T2. It is to be noted that, in the early part of the light emission period (11), a bootstrap operation is carried out. In the bootstrap operation, electric potentials appearing on the gate electrode G of the device driving transistor T2 and the source electrode S of the device driving transistor T2 rise while sustaining the gate-source voltage Vgs appearing between the gate electrode G of the device driving transistor T2 and the source electrode S of the device driving transistor T2 at a constant magnitude.

Next, operations carried out by the pixel circuit 2 shown in the circuit diagram of FIG. 2 are explained in detail by referring to circuit diagrams of FIGS. 4A to 4K. First of all, in the light emission period (1) during which the light emitting device EL is sustained in a light emission state, the power-supply line DS is set at the high electric potential Vcc and the signal sampling transistor T1 is sustained in a turned-off state as shown in the circuit diagram of FIG. 4A. Since the device driving transistor T2 has been set to operate in a saturated region at that time, the drain-source current Ids flowing from the device driving transistor T2 to the light emitting device EL as a driving current has a magnitude determined by the gate-source voltage Vgs appearing between the gate and source electrodes of the device driving transistor T2 in accordance with the transistor characteristic equation expressed by Eq. (1).

Then, on the border between the light emission period (1) and the light extinction period (2), a transition from a light emission state to a no-light emission state occurs when the signal sampling transistor T1 is put in a turned-on state after the electric potential appearing on the signal line SL has been set at the reference electric potential Vofs. When the signal sampling transistor T1 is put in a turned-on state after the electric potential appearing on the signal line SL has been set at the reference electric potential Vofs, the reference electric potential Vofs is supplied to the gate electrode G of the device driving transistor T2 as shown in the circuit diagram of FIG. 4B. Thus, the gate-source voltage Vgs appearing between the gate and source electrodes of the device driving transistor T2 has a magnitude not greater than the threshold voltage Vth of the device driving transistor T2, stopping the flow of the drain-source current Ids to the light emitting device EL. As a result, the light emitting device EL ceases to emit light. At that time, a voltage applied to the light emitting device EL has a magnitude equal to the threshold voltage Vthel of the light emitting device EL. Thus, an electric potential Vel appearing on the anode electrode of the light emitting device EL has a magnitude equal to a sum (Vcat+Vthel) where reference notation Vcat denotes a voltage appearing on the cathode electrode of the light emitting device EL whereas reference notation Vthel denotes the threshold voltage of the light emitting device EL.

After certain time has lapsed, the power-supply voltage is changed from the high electric potential Vcc to the low electric potential Vss in order to start the preparatory period (3). In this period, serving as the source electrode S of the device driving transistor T2 is the current terminal connected to the power-supply line DS and a current is flowing from the anode electrode of the light emitting device EL to the power-supply line DS by way of the device driving transistor T2 as shown in the circuit diagram of FIG. 4C. Thus, the voltage Vel appearing on the anode electrode of the light emitting device EL decreases with the lapse of time. Since the signal sampling transistor T1 has been put in a turned-off state at that time, the voltage Vg appearing on the gate electrode G of the device driving transistor T2 also decreases in the same way as the voltage Vel appearing on the anode electrode of the light emitting device EL does. Thus, the gate-source voltage Vgs shown in the circuit diagram of FIG. 4C decreases with the lapse of time. As shown in the circuit diagram of FIG. 4C, the gate-source voltage Vgs is an electric potential appearing between the gate electrode G of the device driving transistor T2 and the power-supply line DS.

Figure 4A:
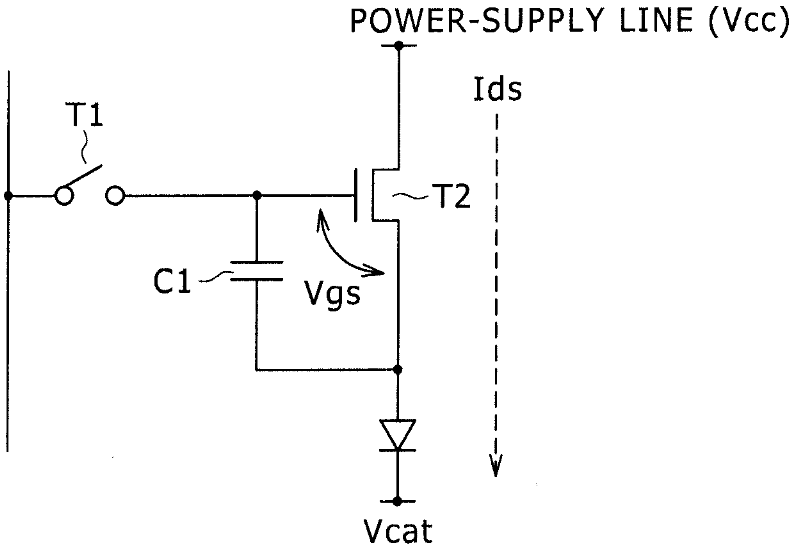
FIGS. 4A to 4F are model circuit diagrams to be referred to in explanation of operations carried out by the pixel circuit employed in the display apparatus according to the first embodiment in periods (1) to (6), respectively, shown in the timing diagram of FIG. 3.
Figure 4B:
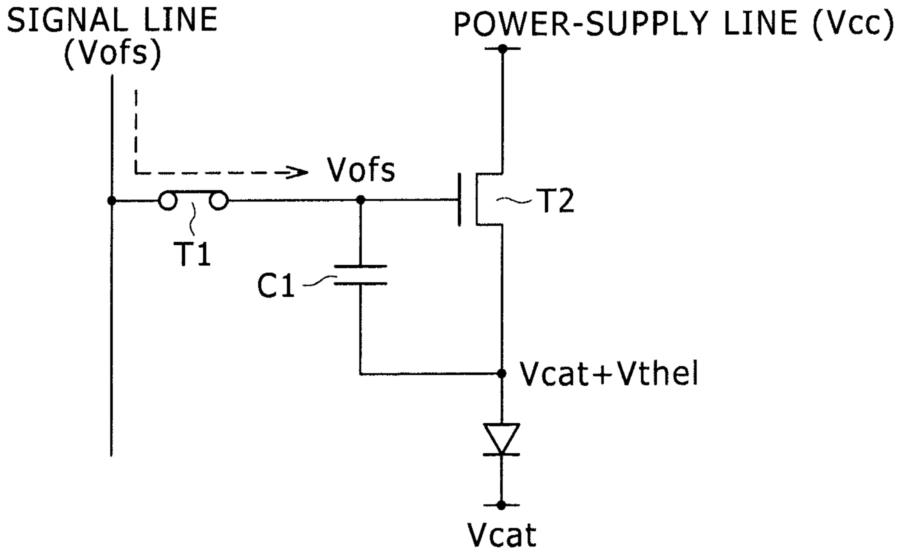
Figure 4C:
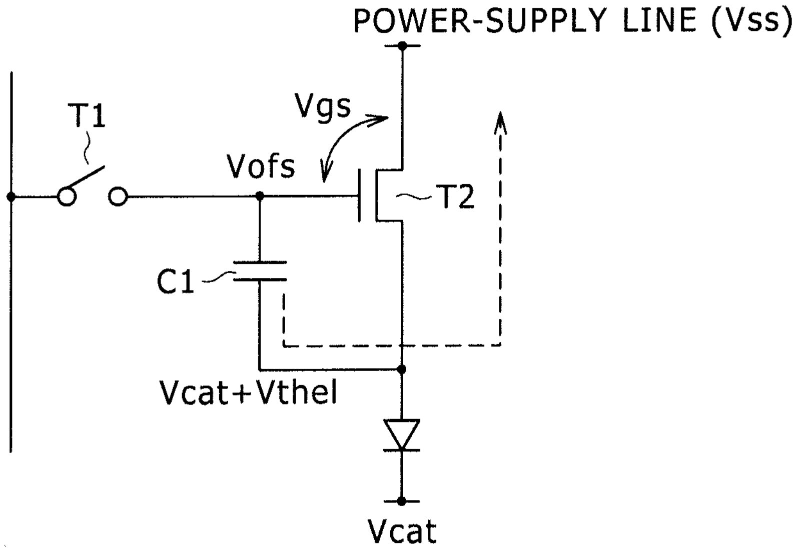
Figure 4D:
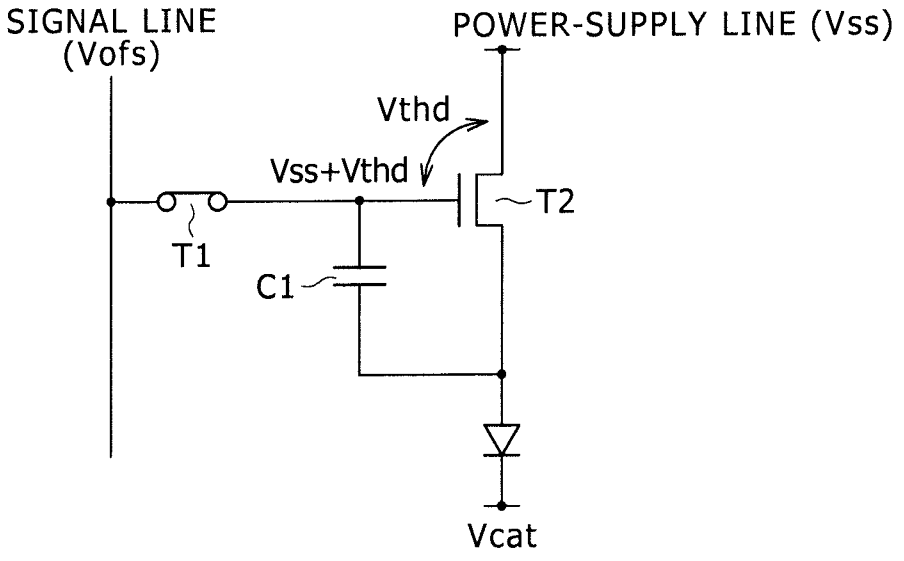

If the device driving transistor T2 is operating in a saturated region, that is, if a relation (Vgs−Vthd)≤Vds is satisfied, the voltage Vg appearing on the gate electrode G of the device driving transistor T2 attains a sum (Vss+Vthd) in the course of time and the period (4) is started as shown in the circuit diagram of FIG. 4D. In the relation, reference notation Vthd denotes the threshold of the voltage appearing between the gate electrode G of the device driving transistor T2 and the power-supply line DS.

Figure 4E:
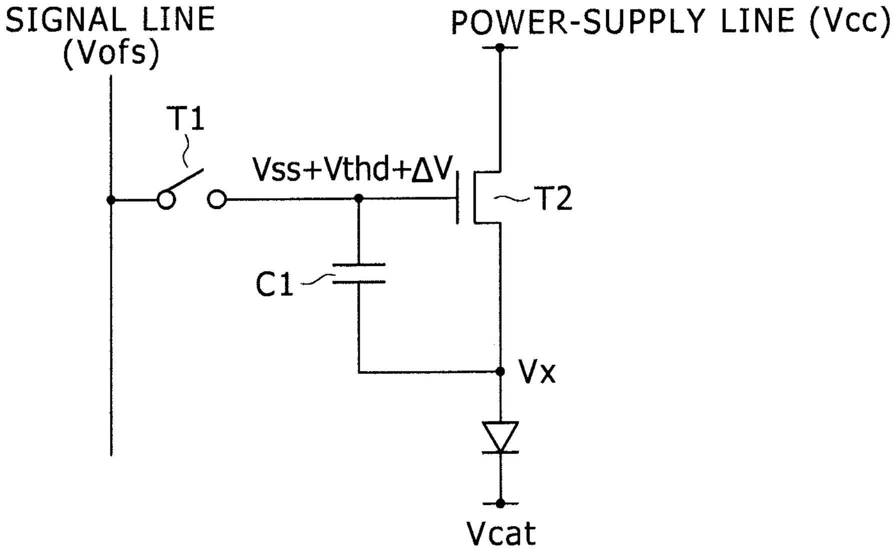

Then, the driving voltage is changed from the low electric potential Vss back to the high electric potential Vcc as shown in the circuit diagram of FIG. 4E in order to start the preparatory period (5). At that time, a coupling quantity ΔV is supplied to the gate electrode G of the device driving transistor T2 and a voltage Vx appears on the anode electrode of the light emitting device EL. As the driving voltage asserted on the power-supply line DS is changed from the low electric potential Vss back to the high electric potential Vcc, serving as the source electrode S of the device driving transistor T2 is the current terminal connected to the anode electrode of the light emitting device EL. In the preparatory period (5), the gate-source voltage Vgs appearing between the gate and source electrodes of the device driving transistor T2 determines the magnitude of a drain-source current Ids flowing from the power-supply line DS to the anode electrode of the light emitting device EL by way of the device driving transistor T2. If the magnitude of the gate-source voltage Vgs appearing between the gate and source electrodes of the device driving transistor T2 is smaller than the threshold voltage Vth of the device driving transistor T2, however, the electric potential Vg appearing on the gate electrode G of the device driving transistor T2 and the electric potential Vs appearing on the source electrode S of the device driving transistor T2 hardly increase during the preparatory period (5).

Figure 4F:
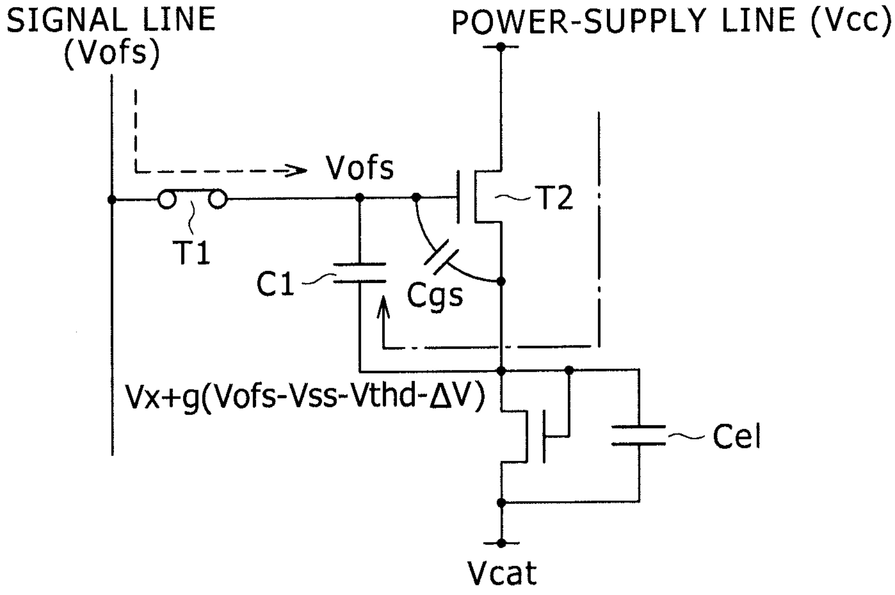
Figure 4G:
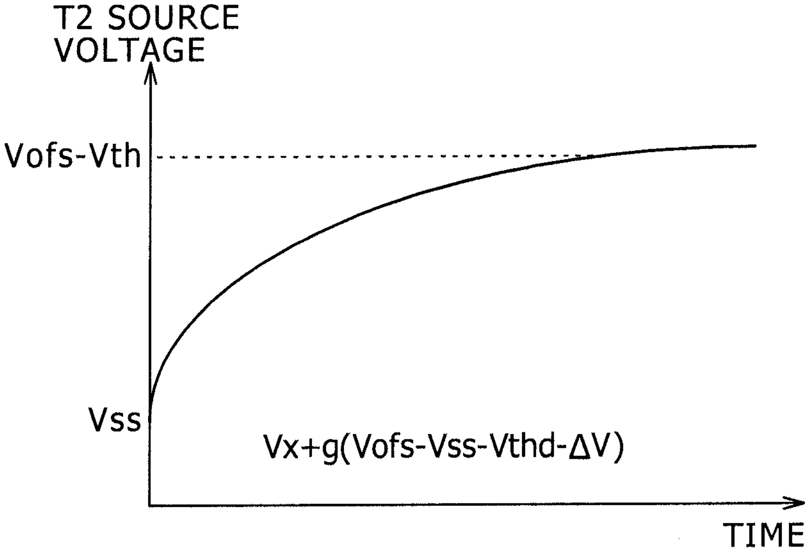
FIG. 4G is a diagram showing a curve indicating how a voltage appearing on the anode of a light emitting device included in the pixel circuit employed in the display apparatus according to the first embodiment rises with the lapse of time during the period (6)
Figure 4H:
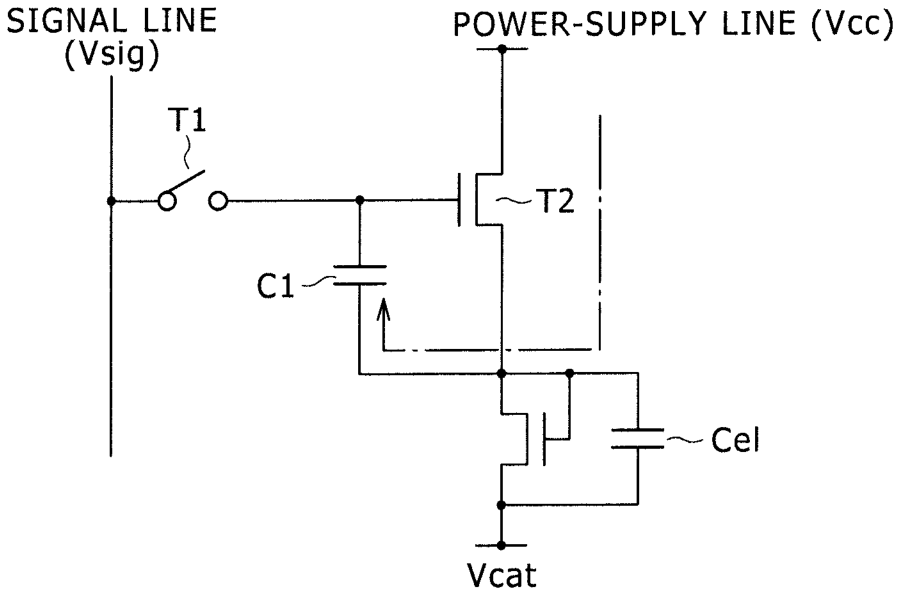
FIGS. 4H and 4I are model circuit diagrams to be referred to in explanation of operations carried out by the pixel circuit employed in the display apparatus according to the first embodiment in periods (8) and (9), respectively, shown in the timing diagram of FIG. 3.
Figure 4I:
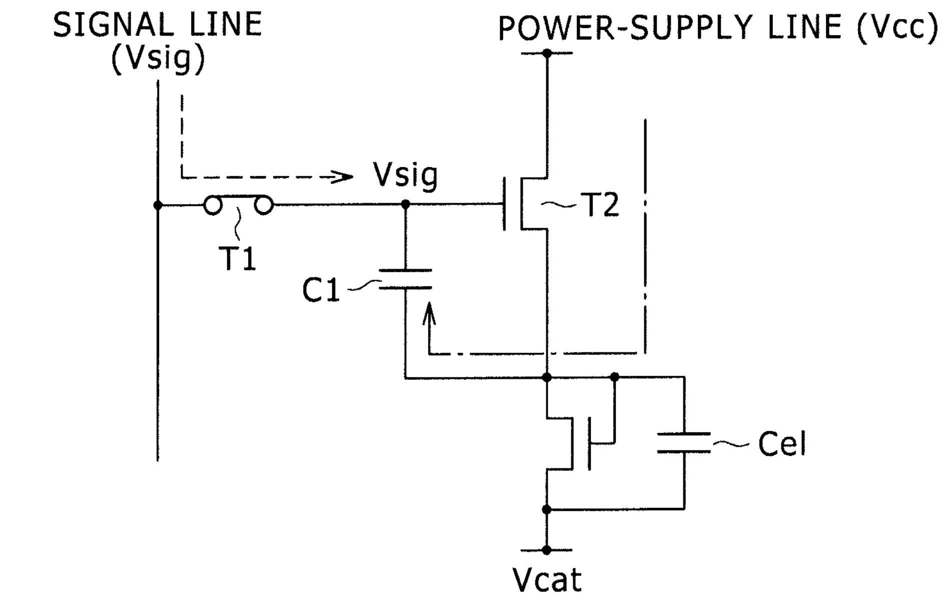

Then, after the input signal asserted on the signal line SL has been set at the reference electric potential Vofs, the signal sampling transistor T1 is put in a turned-on state as shown in the circuit diagram of FIG. 4F in order to start the threshold-voltage compensation period (6). Thus, the reference electric potential Vofs is supplied to the gate electrode G of the device driving transistor T2 by way of the signal sampling transistor T1. A fraction g of the change of the voltage appearing on the gate electrode G of the device driving transistor T2 is applied to the source electrode S of the device driving transistor T2. The fraction g is determined by the capacitance of the signal holding capacitor C1, the capacitance of a parasitic capacitor Cgs existing between the gate and source electrodes of the device driving transistor T2 and the capacitance of a parasitic capacitor Cel existing between the anode and cathode electrodes of the light emitting device EL. To put it in detail, the value of the fraction g is expressed by Eq. (2) given as follows:

$$g = \frac{C1 + Cgs}{C1 + Cgs + Cel} \qquad (2)$$

If the gate-source voltage Vgs appearing between the gate and source electrodes of the device driving transistor T2 during the threshold-voltage compensation period (6) is greater than the threshold voltage Vth of the device driving transistor T2, a current flows from the power-supply line DS to the device driving transistor T2 as shown in the circuit diagram of FIG. 4F. In other words, it is necessary to deliberately set the low electric potential Vss and the reference electric potential Vofs at such values that the gate-source voltage Vgs appearing between the gate and source electrodes of the device driving transistor T2 during the threshold-voltage compensation period (6) is greater than the threshold voltage Vth of the device driving transistor T2. As described earlier, the equivalent circuit of the light emitting device EL includes a diode and the parasitic capacitor Cel which are connected to each other in parallel. Thus, the current flowing from the power-supply line DS to the device driving transistor T2 does not proceed to the light emitting device EL as long as a relation Vel≤(Vcat+Vthel) is satisfied and the magnitude of a leak current flowing through the light emitting device EL is much smaller than the magnitude of the current flowing from the power-supply line DS to the device driving transistor T2. As a result, the current flowing from the power-supply line DS to the device driving transistor T2 is used for electrically charging the signal holding capacitor C1 and the parasitic capacitor Cel of the equivalent circuit. Thus, during the threshold-voltage compensation period (6), the voltage Vel applied to the anode electrode of the light emitting device EL rises gradually as shown by a curve in a diagram of FIG. 4G.

The period serving as the threshold-voltage compensation period (6) is ended in order to start a wait period (8) when the signal sampling transistor T1 is put in a turned-off state before the input signal asserted on the signal line SL is changed from the reference electric potential Vofs to the video-signal electric potential Vsig. When the threshold-voltage compensation period (6) is ended, the gate-source voltage Vgs appearing between the gate and source electrodes of the device driving transistor T2 is still greater than the threshold voltage Vth of the device driving transistor T2. Thus, the drain-source current Ids flows through the device driving transistor T2 as shown in the circuit diagram of FIG. 4H, and both the electric potentials appearing on the gate and source electrodes of the device driving transistor T2 rise. Much like the threshold-voltage compensation period (6), however, a reversed bias is applied to the light emitting device EL so that the light emitting device EL does not emit light.

The wait period (8) is ended in order to resume the suspended threshold-voltage compensation period (6) when the signal sampling transistor T1 is put in a turned-on state after the input signal asserted on the signal line SL has been changed from the video-signal electric potential Vsig to the reference electric potential Vofs. The threshold-voltage compensation period (6) and the wait period (8) immediately lagging behind the threshold-voltage compensation period (6) are repeated in this way till the gate-source voltage Vgs appearing between the gate and source electrodes of the device driving transistor T2 is reduced to the threshold voltage Vth of the device driving transistor T2 at the end of the last threshold-voltage compensation period (6). At that time, relations Vel=Vofs−Vth≤(Vcat+Vthel) are satisfied.

Figure 4J:
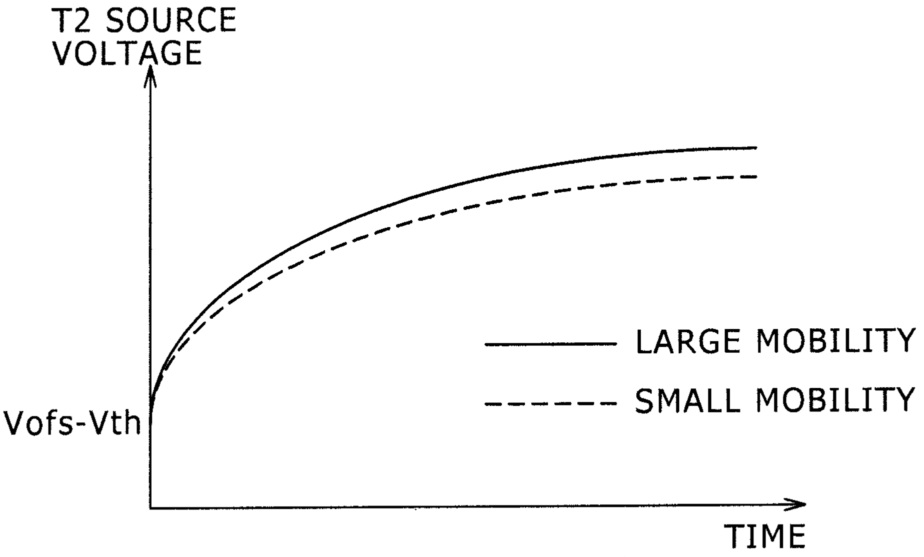
FIG. 4J is a diagram depicting two graphs showing how the source electric potential appearing on the source electrode of a device driving transistor rises with the lapse of time for different values of the mobility of the device driving transistor.
Figure 4K:
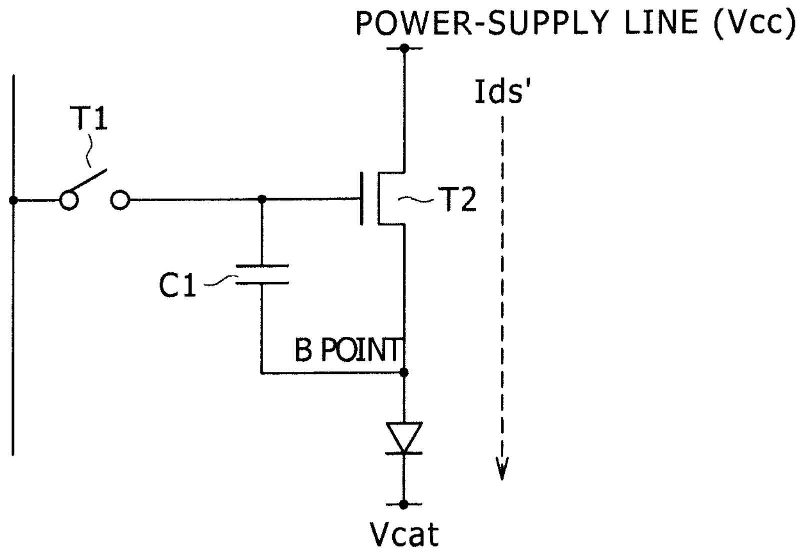
FIG. 4K is a model circuit diagram to be referred to in explanation of operations carried out by the pixel circuit employed in the display apparatus according to the first embodiment in a period (11) shown in the timing diagram of FIG. 3.

The last threshold-voltage compensation period (6) is also ended by putting the signal sampling transistor T1 in a turned-off state. Then, after the input signal asserted on the signal line SL has been changed from the reference electric potential Vofs to the video-signal electric potential Vsig, the signal sampling transistor T1 again put in a turned-on state in order to start the write period (9) in which the pixel circuit 2 is set in a state shown in the diagram of FIG. 4I. As described before, the video-signal electric potential Vsig is a voltage representing a gradation. Since the signal sampling transistor T1 has been put in a turned-on state, the video-signal electric potential Vsig is supplied to the gate electrode G of the device driving transistor T2 by way of the signal sampling transistor T1 and a current flows from the power-supply line DS to the device driving transistor T2 as the drain-source current Ids. Since the relation Vs≤(Vcat+Vthel) is satisfied, however, the drain-source current Ids is used for electrically charging the signal holding capacitor C1 and the parasitic capacitor Cel existing between the anode and cathode electrodes of the light emitting device EL provided that the magnitude of a leak current flowing through the light emitting device EL is much smaller than the magnitude of the current flowing from the power-supply line DS to the device driving transistor T2. When the signal write period (9) is started, the threshold-voltage compensation process of the device driving transistor T2 has been completed. Thus, the drain-source current Ids flowing through the device driving transistor T2 reflects the mobility μ of the device driving transistor T2. To put it more concretely, the larger the value of the mobility, the larger the magnitude of the drain-source current Ids and, thus, the higher the speed at which the source electric potential Vs appearing on the source electrode S of the device driving transistor T2 rises. Conversely, the smaller the value of the mobility, the smaller the magnitude of the drain-source current Ids and, thus, the lower the speed at which the source electric potential Vs appearing on the source electrode S of the device driving transistor T2 rises as shown in FIG. 4J. FIG. 4J is a diagram depicting two curves showing how the source electric potential Vs appearing on the source electrode S of a device driving transistor T2 rises with the lapse of time for different values of the mobility of the device driving transistor T2. Since the value of the mobility is reflected in the gate-source voltage Vgs appearing between the gate and source electrodes of the device driving transistor T2, Vgs decreases to a level which is completely independent of variations in mobility.

The signal write period (9) is ended when the signal sampling transistor T1 is put in a turned-off state. In the light emission period (11), a drain-source current Ids' is flowing to the light emitting device EL as a driving current for driving the light emitting device EL to emit light in a light emission state shown in the circuit diagram of FIG. 4K. Since the gate-source voltage Vgs appearing between the gate and source electrodes of the device driving transistor T2 is sustained at a constant magnitude, the luminance of the light emitted by the light emitting device EL is also fixed.

Due to an aging phenomenon occurring over the long lapse of time, the I-V characteristic of the light emitting device EL employed in the pixel circuit 2 changes undesirably. Thus, the electric potential appearing at a point B shown in the circuit diagram of FIG. 4K also changes. Since the source-gate voltage Vgs appearing between the gate and source electrodes of the device driving transistor T2 is sustained at a constant magnitude, however, the drain-source current Ids flowing to the light emitting device EL a driving current for driving the light emitting device EL also stays at a fixed magnitude as well. As a result, even if the I-V characteristic of the light emitting device EL employed in the pixel circuit 2 changes, the drain-source current Ids is sustained at a fixed magnitude so that the luminance of light emitted by the light emitting device EL remains unchanged too.

Figure 5:
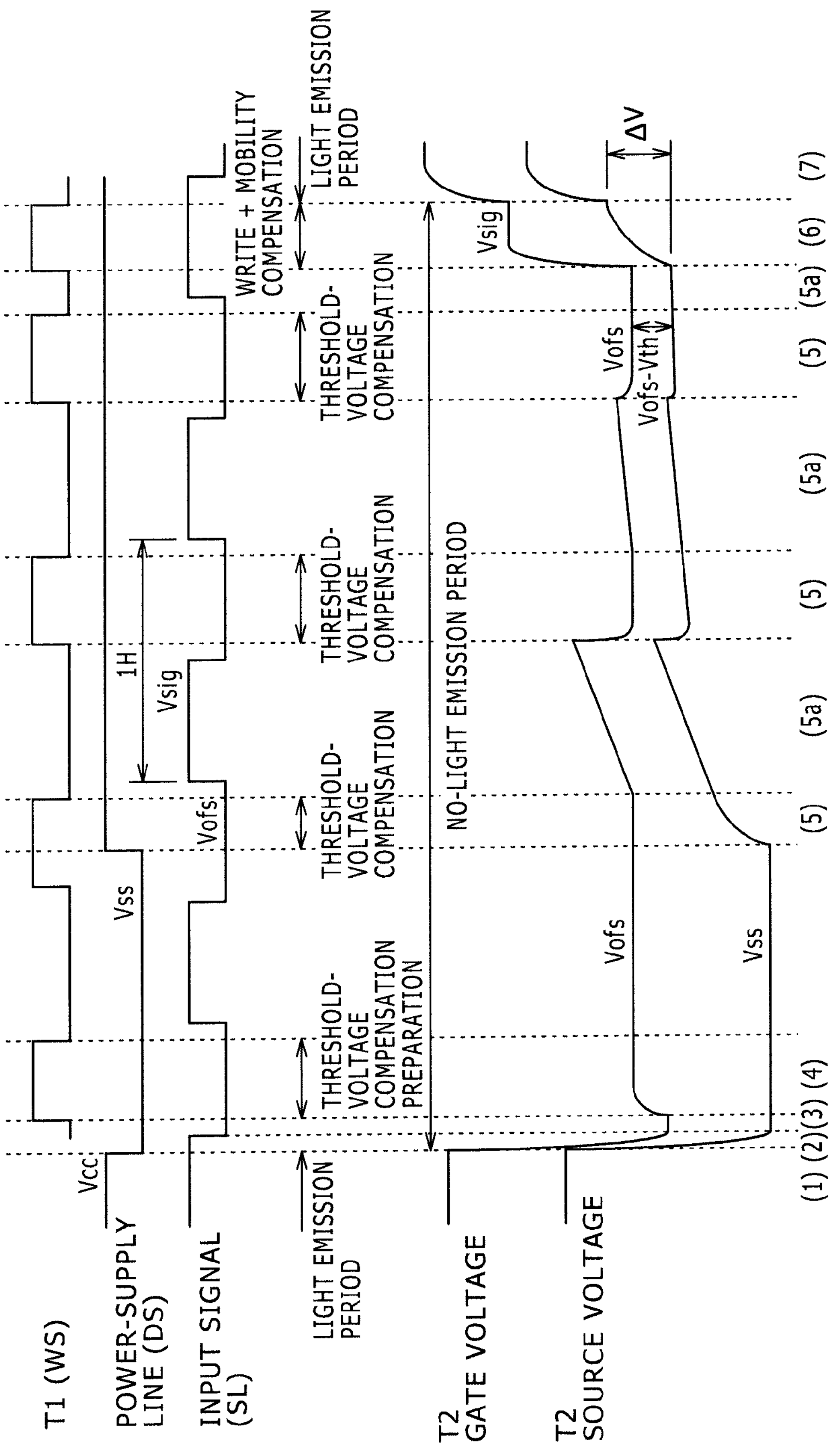
FIG. 5 is a timing diagram showing a timing chart of each signal generated in operations carried out by the pixel circuit employed in a typical reference display apparatus.

FIG. 5 is a timing diagram showing a timing chart of each signal generated in operations carried out by the pixel circuit 2 shown in the circuit diagram of FIG. 2. However, the timing diagram showing the timing charts is merely a typical reference to be compared with a timing diagram for a sequence of operations carried out by the pixel circuit 2 in accordance with the present invention. In order to make the following description easy to understand, the timing diagram of FIG. 5 makes use of the same reference notations as the timing diagram of FIG. 3. The horizontal axis of the timing diagram of FIG. 5 represents periods (1) to (7) corresponding to transitions of operations carried out by the pixel circuit 2. The period (1) is a light emission period, the period (2) is a light extinction period, each of the periods (3) and (4) is a preparatory period, each of the periods (5) is a threshold-voltage compensation period, each of the periods (5*a*) is a wait period, the period (6) is a signal write period whereas the period (7) is another light emission period.

Next, the operations carried out during the periods (1) to (7) shown in the timing diagram of FIG. 5 are explained briefly by referring to circuit diagrams of FIGS. 6A to 6G. First of all, during the light emission period (1), the power-supply voltage is sustained at the high electric potential Vcc whereas the signal sampling transistor T1 is sustained in a turned-off state as shown in the circuit diagram of FIG. 6A. Since the device driving transistor T2 has been set to operate in a saturated region at that time, the drain-source current Ids flowing from the device driving transistor T2 to the light emitting device EL as a driving current has a magnitude determined by the gate-source voltage Vgs appearing between the gate and source electrodes of the device driving transistor T2 in accordance with the transistor characteristic equation expressed by Eq. (1).

Figure 6A:
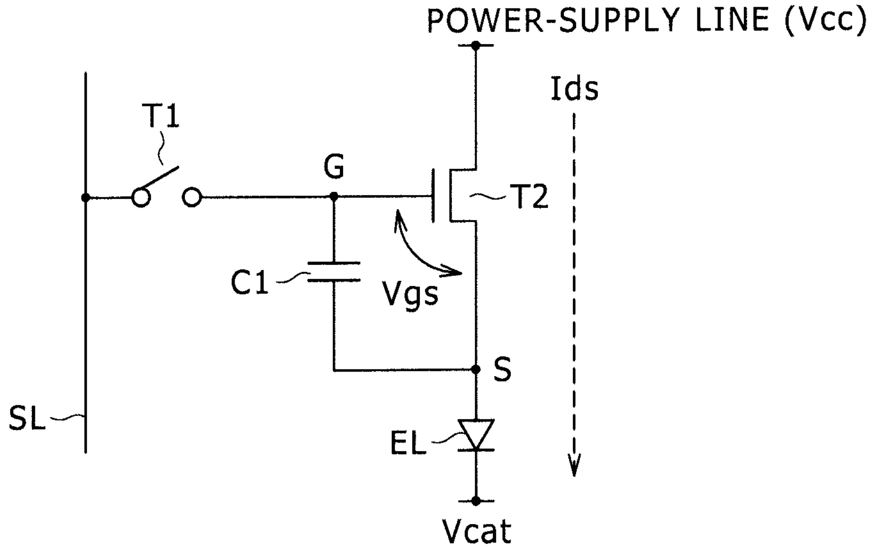
FIGS. 6A to 6G are model circuit diagrams to be referred to in explanation of operations carried out by the pixel circuit employed in the typical reference display apparatus in periods (1) to (7), respectively, shown in the timing diagram of FIG. 5.
Figure 6B:
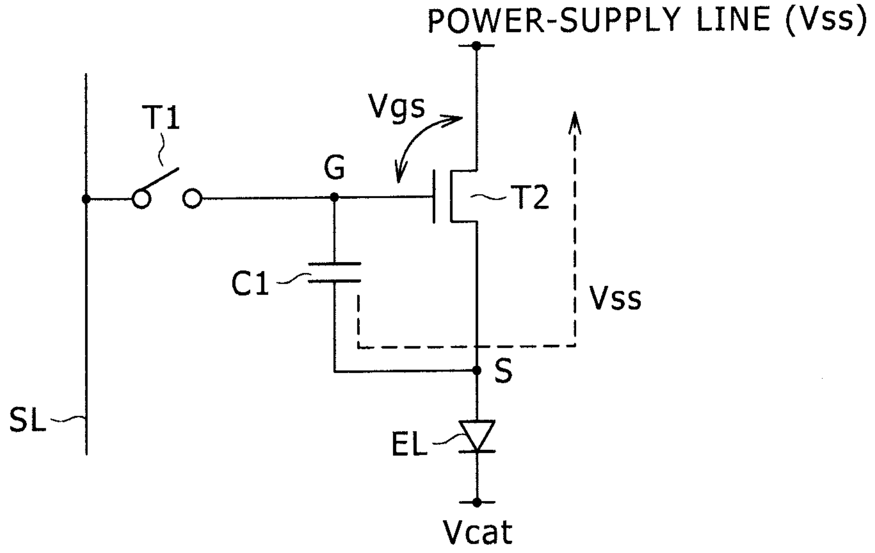
Figure 6C:
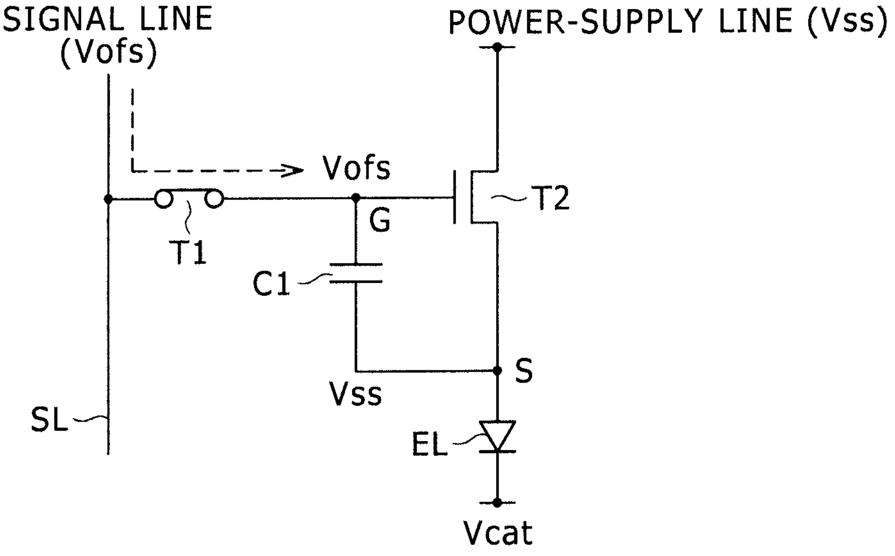

A transition from the light emission period (1) to the light extinction period (2) leading ahead of the preparatory period (3) is made when the power-supply voltage is changed from the high electric potential Vcc to the low electric potential Vss as shown in FIG. 6B. The low electric potential Vss is set at a magnitude smaller than the sum of the threshold voltage Vthel of the light emitting device EL and the cathode electric potential Vcat appearing on the cathode electrode of the light emitting device EL. That is to say, if a relation Vss<(Vthel+Vcat) is satisfied, the light emitting device EL ceases to emit light. In the light extinction period (2), serving as the source electrode S of the device driving transistor T2 is the current terminal connected to the power-supply line DS and a current is flowing from the anode electrode of the light emitting device EL to the power-supply line DS by way of the device driving transistor T2 as shown in the circuit diagram of FIG. 6B to electrically discharge an electrical charge accumulated in the signal holding capacitor C1 toward the low electric potential Vss.

Then, as the input signal asserted on the signal line SL is changed from the video-signal electric potential Vsig to the reference electric potential Vofs, a transition from the light extinction period (2) to the preparatory period (3) is made. Subsequently, as the signal sampling transistor T1 is put in a turned-on state, a transition from the preparatory period (3) to the preparatory period (4) is made. In the transition from the preparatory period (3) to the preparatory period (4), the reference electric potential Vofs is supplied to the gate electrode G of the device driving transistor T2. Thus, the source electric potential Vs appearing on the source electrode S of the device driving transistor T2 and the gate electric potential Vg appearing on the gate electrode G of the device driving transistor T2 are initialized, and the gate-source voltage Vgs appearing between the gate and source electrodes of the device driving transistor T2 is initialized at a difference (Vofs−Vss). The magnitudes of the reference electric potential Vofs and the low electric potential Vss have been set so that the difference (Vofs−Vss) is greater than the threshold voltage Vth of the device driving transistor T2. As the device driving transistor T2 is initialized, that is, as a relation Vgs>Vth is satisfied, the threshold-voltage compensation preparatory process is completed.

Figure 6D:
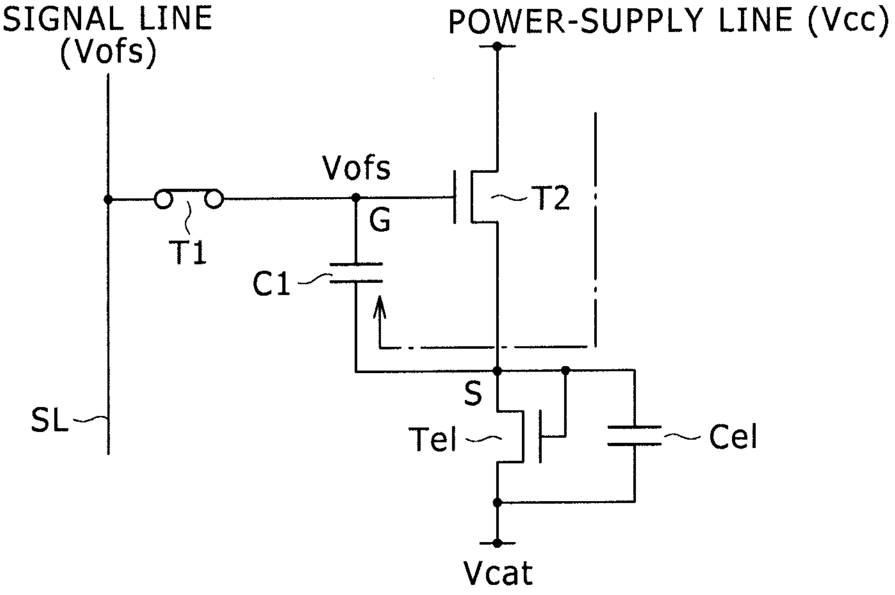

The threshold-voltage compensation period (5) is started when the power-supply voltage asserted on the power-supply line DS is changed from the low electric potential Vss back to the high electric potential Vcc as shown in FIG. 6D. In the threshold-voltage compensation state, the high electric potential Vcc set as the power-supply voltage causes the drain-source current Ids to flow through the device driving transistor T2 as shown in the circuit diagram of FIG. 6D. The equivalent circuit of the light emitting device EL includes a diode Tel and a parasitic capacitor Cel which are connected to each other in parallel as shown in the circuit diagram of FIG. 6D. Thus, the current flowing from the power-supply line DS to the device driving transistor T2 does not proceed to the light emitting device EL as long as the anode electric potential Vel (that is, the source electric potential Vss) satisfies a relation Vel≤(Vcat+Vthel) and the magnitude of a leak current flowing through the light emitting device EL is much smaller than the magnitude of the current flowing from the power-supply line DS to the device driving transistor T2. Since the light emitting device EL is put in a turned-off state, the current flowing from the power-supply line DS to the device driving transistor T2 is mostly used for electrically charging the signal holding capacitor C1 and the parasitic capacitor Cel of the equivalent circuit.

Figure 6E:
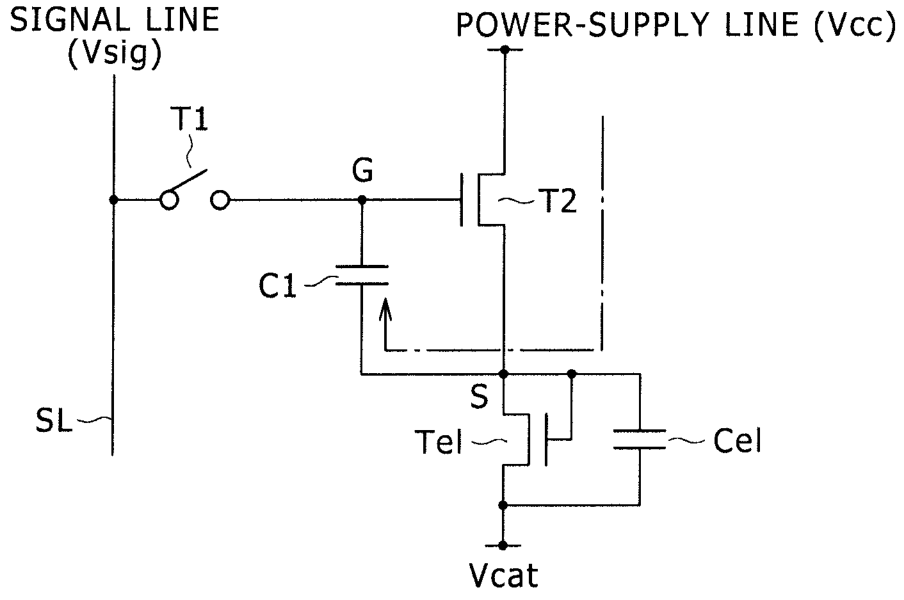

Thus, during the threshold-voltage compensation period (5), the voltage Vel applied to the anode electrode of the light emitting device EL (that is, the source electric potential Vs appearing on the source electrode S of the device driving transistor T2) rises gradually with the lapse of time. In this embodiment, however, before the source electric potential Vs appearing on the source electrode S of the device driving transistor T2 attains a difference (Vofs−Vth), the first threshold-voltage compensation period (5) is terminated in order to make a transition from the threshold-voltage compensation period (5) to a first wait period (5*a*) by putting the signal sampling transistor T1 in a turned-off state. FIG. 6E is a circuit diagram showing the state of the pixel circuit 2 during the wait period (5*a*). In the first wait period (5*a*), the magnitude of the gate-source voltage Vgs appearing between the gate and source electrodes of the device driving transistor T2 is still greater than the threshold voltage Vth of the device driving transistor T2 so that the drain-source current Ids keeps flowing from the power-supply line DS set at the high electric potential Vcc to the signal holding capacitor C1 as shown in the circuit diagram of FIG. 6E. Thus, during the threshold-voltage compensation period (5), the source electric potential Vs appearing on the source electrode S of the device driving transistor T2 rises gradually with the lapse of time. Since the signal sampling transistor T1 has been put in a turned-off state, however, the gate electrode G of the device driving transistor T2 is put in a high-impedance state also referred to as a floating state. Thus, the gate electric potential Vg appearing on the gate electrode G of the device driving transistor T2 also rises gradually with the lapse of time in a manner of being interlocked with the source electric potential Vs appearing on the source electrode S of the device driving transistor T2. That is to say, both the gate electric potential Vg appearing on the gate electrode G of the device driving transistor T2 and the source electric potential Vs appearing on the source electrode S of the device driving transistor T2 rise gradually with the lapse of time in a bootstrap operation based on the coupling effect in the first wait period (5*a*). The reversed bias is still applied to the light emitting device EL. As a result, the light emitting device EL does not emit light.

The input signal asserted on the signal line SL is changed from the reference electric potential Vofs to the video-signal electric potential Vsig (or from the video-signal electric potential Vsig to the reference electric potential Vofs) at intervals of 1H as shown in the timing diagram of FIG. 5. During the first wait period (5*a*), the input signal asserted on the signal line SL is changed from the video-signal electric potential Vsig to the reference electric potential Vofs. Then, the signal sampling transistor T1 is put in a turned-on state in order to make a transition from the first wait period (5*a*) to a second threshold-voltage compensation period (5) in which a second threshold-voltage compensation process is carried out in a way similar to the first threshold-voltage compensation process performed in the first threshold-voltage compensation period (5). Subsequently, the second threshold-voltage compensation period (5) is followed by a second wait period (5*a*). The threshold-voltage compensation period (5) and the wait period (5*a*) immediately lagging behind the threshold-voltage compensation period (5) are repeated a plurality of times in this way till the gate-source voltage Vgs appearing between the gate and source electrodes of the device driving transistor T2 is eventually reduced to the threshold voltage Vth of the device driving transistor T2 at the end of the last threshold-voltage compensation period (5). At that time, relations Vs=Vel=Vofs−Vth≤(Vcat+Vthel) are satisfied.

Figure 6F:
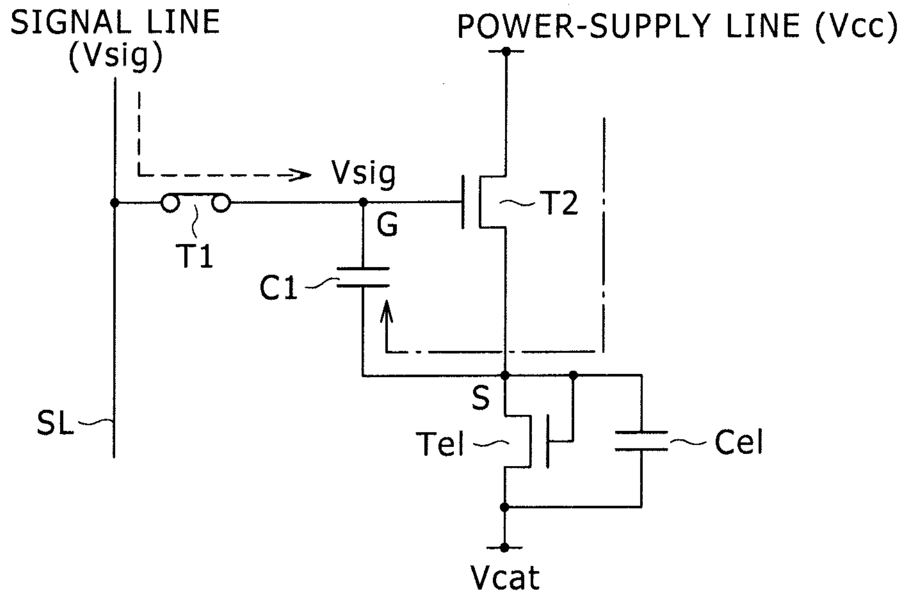
Figure 6G:
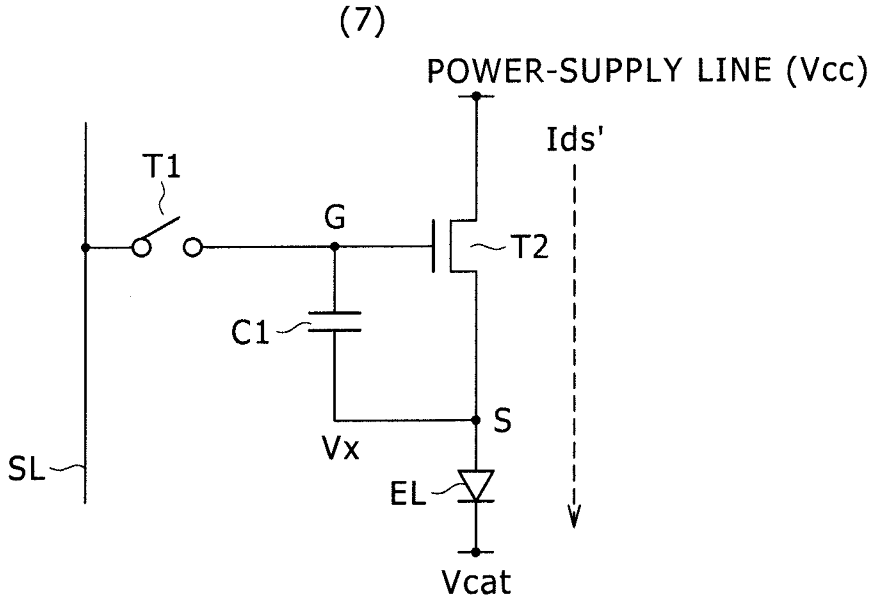

In the last wait period (5*a*) immediately lagging behind the last threshold-voltage compensation period (5), the input signal asserted on signal line SL is changed from the reference electric potential Vofs to the video-signal electric potential Vsig. Then, the signal sampling transistor T1 is put in a turned-on state in order to make a transition from the last wait period (5*a*) to the period (6) allocated to a signal write process and a mobility compensation process as shown in FIG. 6F. As described earlier, the video-signal electric potential Vsig is the electric potential of a voltage representing a gradation. Since the signal sampling transistor T1 has been put in a turned-on state, the video-signal electric potential Vsig is supplied to the gate electrode G of the device driving transistor T2 by way of the signal sampling transistor T1. Since the power-supply voltage asserted on the power-supply line DS is sustained at the high electric potential Vcc, the drain-source current Ids is still flowing from the power-supply line DS to the device driving transistor T2. However, the current flowing from the power-supply line DS to the device driving transistor T2 does not proceed to the light emitting device EL as long as a relation Vel≤(Vcat+Vthel) is satisfied. In the relation, reference notation Vel denotes a voltage applied to the anode electrode of the light emitting device EL, reference notation Vcat denotes a cathode voltage applied to the cathode electrode of the light emitting device EL and reference notation Vthel denotes the threshold voltage of the light emitting device EL. Since the light emitting device EL is put in a turned-off state because the relation Vel≤(Vcat+Vthel) is satisfied, the current flowing from the power-supply line DS to the device driving transistor T2 is mostly used for electrically charging the signal holding capacitor C1 and the parasitic capacitor Cel of the equivalent circuit. Thus, during the period (6) allocated to a signal write process and a mobility compensation process, the voltage Vel applied to the anode electrode of the light emitting device EL (that is, the source electric potential Vs appearing on the source electrode S of the device driving transistor T2) rises gradually with the lapse of time. When the period (6) is started, the threshold-voltage compensation process of the device driving transistor T2 has been completed. Thus, the drain-source current Ids flowing through the device driving transistor T2 reflects the mobility μ of the device driving transistor T2. To put it more concretely, the larger the value of the mobility μ, the larger the magnitude of the drain-source current Ids and, thus, the higher the speed at which the source electric potential Vs appearing on the source electrode S of the device driving transistor T2 rises with the lapse of time or the larger the mobility compensation quantity ΔV. Conversely, the smaller the value of the mobility μ, the smaller the magnitude of the drain-source current Ids and, thus, the lower the speed at which the source electric potential Vs appearing on the source electrode S of the device driving transistor T2 rises with the lapse of time or the smaller the mobility compensation quantity ΔV. Since the value of the mobility is reflected in the mobility compensation quantity ΔV, the gate-source voltage Vgs appearing between the gate and source electrodes of the device driving transistor T2 decreases during the period (6) to a level which is completely independent of variations in mobility μ.

The period (6) allocated to both a signal write process and a mobility compensation process is ended when the signal sampling transistor T1 is put in a turned-off state in order to sustain the gate-source voltage Vgs appearing between the gate and source electrodes of the device driving transistor T2 at a constant magnitude. Even after the signal write period (6) has been ended, the source electric potential Vs appearing on the source electrode S of a device driving transistor T2 keeps rising till the relation Vel>(Vcat+Vthel) is satisfied, that is, till the magnitude of the anode voltage Vel appearing on the anode electrode of the light emitting device EL becomes greater than the sum of the cathode voltage Vcat appearing on the cathode electrode of the light emitting device EL and the threshold voltage Vthel of the light emitting device EL. As the relation Vel>(Vcat+Vthel) is satisfied, the light emission period (7) is actually started. In the light emission period (7), a drain-source current Ids' is flowing to the light emitting device EL as a driving current for driving the light emitting device EL to emit light in a light emission state shown in the circuit diagram of FIG. 6G. Since the gate-source voltage Vgs appearing between the gate and source electrodes of the device driving transistor T2 is sustained at a constant magnitude as a result of a bootstrap operation based on the coupling effect of the signal holding capacitor C1, the luminance of the light emitted by the light emitting device EL is also fixed. Thus, even if the current-voltage characteristic of the light emitting device EL deteriorates due to an aging phenomenon, the magnitude of the drain-source current Ids' flowing to the light emitting device EL as a driving current for driving the light emitting device EL to emit light in a light emission state is always sustained at a constant value so that the luminance of the light emitted by the light emitting device EL by no means changes.

Figure 7:
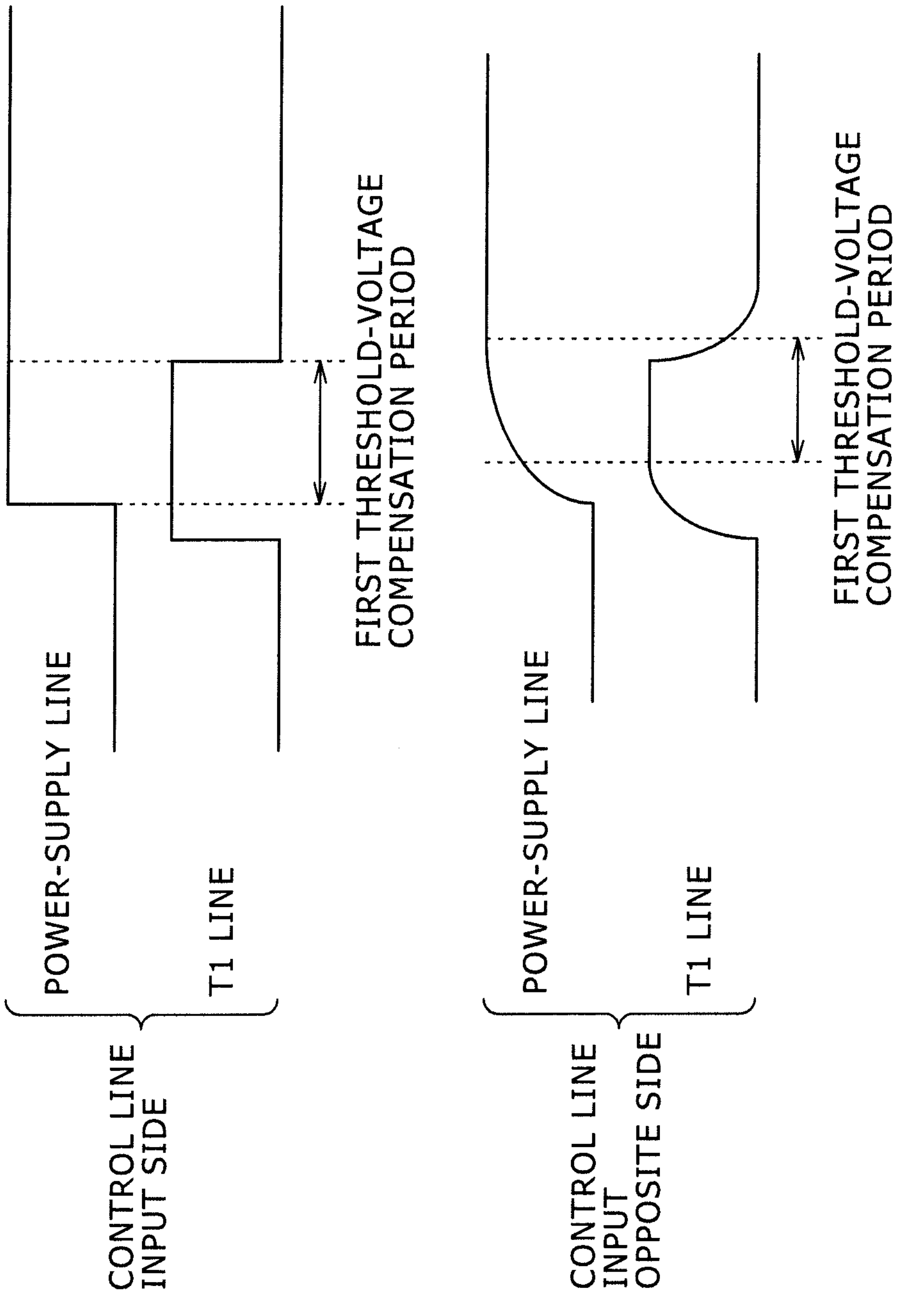
FIG. 7 is a waveform diagram to be referred to in explanation of problems raised by the typical reference display apparatus.

Next, by referring to a waveform diagram of FIG. 7, the following description explains problems raised by the first threshold-voltage compensation process carried out in the typical reference described above. The period allocated to the first threshold-voltage compensation process is prescribed to be started by putting the power-supply line DS in a turned-on state (that is, by changing the power-supply voltage asserted on the power-supply line DS from the low electric potential Vss to the high electric potential Vcc) and to be ended by putting the signal sampling transistor T1 in a turned-off state also as shown in the timing diagram of FIG. 7. As the size of the pixel array section 1 becomes larger and the resolution of the display screen becomes higher, the length of the one horizontal period (1H) becomes short. Since the threshold-voltage compensation period is even shorter than the one horizontal period (1H), in the case of a large size of the pixel array section 1 and a high resolution of the display screen, the effects of transient phenomena occurring on the power-supply line DS and the scan line WS become relatively bigger. That is to say, the waveform of the power-supply voltage appearing on the power-supply line DS on the side close to the drive scanner 5 is different from the waveform of the power-supply voltage appearing on the power-supply line DS on the side far from the drive scanner 5 whereas the waveform of the control signal appearing on the scan line WS on the side close to the write scanner 4 are different from the waveform of the control signal appearing on the scan line WS on the side far from the write scanner 4 resulting in different threshold-voltage compensation periods as shown in the waveform diagram of FIG. 7. In the waveform diagram of FIG. 7, the side close to the write scanner 4 or the drive scanner 5 is referred to as a control line input side whereas the side far from the write scanner 4 or the drive scanner 5 is referred to as a control line input opposite side.

In general, if a threshold-voltage compensation period becomes shorter, the gate-source voltage Vgs appearing between the gate and source electrodes of the device driving transistor T2 becomes inevitably larger at the end of the threshold-voltage compensation period so that the magnitude of the drain-source current Ids flowing through the device driving transistor T2 during a wait period immediately lagging behind the threshold-voltage compensation period also becomes inevitably larger as well. As a result, when the next threshold-voltage compensation period is started by changing the input signal from the video-signal electric potential Vsig to the reference electric potential Vofs, the gate-source voltage Vgs appearing between the gate and source electrodes of the device driving transistor T2 has become undesirably smaller than the threshold voltage Vth of the device driving transistor T2. Thus, the threshold-voltage compensation process cannot be carried out normally during the next threshold-voltage compensation period so that abnormalities such as unevenness and shadings are generated on the display screen.

In order to solve the problems described above, there is provided a driving method whereby, before a threshold-voltage compensation process is ended, the electric potential of the input signal asserted on the signal line SL is changed from the reference electric potential Vofs to an intermediate electric potential Vini, which is a relatively low electric potential even lower than the reference electric potential Vofs, in order to prevent the drain-source current Ids from flowing through the device driving transistor T2 during a wait period between two successive threshold-voltage compensation periods.

By adoption of this driving method, however, the peak of the input signal asserted on the signal line SL is determined by a white signal and the intermediate electric potential Vini so that the horizontal selector 3 must be designed as a scanner good enough for withstanding high voltages. As a result, the manufacturing cost increases so that the driving method is difficult to implement if cost reduction is to be taken into consideration.

The driving method provided by the embodiment of the present invention as explained earlier by referring to the timing diagram of FIG. 3 solves the problems raised by the typical reference. In accordance with the driving method provided by the embodiment as explained earlier, each threshold-voltage compensation period is started by putting the signal sampling transistor T1 in a turned-on state and ended by putting the signal sampling transistor T1 in a turned-off state. It is thus possible to avoid a situation in which the first threshold-voltage compensation period allocated to the first threshold-voltage compensation process becomes short due to the effects of transient phenomena occurring on the power-supply line DS and the scan line WS connected to the signal sampling transistor T1 as is the case with the typical reference described above by referring to the waveform diagram of FIG. 7. That is to say, the threshold-voltage compensation process can be carried out normally. As a result, it is possible to prevent abnormalities such as unevenness and shadings from being generated on the display screen and, hence, to provide a high image quality.

In addition, in accordance with the embodiment of the present invention, the peak of the input signal asserted on the signal line SL is determined by a white signal and the reference electric potential Vofs so that the horizontal selector 3 does not have to be designed as a scanner good enough for withstanding high voltages. As a result, the manufacturing cost can be kept low so that the driving method is not difficult to implement even if cost reduction is to be taken into consideration.

On top of that, in the accordance with the embodiment of the present invention, the light extinction process is carried out by putting the signal sampling transistor T1 in a turned-on state after setting the power-supply voltage asserted on the power-supply line DS at the high electric potential Vcc and setting the input signal asserted on the signal line SL at the reference electric potential Vofs. Thus, the period of sustaining the power-supply voltage asserted on the power-supply line DS at the low electric potential Vss is not dependent on the light emission period and, as a result, the period of applying a reversed bias to the light emitting device EL becomes shorter. Accordingly, the number of generated point defects such as vanishing points can be reduced.

Figure 8:
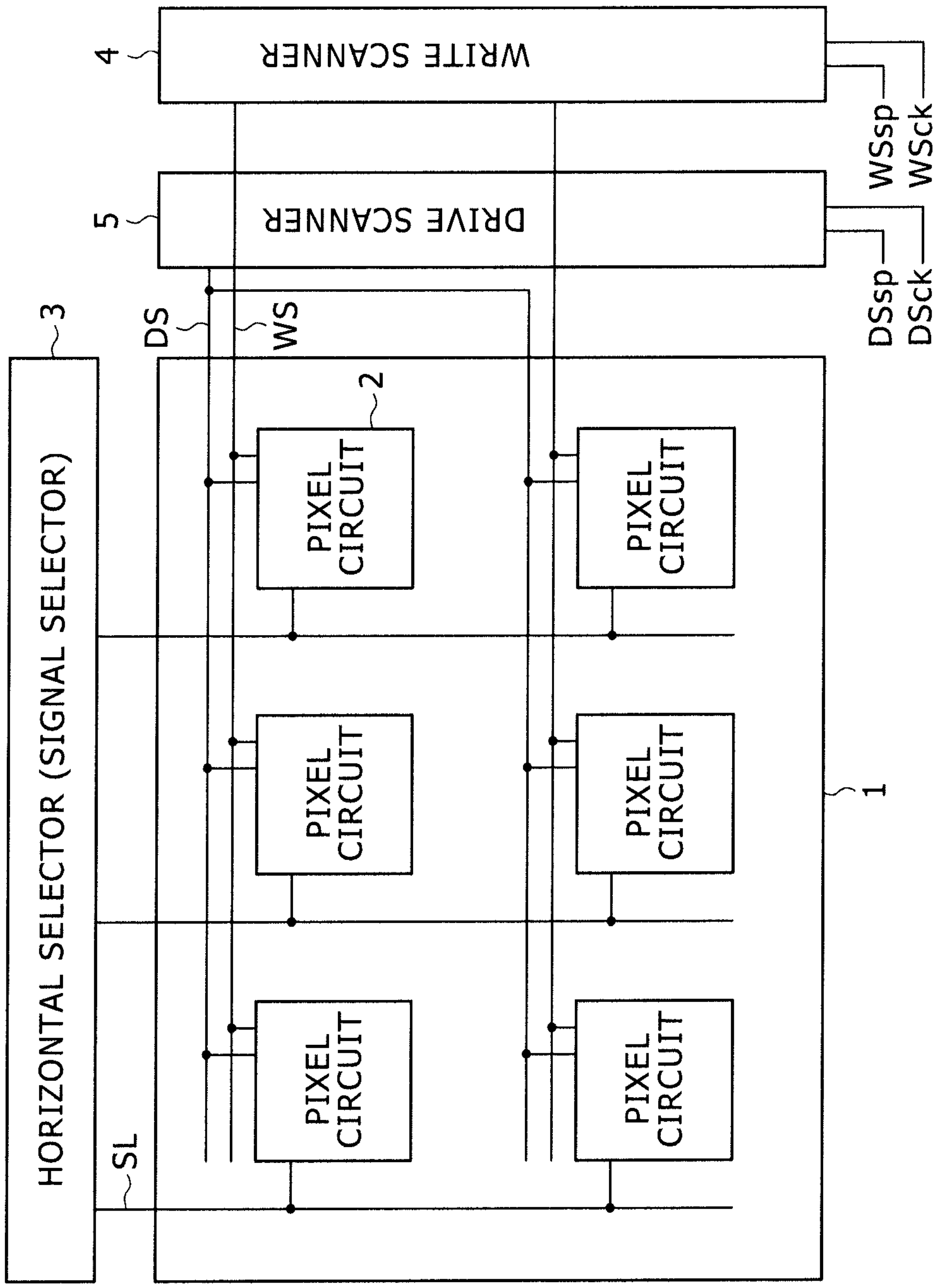
FIG. 8 is a block diagram showing the entire configuration of a display apparatus according to a second embodiment of the present invention.

FIG. 8 is an entire block diagram showing a second embodiment implementing a display apparatus according to the present invention. In order to make the following description easy to understand, in the block diagram of FIG. 8, components identical with their respective counterparts employed in the first embodiment shown in the block diagram of FIG. 1 are denoted by the same reference notations and reference numerals as the counterparts. The second embodiment is different from the first embodiment in that the drive scanner 5 employed in the second embodiment has a configuration different from that of the first embodiment. In the case of the second embodiment shown in the block diagram of FIG. 8, a plurality of adjacent power-supply lines DS, the number of which is determined in advance, are tied to each other to form a group of power-supply lines. The drive scanner 5 switches a power-supply voltage common to adjacent power-supply lines pertaining to the same power-supply line group from the high electric potential Vcc to the low electric potential Vss and vice versa alternately, and sequentially applies the common power-supply voltage to power-supply line groups by shifting the phase of the power-supply voltage from group to group. In this way, the common power-supply voltage is supplied to a power-supply line group at the same phase determined for the group and switched from the high electric potential Vcc to the low electric potential Vss and vice versa alternately. In the case of the second embodiment shown in the block diagram of FIG. 8, two adjacent power-supply lines DS are tied to each other to form a group of power-supply lines. The drive scanner 5 switches a power-supply voltage common to adjacent power-supply lines pertaining to the same power-supply line group from the high electric potential Vcc to the low electric potential Vss and vice versa alternately, and sequentially applies the common power-supply voltage to power-supply line groups by shifting the phase of the power-supply voltage from group to group. In this way, the common power-supply voltage is supplied to a power-supply line group at the same phase determined for the group and switched from the high electric potential Vcc to the low electric potential Vss and vice versa alternately. However, the number of adjacent power-supply lines DS to be tied to each other to form a group of power-supply lines is not limited to two. In general, timings to drive a plurality of power-supply lines DS (or a plurality of stages) pertaining to the same power-supply line group are made common to the power-supply lines DS.

Basically, the drive scanner 5 is configured to employ a shift register and output buffers each connected to one of stages of the shift register. The shift register operates in accordance with a clock signal DSck received from an external source. The shift register also receives start pulses DSsp supplied by an external source sequentially. Receiving the start pulses DSsp, the shift register generates a control signal for switching the power-supply voltage. The output buffer provided for a stage of the shift register outputs the power-supply voltage switched from the high electric potential Vcc to the low electric potential Vss and vice versa to the power-supply lines DS. In the present embodiment, timings to drive a plurality of power-supply lines DS (or a plurality of stages) pertaining to the same power-supply line group are made common to the power-supply lines DS so as to make the output buffer provided for a stage of the shift register common to the power-supply lines DS pertaining to the same power-supply line group which corresponds to the stage. Thus, the number of output buffers can be reduced. Since each of the output buffers outputs a power-supply voltage to a plurality of power-supply lines DS pertaining to the same power-supply line group, however, the output buffer is required to have a capability of supplying a large current to the power-supply lines DS. In consequence, the size of the output buffer increases. However, the number of such output buffers can be reduced so as to decrease the circuit size of the driving sections surrounding the pixel array section 1. As a result, the manufacturing cost can be reduced and a high yield can be resulted in. In the case of the typical implementation according to the second embodiment shown in the block diagram of FIG. 8 for example, one output buffer is shared by two adjacent power-supply lines DS pertaining to the same power-supply line group. Thus, the number of all output buffers is half the number of output buffers employed in the first embodiment. If ten adjacent power-supply lines are tied to each other to share common control timings in the same power-supply line group, the number of all output buffers employed in the second embodiment can be reduced to one-tenth (1/10) of the number of output buffers employed in the first embodiment.

Figure 9:
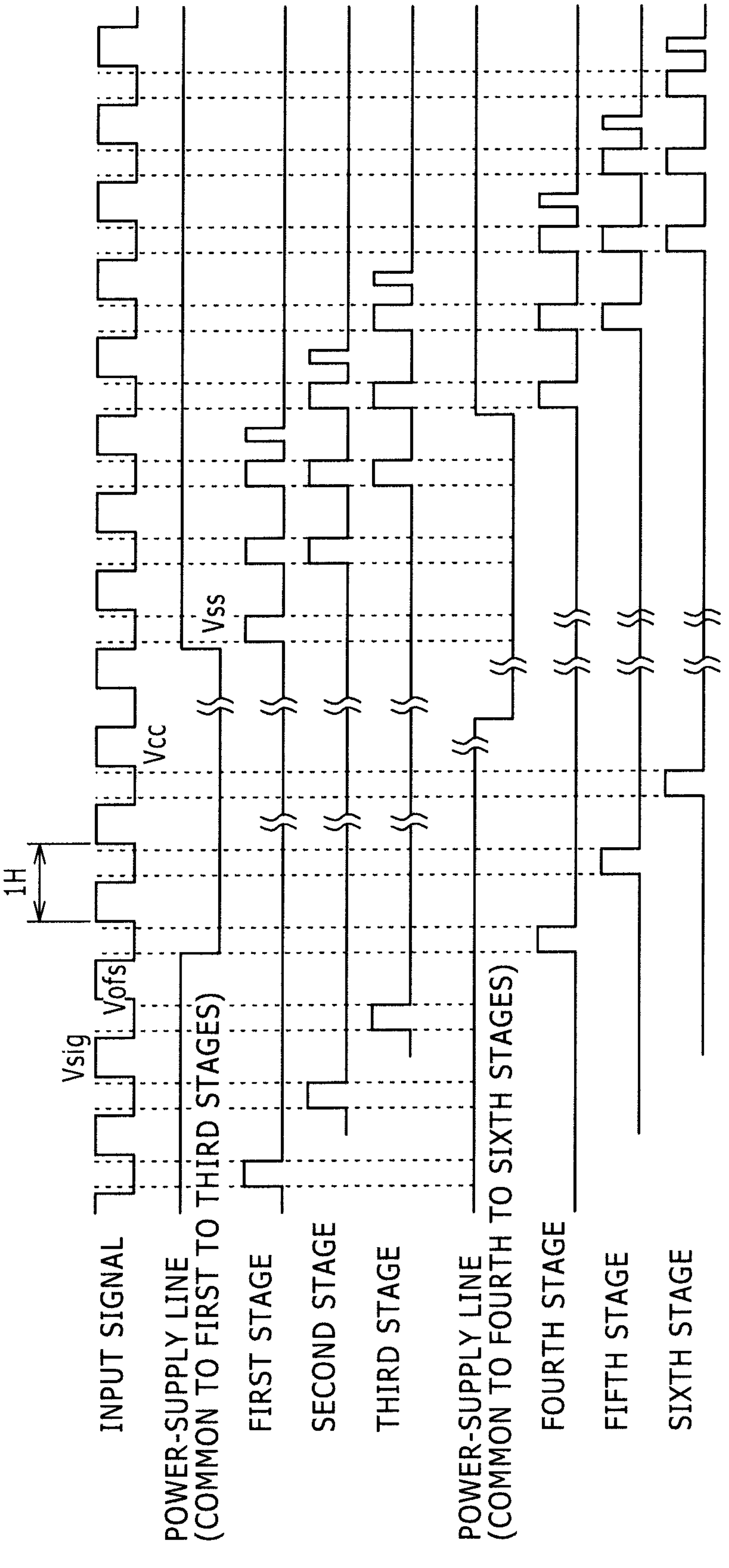
FIG. 9 is a timing diagram showing a timing chart of each signal relevant to a driving method for driving the pixel circuit employed in the display apparatus according to the second embodiment.

FIG. 9 is a timing diagram showing explanatory timing charts referred to in description of operations carried out by the second embodiment shown in the block diagram of FIG. 8. It is to be noted that, the timing charts of the timing diagram are timing charts for a driving method applied to a configuration in which three adjacent power-supply lines are tied to each other to form a power-supply line group.

The top timing chart shown in the timing diagram of FIG. 9 is the timing chart of the input signal (or the driving signal) asserted on the signal line SL as a signal changing from the video-signal electric potential Vsig to the reference electric potential Vofs and vice versa within one horizontal scan period 1H. The second timing chart from the top is the timing chart of the power-supply voltage asserted on the power-supply line DS as a voltage changing from the high electric potential Vcc to the low electric potential Vss and vice versa. This second timing chart from the top is common to three power-supply lines DS pertaining to a power-supply line group. In the case of the timing diagram of FIG. 9, the second timing chart from the top is common to three power-supply lines DS associated with scan lines WS provided at the first to third stages on the first to third matrix rows respectively. The three timing charts beneath the second timing chart from the top are the timing charts of control signals (or control pulses) appearing on the scan lines WS provided at the first to third stages. By the same token, the three bottom timing charts are the timing charts of control signals (or control pulses) appearing on scan lines WS provided at the fourth to sixth stages. Each of the control pulses also starts a threshold-voltage compensation process as shown in the timing diagram of FIG. 3. The control pulses are described in detail as follows. To begin with, the input signal (or the driving signal) asserted on the signal line SL changes from the video-signal electric potential Vsig to the reference electric potential Vofs and vice versa alternately at a frequency corresponding to a period of 1H as shown in the top timing chart. As shown by the second timing chart from the top, the power-supply voltage common to the three power-supply lines DS associated with scan lines WS provided at the first to third stages changes from the high electric potential Vcc to the low electric potential Vss and is then restored from the low electric potential Vss back to the high electric potential Vcc. With the input signal on the signal line SL set at the reference electric potential Vofs and the power-supply voltage on the power-supply line DS set at the high electric potential Vcc, first of all, the first control pulse is asserted on the scan line WS provided at the first stage in order to carry out a light extinction process of making a transition from a no-light emission state to a light emission state in the pixel circuit 2 connected to the scan line WS. Then, the second to fourth control pulses are asserted consecutively on the scan line WS in order to initiate the first to third threshold-voltage compensation processes respectively so that the first to third threshold-voltage compensation processes are carried out sequentially in three successive threshold-voltage compensation periods. Finally, the fifth control pulse is asserted on the scan line WS in order to carry out the signal write process of storing the video-signal electric potential Vsig in the signal holding capacitor C1 employed in the pixel circuit 2 and the mobility compensation process.

By the same token, the first to fifth control pulses are also asserted sequentially on the scan line WS provided at the second stage by shifting the phases of the pulses from the phases for the first stage by 1H in order to carry out the light extinction process, the first to third threshold-voltage compensation processes, the signal write process and the mobility compensation process in the same way as the first stage. Likewise, the first to fifth control pulses are also asserted sequentially on the scan line WS provided at the third stage by shifting the phases of the pulses from the phases for the second stage by 1H in order to carry out the light extinction process, the first to third threshold-voltage compensation processes, the signal write process and the mobility compensation process in a way similar to the first and second stages.

Then, as the sequence of such operations proceeds to the fourth to sixth stages, the drive scanner 5 changes the power-supply voltage common to the three power-supply lines DS associated with scan lines WS provided at the fourth to sixth stages from the high electric potential Vcc to the low electric potential Vss and then restores the power-supply voltage from the low electric potential Vss back to the high electric potential Vcc. The drive scanner 5 changes the power-supply voltage in a way similar to the first to third stages at a phase shifted from that used in the first to third stages. In addition, the five control pulses are asserted sequentially on each of the scan line WS provided at the fourth to sixth stages in the same way as the first to third stages.

As is obvious from the above description, the second embodiment controls the electric potential of power-supply voltage with a timing common to adjacent power-supply lines provided at three stages. By adopting such a driving method, the number of outputs generated by the drive scanner 5 can be reduced. In the case of the typical driving method explained above by referring to the timing diagram of FIG. 9, the number of outputs generated by the drive scanner 5 can be reduced to one-third (1/3). Thus, the cost can be lowered.

It is to be noted that, in the case of the second embodiment, the period between the restoration of the power-supply voltage from the low electric potential Vss back to the high electric potential Vcc and the start of the first threshold-voltage compensation process varies among the first, second and third stages. As described above, if the drain-source current Ids flowing through the device driving transistor T2 following a change of the power-supply voltage from the high electric potential Vcc to the low electric potential Vss is small, that is, if the gate-source voltage Vgs appearing between the gate and source electrodes of the device driving transistor T2 following a change of the power-supply voltage from the high electric potential Vcc to the low electric potential Vss is small, the source electric potential Vs appearing on the source electrode S of the device driving transistor T2 and the gate electric potential Vg appearing on the gate electrode G of the device driving transistor T2 do not rise much so that the threshold-voltage compensation process can be carried out normally at each of the stages.

Figure 10:
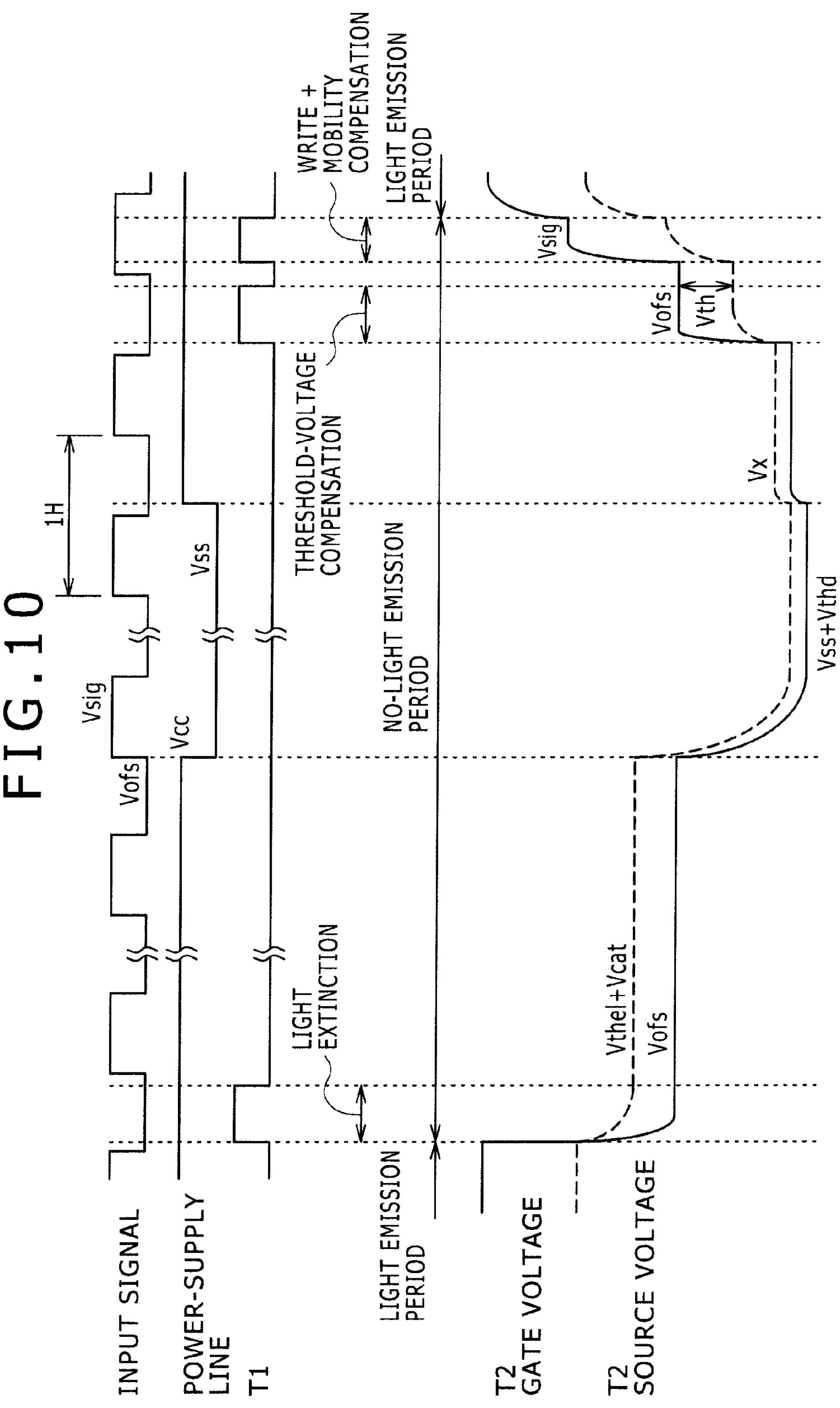
FIG. 10 is a timing diagram showing a timing chart of each signal relevant to a driving method for driving the pixel circuit employed in the display apparatus according to the first embodiment in a state with no problem.

Next, a third embodiment implementing a display apparatus according to the present invention is explained. The third embodiment is provided to serve as an improved version of the first and second embodiments. In order to make the following description easy to understand, before the third embodiment is explained, the description begins with explanation of portions included in the first and second embodiments as portions which need to be improved. FIG. 10 is a timing diagram showing timing charts of signals generated in an ideal operating state of the first embodiment. The light extinction process carried out by the pixel circuit 2 to change the state of the pixel circuit 2 from a light emission state to a no-light emission state is discussed by referring to the timing charts shown in the timing diagram of FIG. 10. As shown in the timing diagram, the light extinction process is carried out by putting the signal sampling transistor T1 in a turned-on state after setting the power-supply voltage asserted on the power-supply line DS at the high electric potential Vcc and setting the input signal asserted on the signal line SL at the reference electric potential Vofs. When the signal sampling transistor T1 is put in a turned-on state, the gate electric potential Vg appearing on the gate electrode G of the device driving transistor T2 changes from a light emission electric potential to the reference electric potential Vofs. Some of the change of the gate electric potential Vg appearing on the gate electrode G of the device driving transistor T2 propagates to the parasitic capacitor Cel by way of the signal holding capacitor C1 and the parasitic gate-source capacitor Cgs. If the voltage Vel appearing on the anode electrode of the light emitting device EL becomes to an electric potential not lower than the sum of the cathode voltage Vcat appearing on the cathode electrode of the light emitting device EL and the threshold voltage Vthel of the light emitting device EL as a result of the propagation of the change, that is, if a relation Vel≥(Vcat+Vthel) is satisfied as a result of the propagation of the change, the anode voltage Vel decreases due to a self electrical discharging process.

Figure 11:
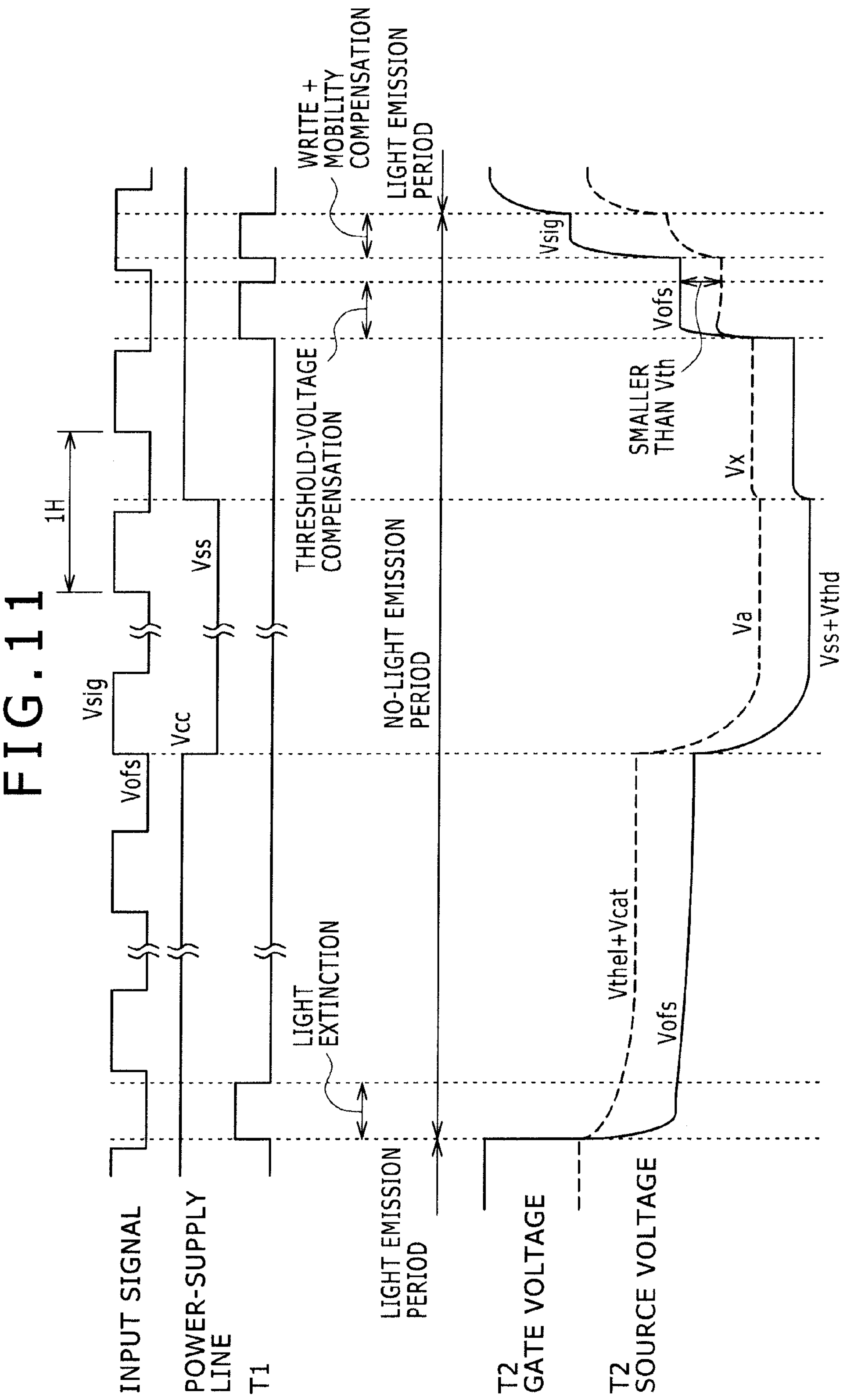
FIG. 11 is a timing diagram showing a timing chart of each signal relevant to a driving method for driving the pixel circuit employed in the display apparatus according to the first embodiment in a state with a problem.

FIG. 11 is a timing diagram showing timing charts of signals generated in an actual operating state of the first embodiment. The signal sampling transistor T1 must be put in a turned-off state before the input signal asserted on the signal line SL is changed from the reference electric potential Vofs to the video-signal electric potential Vsig after the lapse of certain time. In general, the time period of the self electrical discharging process is long because the capacitance of the parasitic capacitor Cel of the light emitting device EL is large. At that time, even if the signal sampling transistor T1 is put in a turned-off state, the anode voltage Vel appearing on the anode electrode of the light emitting device EL continues to decrease provided that the voltage Vel is not lower than the sum of the cathode voltage Vcat appearing on the cathode electrode of the light emitting device EL and the threshold voltage Vthel of the light emitting device EL, that is, if a relation Vel≥(Vcat+Vthel) is satisfied. Then, after the lapse of certain time, the voltage Vel appearing on the anode electrode of the light emitting device EL attains (Vcat+Vthel). When the signal sampling transistor T1 is put in a turned-off state, the gate electrode of the device driving transistor T2 is electrically disconnected from the signal line SL and put in a high-impedance state also referred to as a floating state. Thus, the gate electric potential Vg appearing on the gate electrode G of the device driving transistor T2 also falls gradually with the lapse of time in a manner of being interlocked with the anode voltage Vel appearing on the anode electrode of the light emitting device EL.

Next, a period allocated to a threshold-voltage compensation preparatory process is discussed. In the pixel circuit 2 subjected to the driving method according to the timing diagram shown in FIG. 11, the period allocated to a threshold-voltage compensation preparatory process is started when the power-supply voltage asserted on the power-supply line DS is changed from the high electric potential Vcc to the low electric potential Vss after the signal sampling transistor T1 has been put in a turned-off state. In the threshold-voltage compensation preparatory process, a current is flowing from the anode electrode of the light emitting device EL to the power-supply line DS. In the threshold-voltage compensation preparatory process, the gate electric potential Vg appearing on the gate electrode G of the device driving transistor T2 falls gradually with the lapse of time in manner of being interlocked with the anode voltage Vel appearing on the anode electrode of the light emitting device EL as described above. Here, let reference notation Va denote the voltage appearing on the anode electrode of the light emitting device EL after certain time has lapsed since the start of the threshold-voltage compensation preparatory process. The anode voltage Va is determined by the gate electric potential Vg which appears on the gate electrode G of the device driving transistor T2 right before the power-supply voltage asserted on the power-supply line DS is changed from the high electric potential Vcc to the low electric potential Vss. To be more specific, the larger the gate electric potential Vg which appears on the gate electrode G of the device driving transistor T2 right before the power-supply voltage asserted on the power-supply line DS is changed from the high electric potential Vcc to the low electric potential Vss, the smaller the anode voltage Va (or the larger the absolute value of the anode voltage Va).

In the threshold-voltage compensation preparatory process, since the signal sampling transistor T1 is put in a turned-off state, the anode voltage Vel appearing on the anode electrode of the light emitting device EL decreases in manner of being interlocked with the gate electric potential Vg appearing on the gate electrode G of the device driving transistor T2 with the lapse of time as described above provided that the voltage Vel is not lower than the sum of the cathode voltage Vcat appearing on the cathode electrode of the light emitting device EL and the threshold voltage Vthel of the light emitting device EL, that is, if a relation Vel≥(Vcat+Vthel) is satisfied. At the end of the threshold-voltage compensation preparatory process, the anode voltage Va is undesirably too high so that, in the threshold-voltage compensation preparatory process, the gate-source voltage Vgs appearing between the gate and source electrodes of the device driving transistor T2 has become already smaller than the threshold voltage Vth of the device driving transistor T2. As a result, it is feared that the threshold-voltage compensation process cannot be carried out normally. In a driving method serving as a solution to this problem, the low electric potential Vss is reduced in order to lower the anode voltage Va, that is, in order to increase the absolute value of the anode voltage Va. With this driving method, however, the amplitude of the driving voltage is undesirably increased so that the drive scanner 5 must be designed as a scanner good enough for withstanding high voltages. Thus, this driving method is difficult to implement because of a problem caused by a high cost.

Figure 12:
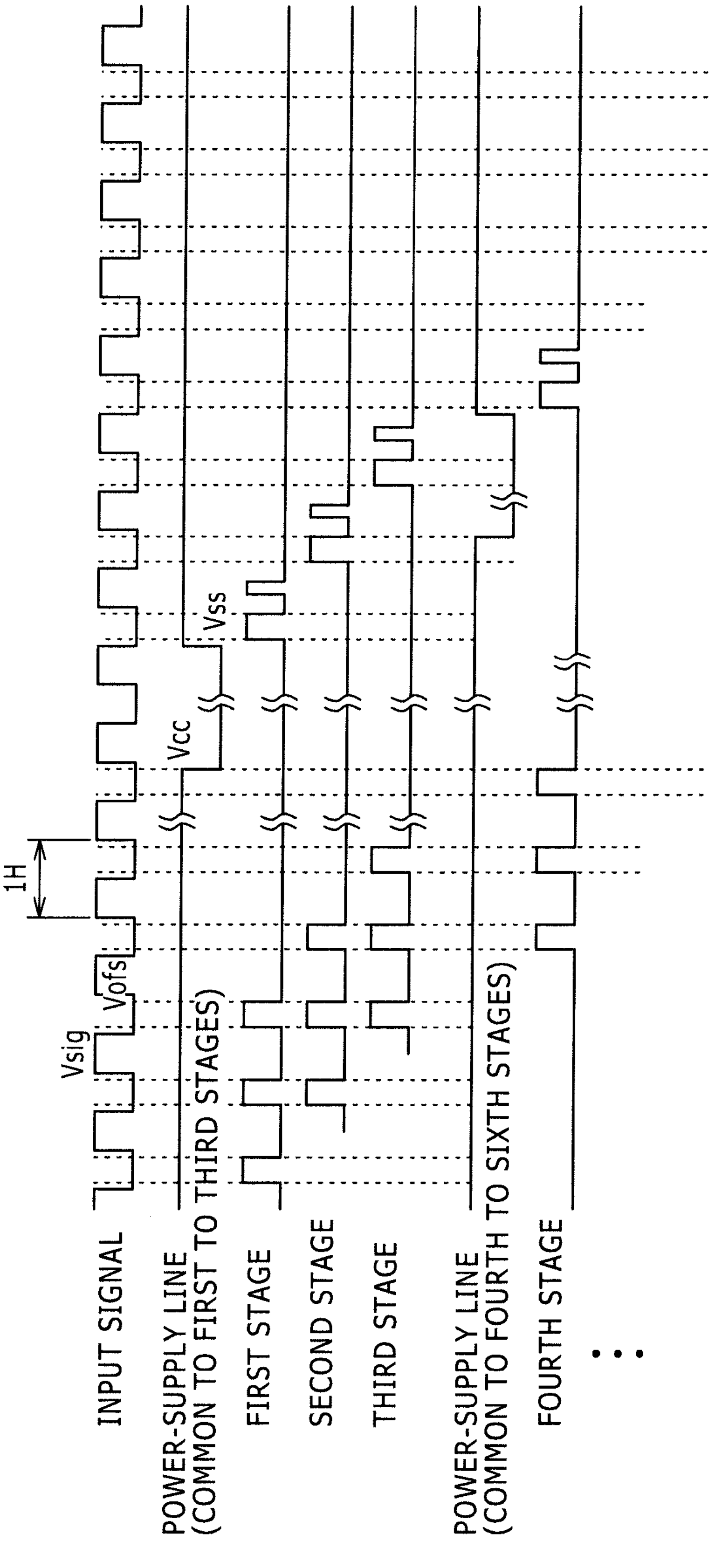
FIG. 12 is a timing diagram showing a timing chart of each signal relevant to a driving method for driving the pixel circuit employed in a display apparatus according to a third embodiment of the present invention.

FIG. 12 is a timing diagram showing timing charts for the third embodiment offering a solution to the problem raised by the first embodiment as explained above by referring to the timing diagram of FIG. 11. As shown in the timing diagram of FIG. 12, in the third embodiment, the light extinction process is carried out repeatedly a plurality of times. That is to say, after the first light extinction process is carried out to change the state of the light emitting device EL from a light emission state to a no-light emission state, at least a second control pulse is asserted on the scan line WS in order to put the signal sampling transistor T1 in a turned-on state while the power-supply voltage asserted on the power-supply line DS is being sustained at the high electric potential Vcc and after the input signal asserted on the signal line SL has been changed from the video-signal electric potential Vsig to the reference electric potential Vofs. The second control pulse triggers an additional light extinction process. In the typical control method implemented by the third embodiment as shown in the timing diagram of FIG. 12, three control pulses are applied to the gate electrode of the signal sampling transistor T1 successively in a row to carry out three light extinction processes respectively. As a result, in the case of the third embodiment, the light extinction process is carried out repeatedly three times. The first light extinction process is the true light extinction process basically for changing the state of the light emitting device EL from a light emission state to a no-light emission state. Each of the second and third light extinction processes is an additional process carried out in order to stabilize the threshold-voltage compensation process to be carried out later on.

In the case of the third embodiment, the write scanner 4 sequentially applies the consecutive control pulses on the scan line WS at intervals each corresponding to a horizontal period 1H. In accordance with the control pulses applied to the gate electrode of the signal sampling transistor T1 at intervals of 1H, the true light extinction process and the additional light extinction processes are carried out. Thus, in the case of the third embodiment, the true light extinction process and the additional light extinction processes are also carried out at intervals of 1H. However, implementations of the driving method according to the third embodiment of the present invention are by no means limited to the control method having an interval of 1H. For example, the true light extinction process and the additional light extinction processes can also be carried out at intervals of several Hs.

In the same way as the second embodiment, also in case of the third embodiment, every three adjacent power-supply lines are collectively tied to each other to form a group. The drive scanner 5 switches a power-supply voltage common to three adjacent power-supply lines pertaining to the same power-supply line group from the high electric potential Vcc to the low electric potential Vss and vice versa alternately, and sequentially applies the common power-supply voltage to power-supply line groups by shifting the phase of the power-supply voltage from group to group. In this way, the common power-supply voltage is supplied to a power-supply line group at the same phase determined for the group and switched from the high electric potential to the low electric potential and vice versa alternately.

Figure 13:
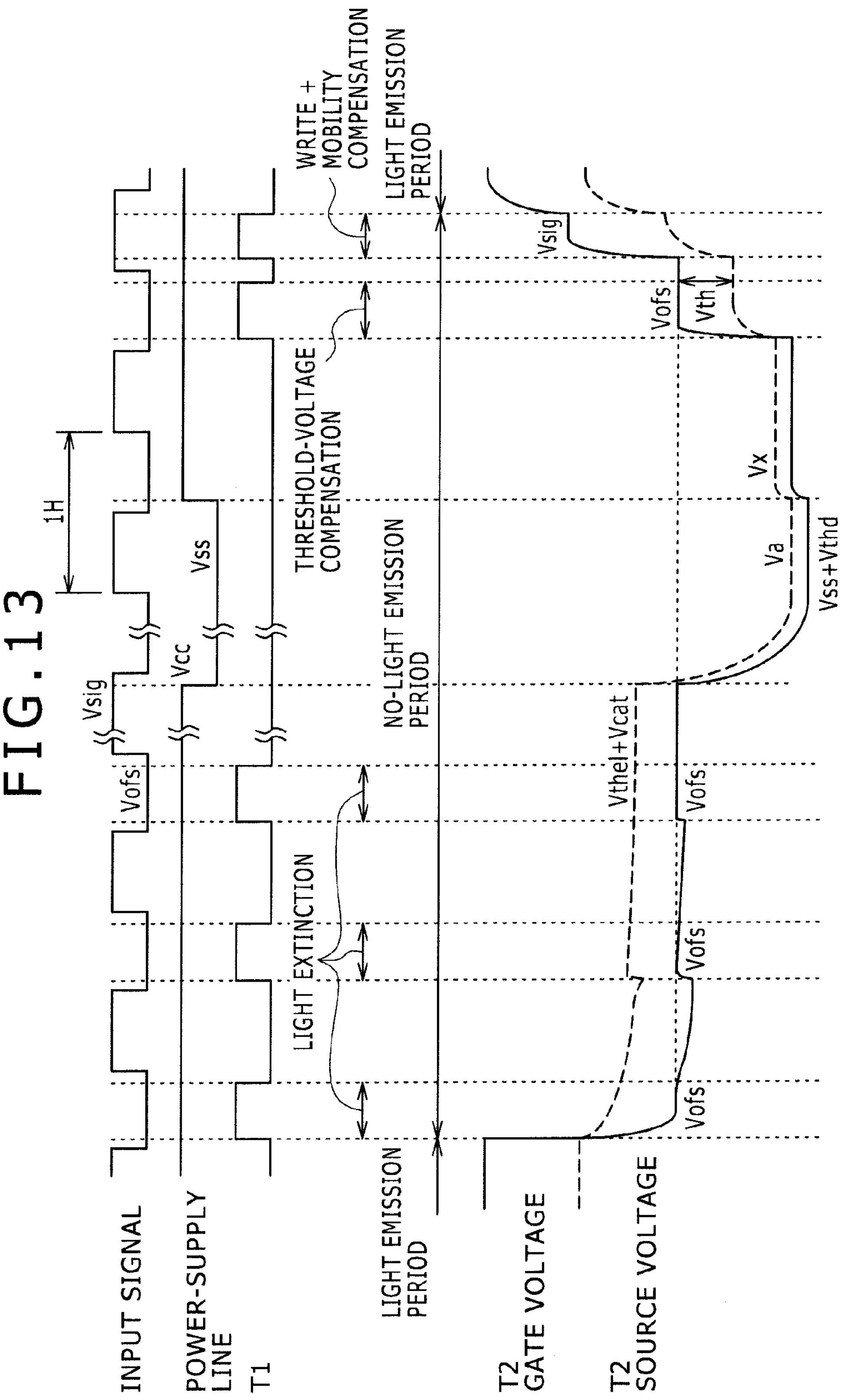
FIG. 13 is a timing diagram showing timing charts for one stage as timing charts of signals each relevant to the driving method for driving the pixel circuit employed in the display apparatus according to the third embodiment.

FIG. 13 is a timing diagram showing timing charts of the third embodiment in the same way as the timing diagram of FIG. 12 except that a timing chart only of a scan line WS provided at one stage is shown and timing charts of the gate electric potential Vg appearing on the gate electrode G of the device driving transistor T2 and the source electric potential Vs appearing on the source electrode S of the device driving transistor T2 are also given. The timing charts of the gate electric potential Vg and the source electric potential Vs are also shown on a common time axis along with the timing charts of the input signal asserted on the signal line SL, the power-supply voltage asserted on the power-supply line DS and the control signal asserted on the scan line WS in order to make the following description easy to understand. It is to be noted that the source electric potential Vs appearing on the source electrode S of the device driving transistor T2 is no other than the anode voltage Vel appearing on the anode electrode of the light emitting device EL.

Even if the signal sampling transistor T1 is put in a turned-off state after the execution of the first light extinction process, the anode voltage Vel appearing on the anode electrode of the light emitting device EL continues to decrease in manner of being interlocked with the gate electric potential Vg appearing on the gate electrode G of the device driving transistor T2 with the lapse of time provided that the voltage Vel is not lower than the sum of the cathode voltage Vcat appearing on the cathode electrode of the light emitting device EL and the threshold voltage Vthel of the light emitting device EL. In this state, with the input signal on the signal line SL again set in the reference electric potential Vofs, the signal sampling transistor T1 is put in a turned-on state so that the reference electric potential Vofs is supplied to the gate electrode G of the device driving transistor T2 by way of the signal sampling transistor T1. At that time, a fixed fraction of the change of the gate electric potential Vg appearing on the gate electrode G of the device driving transistor T2 propagates to the anode electrode of the light emitting device EL.

Much like the first light extinction process, in the second light extinction process, the period of sustaining the signal sampling transistor T1 in the turned-on state is the period of supplying the reference electric potential Vofs to the gate electrode G of the device driving transistor T2 by way of the signal sampling transistor T1 in a second light extinction process. The anode voltage Vel appearing on the anode electrode of the light emitting device EL decreases gradually with the lapse of time due to a self electrical discharging process. After the lapse of certain time, when the signal sampling transistor T1 is again put in a turned-off state, the anode voltage Vel appearing on the anode electrode of the light emitting device EL attains an electric potential lower than an electric potential which was attained by the anode voltage Vel when the signal sampling transistor T1 was put in a turned-off state during the first light extinction process. This time, the voltage Vel appearing on the anode electrode of the light emitting device EL more closely approaches the sum of the cathode voltage Vcat appearing on the cathode electrode of the light emitting device EL and the threshold voltage Vthel of the light emitting device EL. By carrying out the light extinction process repeatedly a plurality of times, the anode voltage Vel appearing on the anode electrode of the light emitting device EL decreases gradually with the lapse of time and eventually attains the sum of the cathode voltage Vcat and the threshold voltage Vthel. That is to say, finally, an equation Vel=(Vcat+Vthel) is satisfied.

Thus, when the power-supply voltage asserted on the power-supply line DS is changed from the high electric potential Vcc to the low electric potential Vss in order to start the threshold-voltage compensation preparatory process, the gate electric potential Vg appearing on the gate electrode G of the device driving transistor T2 can be set at the reference electric potential Vofs whereas the anode voltage Va appearing on the anode electrode of the light emitting device EL in the threshold-voltage compensation preparatory process can be reduced, that is, the absolute value of the anode voltage Va can be increased.

Since the anode voltage Va in the threshold-voltage compensation preparatory process can be reduced, the threshold-voltage compensation process can be carried out normally. It is thus possible to give a uniform image quality having neither unevenness nor image cords. In addition, since the threshold-voltage compensation process can be carried out normally, it is not necessary to lower the low electric potential Vss. Thus, the amplitude of the driving voltage is not increased so that the drive scanner 5 does not have to be designed as a scanner good enough for withstanding high voltages. In addition, since a plurality of adjacent power-supply lines DS are treated collectively as a group of power-supply lines DS by making use of a signal common to the power-supply lines DS, the manufacturing cost can be reduced.

Figure 14:
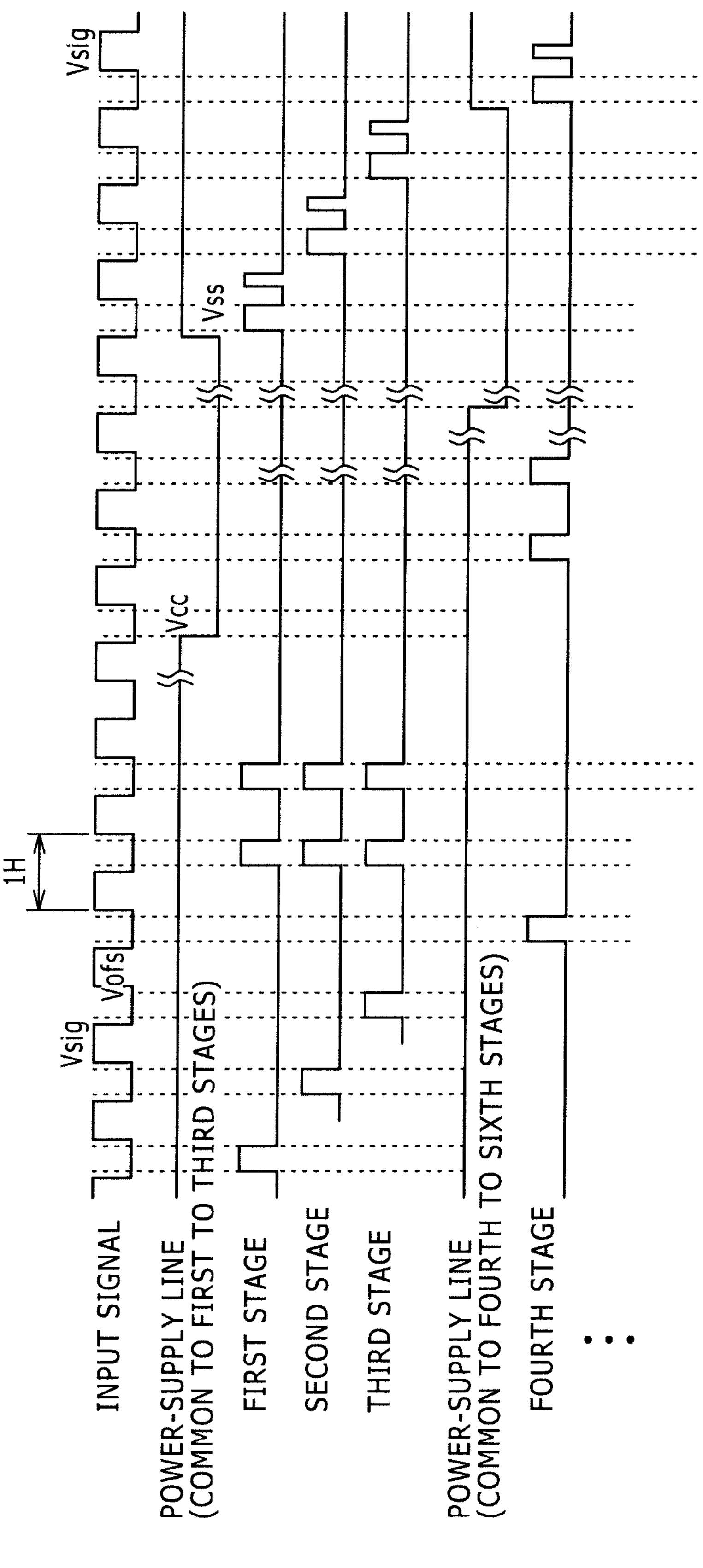
FIG. 14 is a timing diagram showing a timing chart of each signal relevant to a driving method for driving the pixel circuit employed in a display apparatus according to a fourth embodiment of the present invention.

FIG. 14 is a timing diagram showing timing charts for a fourth embodiment implementing a display apparatus provided by the present invention. In order to make the following description easy to understand, in the timing diagram of FIG. 14, elements identical with their respective counterparts shown in the timing diagram of FIG. 12 as the timing diagram for the third embodiment are denoted by the same reference notations and reference numerals as the counterparts. In the case of the fourth embodiment, as shown in the timing diagram of FIG. 14, a predetermined number of adjacent scan lines WS are tied to each other to form a group of scan lines. The write scanner 4 applies a control signal common to adjacent scan lines pertaining to the same scan line group by sequentially shifting the phase from group to group. In the case of the fourth embodiment implementing the driving method according to the timing diagram of FIG. 14, the typical number of adjacent scan lines WS to be treated as a group is three. Much like the third embodiment, the write scanner 4 employed in the fourth embodiment also applies three control pulses on the scan line WS provided at every stage in order to carry out three light extinction processes respectively.

However, the fourth embodiment implementing the driving method according to the timing diagram of FIG. 14 is different from the third embodiment in that, in the case of the fourth embodiment, the second and third light extinction processes for the scan lines WS at the first to third stages are carried out with timings common to the three stages.

Figure 15A:
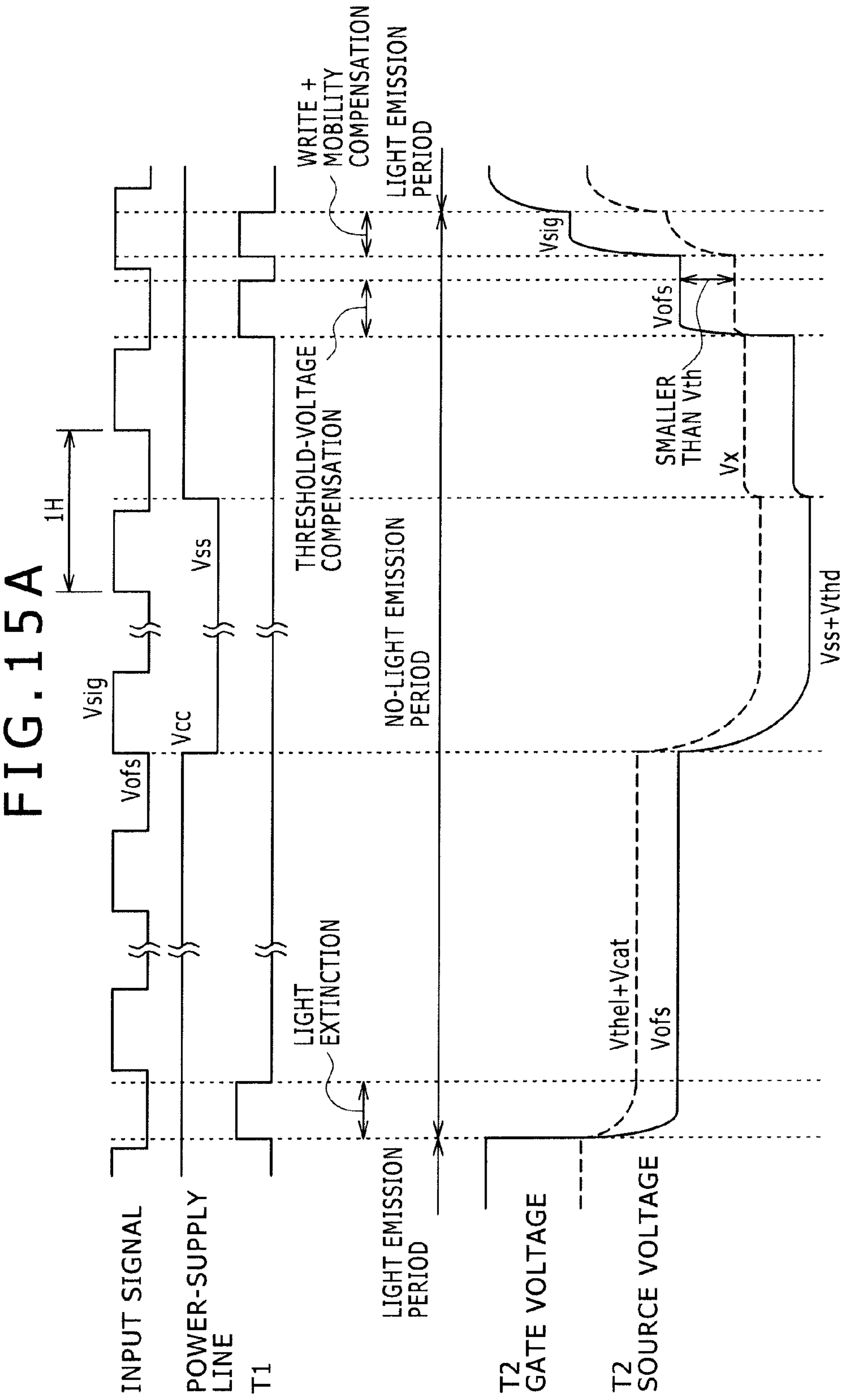
FIG. 15A is a timing diagram showing a timing chart of each signal relevant to a driving method for driving the pixel circuit employed in the display apparatus according to the first embodiment in a state with a problem.

Next, a fifth embodiment implementing a display apparatus provided by the present invention is explained. The fifth embodiment is also obtained to serve as an improved version of the first embodiment. In order to make the following description easy to understand, before the fifth embodiment is explained, by referring to a timing diagram of FIG. 15A, the description begins with brief explanation of portions included in the first embodiment as a portion which need to be improved. It is to be noted that, in order to make the following description simple, the threshold-voltage compensation process is carried out only once. The following description also includes a discussion of a preparatory period allocated to a threshold-voltage compensation preparatory process. The preparatory period is discussed also by referring to the timing diagram of FIG. 15A. In the pixel circuit 2 according to the fifth embodiment, the preparatory period allocated to a threshold-voltage compensation preparatory process is started when the power-supply voltage is changed from the high electric potential Vcc to the low electric potential Vss with the signal sampling transistor T1 already put in a turned-off state. In the preparatory period, a current is flowing from the anode electrode of the light emitting device EL to the power-supply line DS. As described earlier, in the preparatory period, a parasitic capacitor Cp existing between the gate electrode G of the device driving transistor T2 and the power-supply line DS is effective. In the preparatory period, serving as the source electrode S of the device driving transistor T2 is the current terminal connected to the power-supply line DS. When the device driving transistor T2 is operating in a saturated region of this state, a channel is created on the source side so that the capacitance of the parasitic capacitor Cp increases. When the device driving transistor T2 is operating in a saturated region with its current terminal on the power-supply line side serving as the drain electrode of the device driving transistor T2, on the other hand, the channel is not created so that the capacitance of the parasitic capacitor Cp is small.

When the power-supply voltage asserted on the power-supply line DS is changed from the high electric potential Vcc to the low electric potential Vss, the operating region of the device driving transistor T2 is changed by a transition from a turned-off region taking the anode electrode of the light emitting device EL as the current source to a saturated region taking the power-supply line DS as the current source by way of a turned-off region taking the power-supply line DS as the current source. A coupling effect on the load side is introduced to the gate electrode G of the device driving transistor T2 through the parasitic capacitor Cp. If the coupling effect is large, the anode voltage Va appearing on the anode electrode of the light emitting device EL inevitably increases, that is, the absolute of the anode voltage Va unavoidably decreases in the threshold-voltage compensation preparatory process. This is because the anode voltage Va is determined by the gate electric potential Vg which has appeared on the gate electrode G of the device driving transistor T2 right before the power-supply voltage asserted on the power-supply line DS is changed from the high electric potential Vcc to the low electric potential Vss and, if the coupling effect applied to the gate electrode G of the device driving transistor T2 is large, the gate electric potential Vg which has appeared on the gate electrode G of the device driving transistor T2 right before the power-supply voltage asserted on the power-supply line DS is changed from the high electric potential Vcc to the low electric potential Vss, has a small magnitude.

If the anode voltage Va at the end of the threshold-voltage compensation preparatory process is undesirably too high, the gate-source voltage Vgs appearing between the gate and source electrodes of the device driving transistor T2 in the threshold-voltage compensation process becomes already smaller than the threshold voltage Vth of the device driving transistor T2. As a result, it is feared that the threshold-voltage compensation process cannot be carried out normally. In a driving method serving as a solution to this problem, the low electric potential Vss is reduced in order to lower the anode voltage Va, that is, in order to increase the absolute value of the anode voltage Va. With this driving method, however, the amplitude of the driving voltage is undesirably increased so that the drive scanner 5 must be designed as a scanner good enough for withstanding high voltages. Thus, this driving method is difficult to implement because of a problem caused by a high cost.

Figure 15B:
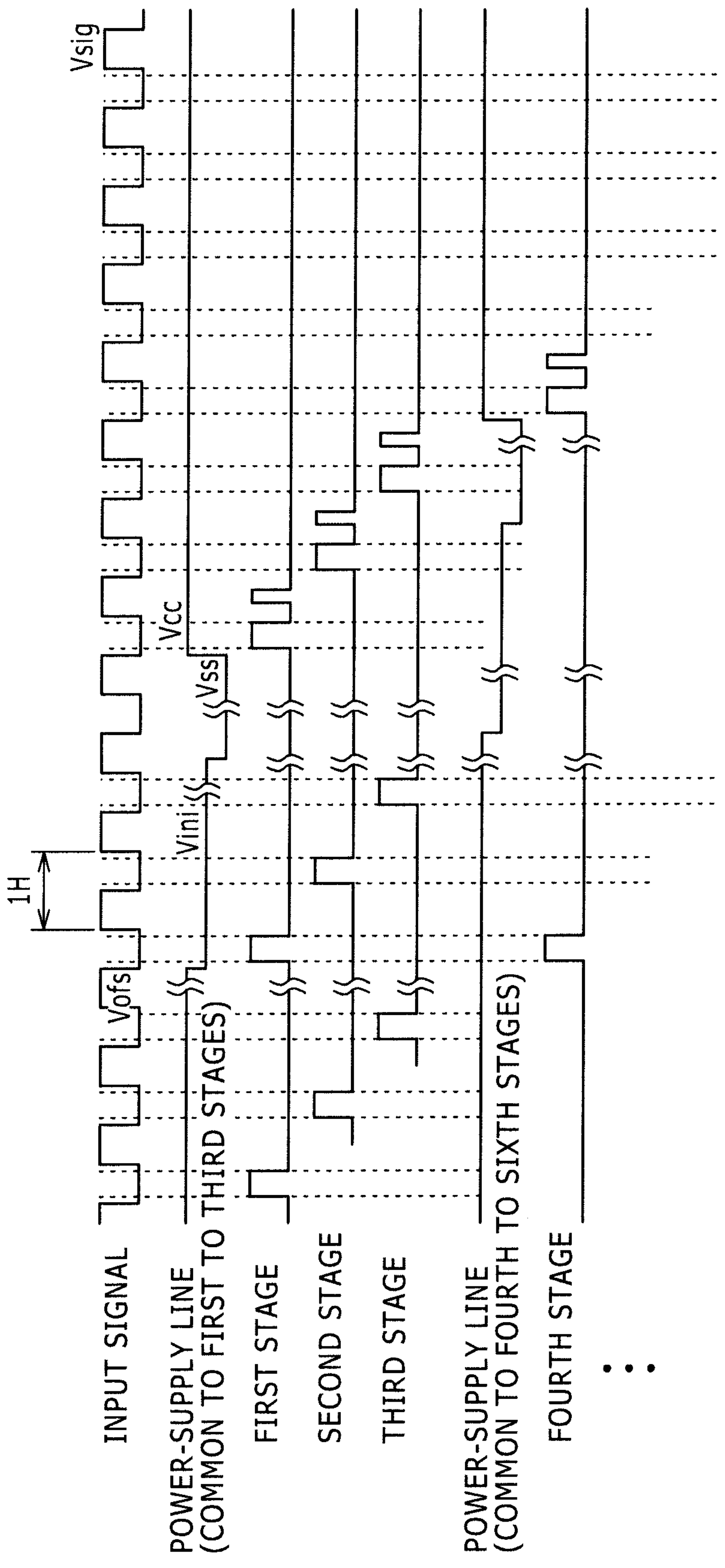
FIG. 15B is a timing diagram showing a timing chart of each signal relevant to a driving method provided for driving the pixel circuit employed in a display apparatus according to a fifth embodiment of the present invention as a driving method for solving the problem explained by referring to the timing diagram of FIG. 15A.

FIG. 15B is a timing diagram showing timing charts of the fifth embodiment. The fifth embodiment offers a solution to the problem raised by the first embodiment as described above. As shown in the timing diagram, in the fifth embodiment, after the light extinction process has been completed and before the threshold-voltage compensation preparatory process to be carried out as a preparation for the threshold-voltage compensation process is started, the drive scanner 5 changes the power-supply voltage asserted on the power-supply line DS from the high electric potential Vcc to a intermediate electric potential Vini between the high electric potential Vcc and the low electric potential Vss. The drive scanner 5 switches a power-supply voltage appearing on the power-supply line DS common to adjacent power-supply lines pertaining to the same power-supply line group from the high electric potential Vcc to the intermediate electric potential Vini, and sequentially applies the common power-supply voltage to power-supply line groups by shifting the phase of the power-supply voltage from group to group. In this way, the power-supply voltage appearing on the common power-supply line DS is supplied to a power-supply line group at the same phase determined for the group and switched from the high electric potential Vcc to the intermediate electric potential Vini. In the fifth embodiment, after the power-supply line DS has been set at the intermediate electric potential Vini, the signal sampling transistor T1 is put in a turned-on state by a control signal in a state of sustaining the signal line SL at the reference electric potential Vofs.

Figure 16:
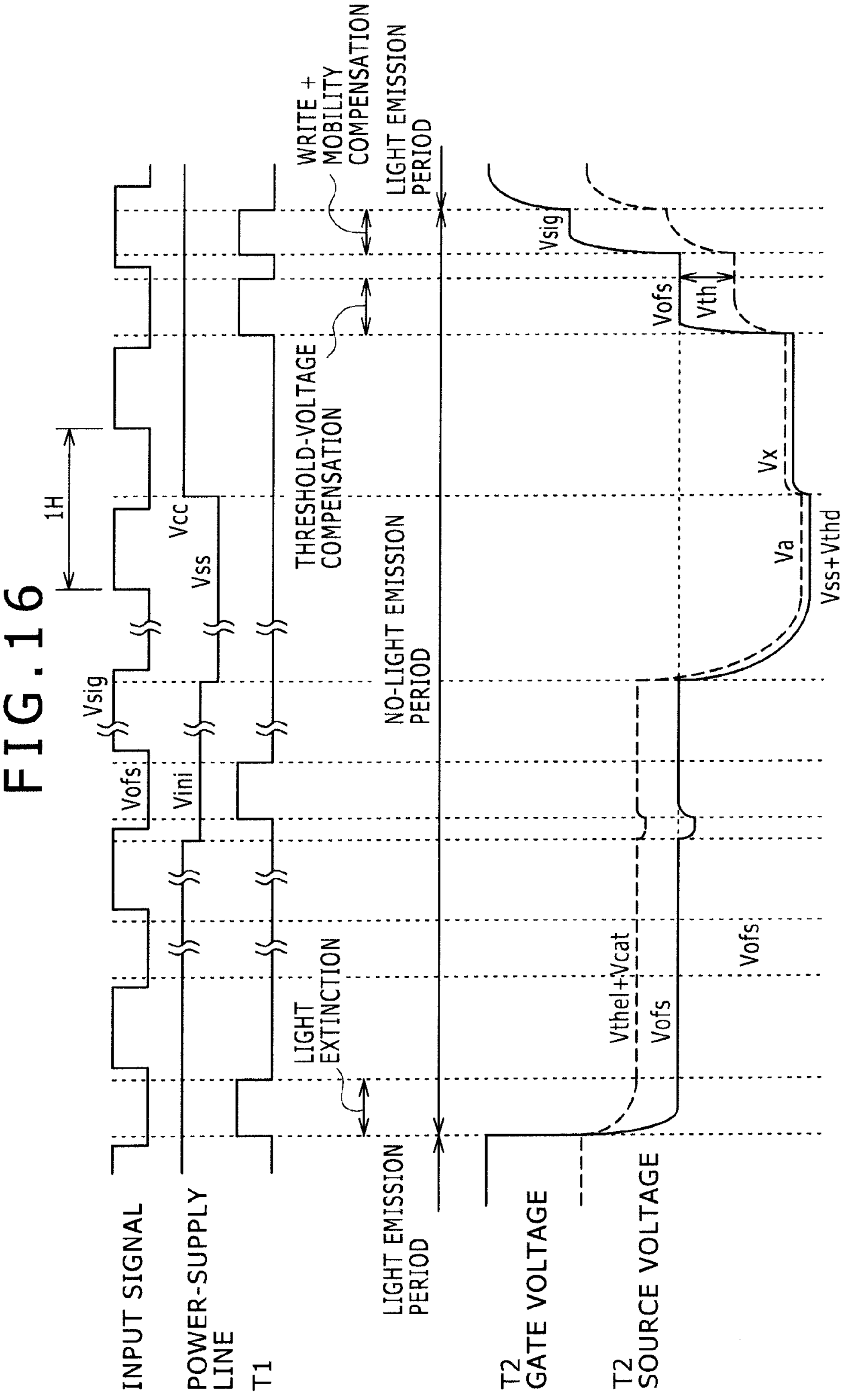
FIG. 16 is a timing diagram showing a timing chart of each signal relevant to a driving method for driving the pixel circuit employed in the display apparatus according to the fifth embodiment.

Next, operations carried out by the fifth embodiment are explained in detail by referring to a timing diagram shown in FIG. 16. FIG. 16 is a timing diagram referred to in description of operations focused on pixel circuits 2 provided on one of the rows of the matrix in the fifth embodiment. For simplified description, the threshold-voltage compensation process is carried out only once.

In the fifth embodiment, after the light emitting device EL has been put in a no-light emission state by putting the signal sampling transistor T1 in a turned-on state, the power-supply voltage is changed f to the intermediate electric potential Vini. Then, the signal sampling transistor T1 is put in a turned-on state again with a timing after the signal line SL has been set at the reference electric potential Vofs. As described above, the intermediate electric potential Vini is an electric potential between the high electric potential Vcc and the low electric potential Vss. After the signal line SL has been set at the reference electric potential Vofs for the first time after the power-supply voltage has been changed to the intermediate electric potential Vini, the signal sampling transistor T1 is put in a turned-on state again as described above in order to set voltages at which the device driving transistor T2 is not operating in a saturated region. That is to say, the reference electric potential Vofs and the intermediate electric potential Vini satisfies a relation (Vofs−Vini)<Vthdmin where reference notation Vthdmin denotes the minimum value of a threshold voltage between the gate electrode G of the device driving transistor T2 and the specific current terminal of the device driving transistor T2.

First of all, in the light extinction process, the gate electric potential Vg of the device driving transistor T2 is lowered to the reference electric potential Vofs whereas the source electric potential Vs of the device driving transistor T2 is lowered to the sum (Vcat+Vthel). At the end of the light extinction process, the signal sampling transistor T1 is put in a turned-off state in order to electrically disconnect the gate electrode G of the device driving transistor T2 from the signal line SL and put the gate electrode G in a floating state. Then, the power-supply voltage asserted on the power-supply line DS is changed from the high electric potential Vcc to the intermediate electric potential Vini. If the intermediate electric potential Vini is a voltage having the magnitude described earlier, the device driving transistor T2 is put in a turned-off state allowing almost no current to flow through the device driving transistor T2. In addition, the change of the power-supply voltage asserted on the power-supply line DS propagates to the gate electrode G of the device driving transistor T2 by way of a capacitor Cp of the device driving transistor T2. The voltage change ΔV propagating from the power-supply line DS to the gate electrode G is expressed in terms of Cp and C0 by Eq. (3) given below. In the equation, reference notation C0 denotes the combined capacitance for the gate electrode G of the device driving transistor T2. Specifically, the combined capacitance C0 is represented by the signal holding capacitor C1, the parasitic gate-source capacitor Cgs and the parasitic capacitor Cel of the light emitting device EL.

$$\Delta V = \frac{Cp}{Cp + C0}(Vcc - Vini) \tag{3}$$

That is to say, the gate electric potential Vg of the device driving transistor T2 decreases by the voltage change ΔV due to the coupling effect provided by the signal holding capacitor C1. Then, after the input signal asserted on the signal line SL has been changed to the reference electric potential Vofs upon the lapse of certain time, the signal sampling transistor T1 is put in a turned-on state again in order to supply the reference electric potential Vofs to the gate electrode G of the device driving transistor T2. When the reference electric potential Vofs is supplied to the gate electrode G of the device driving transistor T2, the source electrode S of the device driving transistor T2 is set at (Vthel+Vcat). In addition, the power-supply voltage has been changed to the intermediate electric potential Vini at that time. The device driving transistor T2 is in a turned-off state, allowing almost no current to flow through the device driving transistor T2 as described above. Thus, the anode voltage Vel remains unchanged.

Then, after the lapse of certain time, the power-supply voltage asserted on the power-supply line DS is changed from the intermediate electric potential Vini to the low electric potential Vss in order to start the threshold-voltage compensation preparatory process. The change of the power-supply voltage asserted on the power-supply line DS causes a coupling quantity ΔV2 to be supplied to the gate electrode G of the device driving transistor T2. The coupling quantity ΔV2 is expressed by Eq. (4) given as follows:

$$\Delta V2 = \frac{Cp}{Cp + C0}(Vini - Vss) \tag{4}$$

Let us think of the fifth embodiment. In the case of the first embodiment, the power-supply voltage asserted on the power-supply line DS is changed from the high electric potential Vcc to the low electric potential Vss in order to start the threshold-voltage compensation preparatory process. The change of the power-supply voltage asserted on the power-supply line DS causes a coupling quantity ΔV0 to be supplied to the gate electrode G of the device driving transistor T2. The coupling quantity ΔV0 is expressed by Eq. (5) given below. In the case of the fifth embodiment, on the other hand, the coupling quantity ΔV2 is expressed by Eq. (4) given above. That is to say, since the coupling quantity ΔV2 applied to the gate electrode G of the device driving transistor T2 in the fifth embodiment can be smaller than the coupling quantity ΔV0 applied to the gate electrode G of the device driving transistor T2 in the first embodiment, the anode voltage Va of the light emitting device EL during the threshold-voltage compensation preparatory process according to the fifth embodiment can be made smaller than that in the first embodiment. That is to say, the absolute value of the anode voltage Va in the fifth embodiment is greater than that in the first embodiment.

$$\Delta V0 = \frac{Cp}{Cp + C0}(Vcc - Vss) \tag{5}$$

Since the anode voltage Va during the threshold-voltage compensation preparatory process according to the fifth embodiment can be made smaller than that in the first embodiment, the threshold-voltage compensation process can be carried out normally. It is thus possible to give a uniform image quality having neither unevenness nor image cords. In addition, since the threshold-voltage compensation process can be carried out normally, it is not necessary to lower the low electric potential Vss. Thus, the drive scanner 5 does not have to be designed as a scanner good enough for withstanding high voltages. On top of that, since a plurality of adjacent power-supply lines DS are treated collectively as a group of power-supply lines DS by making use of a signal common to the power-supply lines DS, the manufacturing cost can be reduced.

In addition, the intermediate electric potential Vini is set at a magnitude which satisfies the aforementioned relation (Vofs−Vini)<Vthdmin for a reason described as follows. When the signal sampling transistor T1 is put in a turned-on state in order to supply the reference electric potential Vofs to the gate electrode G of the device driving transistor T2, if a voltage appearing between the gate electrode G and the power-supply line DS is greater than the threshold voltage between the gate electrode G of the device driving transistor T2 and the power-supply line DS, the voltage appearing on the anode electrode decreases, attaining the voltage asserted on the power-supply line DS after the lapse of certain time. Then, in the course of the threshold-voltage compensation preparatory process, when the power-supply voltage asserted on the power-supply line DS is changed to the high electric potential Vcc, a bootstrap operation raises both the gate electric potential Vg and the source electric potential Vs with the gate-source voltage Vgs sustained at a magnitude to a certain degree. As a result, the threshold-voltage compensation process cannot be carried out normally. It is thus necessary to set the power-supply voltage at an electric potential that prevents the device driving transistor T2 from operating in a saturated region.

In the case of the fifth embodiment, it is not necessary to lower the low electric potential Vss in order to carry out the threshold-voltage compensation process normally. Thus, the drive scanner 5 does not have to be designed as a scanner good enough for withstanding high voltages. In addition, since a plurality of adjacent power-supply lines DS are treated collectively as a group of power-supply lines DS by making use of a signal common to the power-supply lines DS, the manufacturing cost can be reduced.

Figure 17:
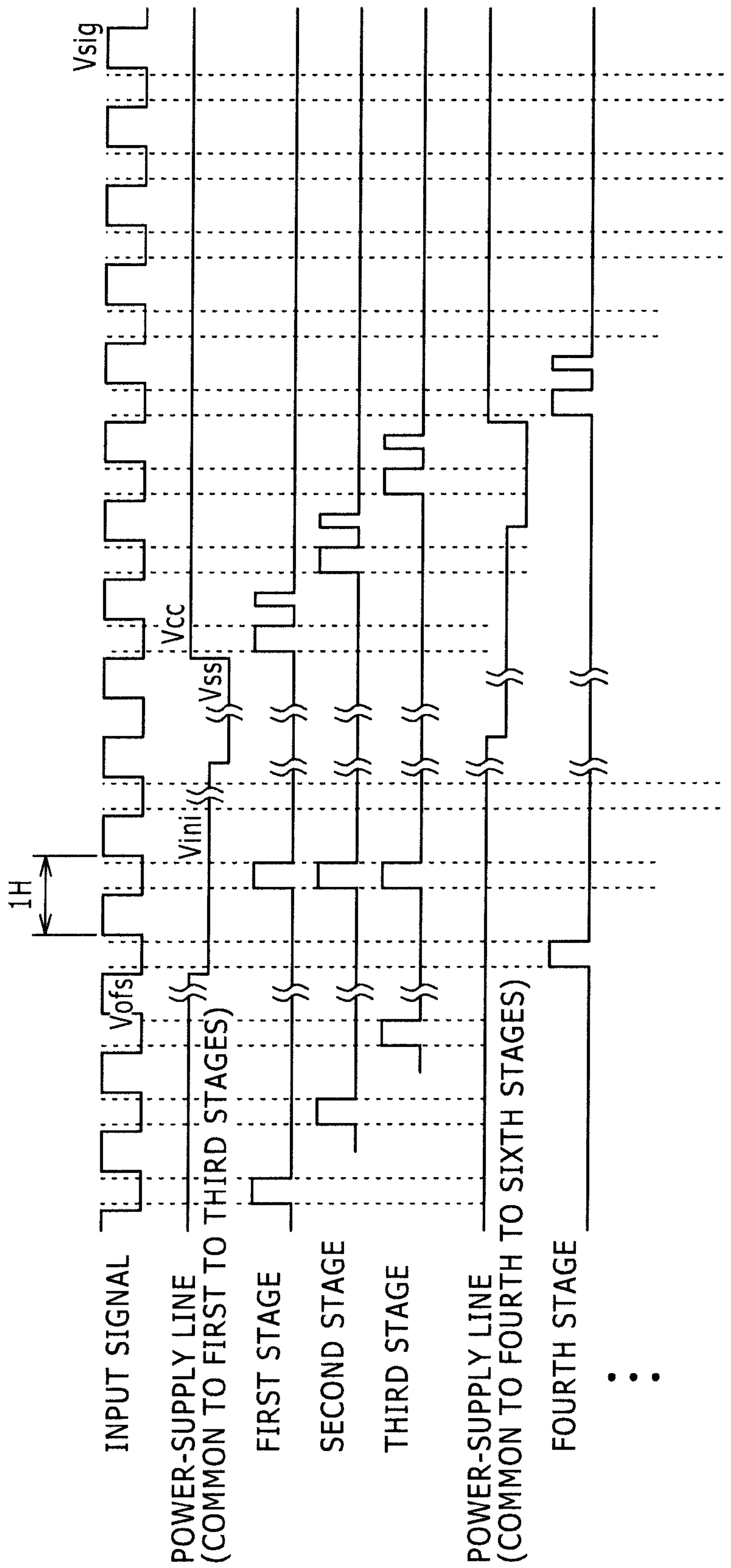
FIG. 17 is a timing diagram showing a timing chart of each signal relevant to a driving method for driving the pixel circuit employed in a display apparatus according to a sixth embodiment of the present invention.

FIG. 17 is a timing diagram showing timing charts of a sixth embodiment implementing a display apparatus provided by the present invention. In order to make the following description easy to understand, in the timing diagram of FIG. 17, elements identical with their respective counterparts shown in the timing diagram of FIG. 15B for the fifth embodiment are denoted by the same reference notations and reference numerals as the counterparts. The timing diagram of FIG. 17 for the sixth embodiment is identical with the timing diagram of FIG. 15B for the fifth embodiment except that, in the case of the timing diagram of FIG. 17, with the power-supply line DS already set at the intermediate electric potential Vini, the signal sampling transistor T1 of each scan line WS laid on the same matrix row as one of the power-supply lines DS pertaining to the same group is turned on with the same timing as each other scan line WS. Also in the case of the sixth embodiment, the power-supply voltage is changed from the high electric potential Vcc to the low electric potential Vss in order to start the threshold-voltage compensation preparatory process. The change of the power-supply voltage causes a coupling quantity to be supplied to the gate electrode G of the device driving transistor T2. Therefore, the anode voltage Va of the light emitting device EL during the threshold-voltage compensation preparatory process according to the sixth embodiment can be made smaller than that in the first embodiment. That is to say, the absolute value of the anode voltage Va in the fifth embodiment is greater than that in the first embodiment. Thus, the manufacturing cost can be reduced. In addition, in the case of the sixth embodiment, with the power-supply line DS already set at the intermediate electric potential Vini, the signal sampling transistor T1 of each scan line WS laid on the same matrix row as one of the power-supply lines DS pertaining to the same group is turned on with the same timing as each other scan line WS, as described above. Thus, the period of sustaining the power-supply voltage asserted on the power-supply line DS at the intermediate electric potential Vini can be made shorter. As a result, the light emission period can be made longer.

Next, a seventh embodiment implementing a display apparatus provided by the present invention is explained. The seventh embodiment is also obtained to serve as an improved version of the first embodiment.

To begin with, the threshold-voltage compensation preparatory process carried out by the first embodiment is revisited. The threshold-voltage compensation preparatory process is started when the power-supply voltage is changed from the high electric potential Vcc to the low electric potential Vss after the signal sampling transistor T1 has been put in a turned-off state. In this case, a current flows from the anode electrode of the light emitting device EL to the power-supply line DS. Here, let reference notation Va denote the voltage appearing on the anode electrode of the light emitting device EL in the threshold-voltage compensation preparatory process. The anode voltage Va is determined by the gate electric potential Vg which appears on the gate electrode G of the device driving transistor T2 right before the power-supply voltage is changed from the high electric potential Vcc to the low electric potential Vss. If the resulting voltage Va is small, that is, if the absolute value of the resulting anode voltage Va is large, the low electric potential Vss can be increased by a difference corresponding to the decrease in anode voltage Va. Thus, the amplitude of the power-supply voltage asserted on the power-supply line DS can be decreased. As a result, the manufacturing cost can be reduced.

In accordance with a conceivable driving method, in order to reduce the anode voltage Va, it is conceivable to increase the reference electric potential Vofs. As described above, the anode voltage Va is determined by the gate electric potential Vg which appears on the gate electrode G of the device driving transistor T2 right before the power-supply voltage is changed from the high electric potential Vcc to the low electric potential Vss. Thus, the anode voltage Va can be reduced by increasing the reference electric potential Vofs. If the reference electric potential Vofs is increased, however, the anode voltage Vel appearing on the anode electrode of the light emitting device EL also increases as well in the signal write process. Thus, in the signal write process, the anode voltage Vel may undesirably exceed the threshold voltage Vthel of the light emitting device EL. If the anode voltage Vel appearing on the anode electrode of the light emitting device EL undesirably exceeds the threshold voltage Vthel of the light emitting device EL in the signal write process, a driving current flows to the light emitting device EL during the signal write process, raising a problem that the mobility compensation process cannot be carried out normally at the same time as the signal write process.

Figure 18:
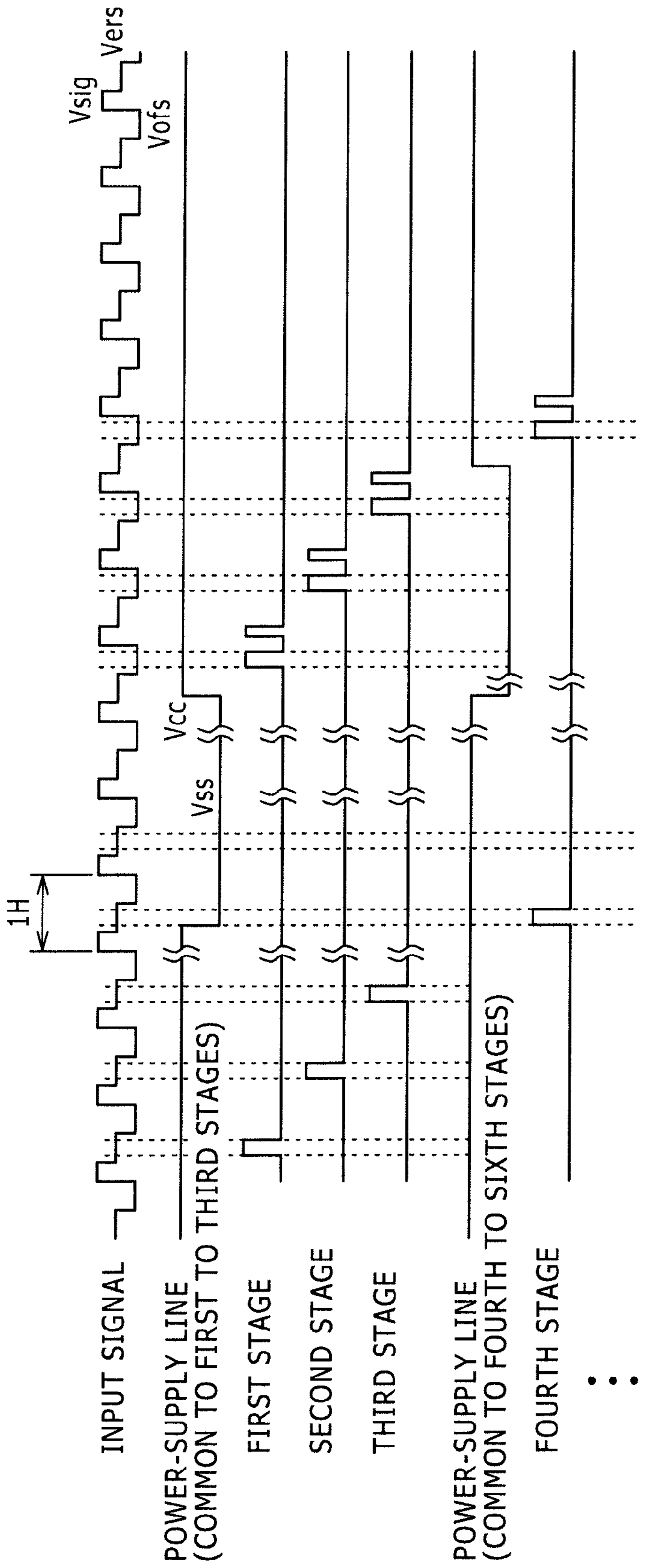
FIG. 18 is a timing diagram showing a timing chart of each signal relevant to a driving method for driving the pixel circuit employed in a display apparatus according to a seventh embodiment of the present invention.

FIG. 18 is a timing diagram showing timing charts of a seventh embodiment implementing a display apparatus provided by the present invention. The seventh embodiment has a feature in which the horizontal selector 3 asserts a first reference electric potential Vers on the signal line SL allocated to light extinction processes. On the other hand, the horizontal selector 3 asserts a second reference electric potential Vofs different from the first reference electric potential Vers on the signal line SL. To put it in detail, the first reference electric potential Vers asserted by the horizontal selector 3 on the signal line SL is higher than the second reference electric potential Vofs. In addition, the first reference electric potential Vers is not greater than the sum (Vcat+Vthel+Vth) where reference notation Vcat denotes the voltage appearing on the cathode electrode of the light emitting device EL, reference notation Vthel denotes the threshold voltage of the light emitting device EL whereas reference notation Vth denotes the threshold voltage of the device driving transistor T2.

Thus, the seventh embodiment has a feature in which the horizontal selector 3 sets the electric potential appearing on the signal line SL at the second reference electric potential Vofs serving as a reference voltage for the threshold-voltage compensation process in the same way as the first embodiment, the video-signal electric potential Vsig representing a gradation in the same way as the first embodiment or the additional first reference electric potential Vers serving as a voltage for the light extinction process. In addition, in accordance with the driving method shown in the timing diagram of FIG. 18, the first reference electric potential Vers, the second reference electric potential Vofs and the video-signal electric potential Vsig are asserted on the signal line SL in a sequence they are enumerated in this sentence in order to sequentially changes the electric potential appearing on the signal line SL. If the period between the end of the threshold-voltage compensation process and the start of the signal write process (and the mobility compensation process) is to be taken into consideration, this sequence of the first reference electric potential Vers, the second reference electric potential Vofs and the video-signal electric potential Vsig is desirable. However, the seventh embodiment is by no means limited to this sequence.

In addition, used as a voltage for the light extinction process, the first reference electric potential Vers must be smaller than the sum (Vcat+Vthel+Vth) where reference notation Vcat denotes the voltage appearing on the cathode electrode of the light emitting device EL, reference notation Vthel denoted the threshold voltage of the light emitting device EL whereas reference notation Vth denoted the threshold voltage of the device driving transistor T2. That is to say, the relation Vers≤(Vcat+Vthel+Vth) must be satisfied. In addition, in the seventh embodiment, the first reference electric potential Vers must be higher than the second reference electric potential Vofs. Thus, as a whole, the relations Vofs<Vers≤(Vcat+Vthel+Vth) must be satisfied.

Figure 19:
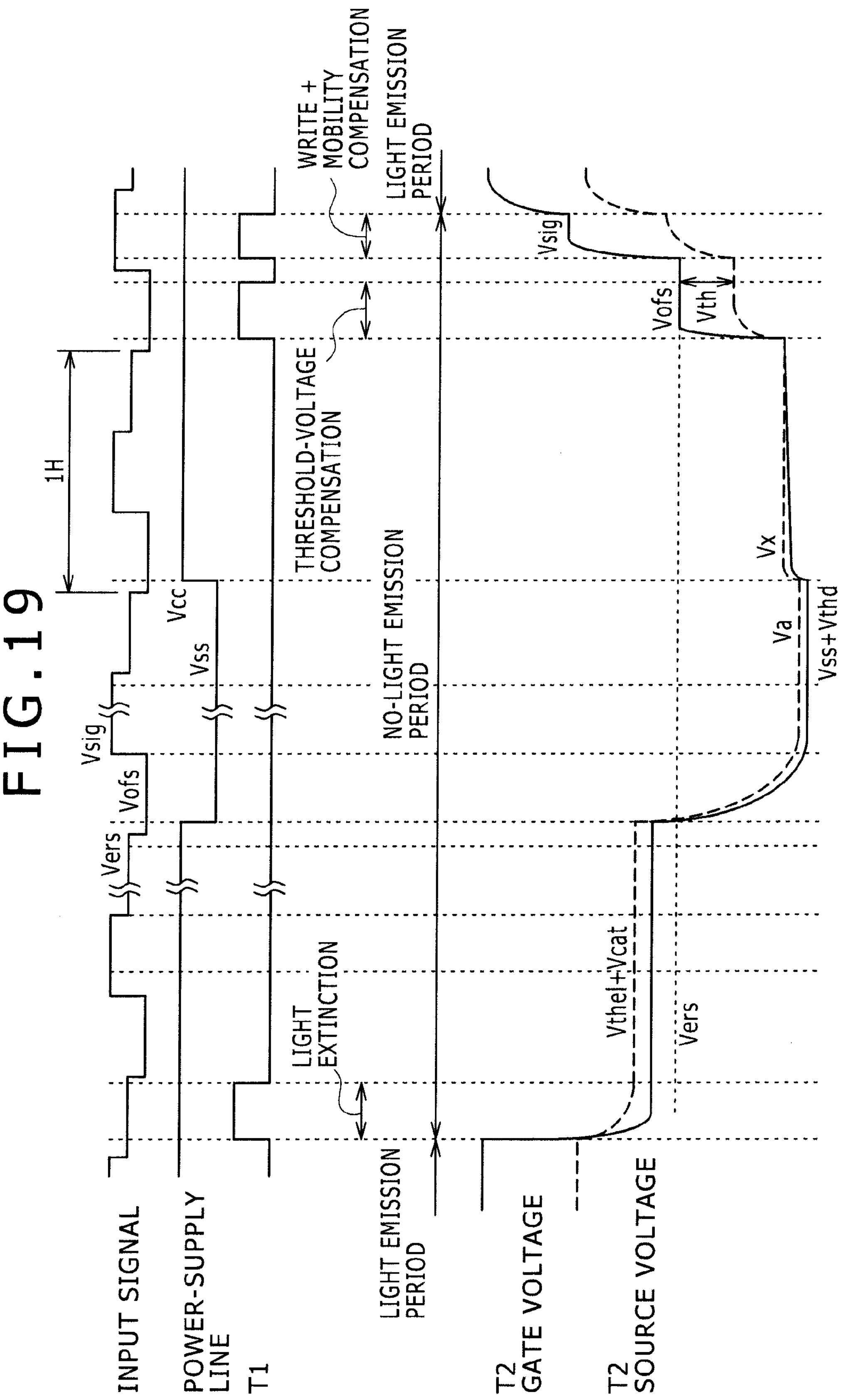
FIG. 19 is another timing diagram showing a timing chart of each signal relevant to a driving method for driving the pixel circuit employed in the display apparatus according to the seventh embodiment.

FIG. 19 is a timing diagram referred to in detailed description of operations carried out by the seventh embodiment. The operations explained in detail by referring to timing charts shown in the timing diagram of FIG. 19 are operations focused on pixel circuits 2 provided on one of the rows of the matrix in the seventh embodiment. The timing diagram of FIG. 19 shows timing charts representing changes of the electric potentials of the input signal appearing on the signal line SL, the power-supply voltage appearing on the power-supply line DS, the control signal appearing on the scan line WS, the gate electric potential Vg appearing on the gate electrode G of the device driving transistor T2 and the source electric potential Vs appearing on the source electrode S of the device driving transistor T2. As described earlier, the control signal appearing on the scan line WS is supplied to the gate electrode of the signal sampling transistor T1.

First of all, the light extinction process is started when the signal sampling transistor T1 is put in a turned-on state, allowing the first reference electric potential Vers to be supplied to the gate electrode G of the device driving transistor T2. As described earlier, the first reference electric potential Vers is lower than the sum of the cathode voltage Vcat and the threshold voltage Vthel of the light emitting device EL and the threshold voltage Vth of the device driving transistor T2. Thus, the first reference electric potential Vers is supplied to the device driving transistor T2 and puts the device driving transistor T2 in a turned-off state which does not allow a driving current to flow. The light extinction process is ended when the signal sampling transistor T1 is put in a turned-off state.

After the lapse of certain time, in a threshold-voltage compensation preparatory process, the power-supply voltage is changed from the high electric potential Vcc to the low electric potential Vss. Since the relation Vers>Vofs is satisfied, the anode voltage Va of the light emitting device EL during the threshold-voltage compensation preparatory process becomes smaller than that of the first embodiment as described earlier. That is to say, the absolute value of the anode voltage Va becomes relatively large. Then, after the lapse of certain time, the power-supply voltage is changed from the low electric potential Vss back to the high electric potential Vcc. Subsequently, after the lapse of certain time, with the signal line SL sustained at the second reference electric potential Vofs, the signal sampling transistor T1 is put in a turned-on state in order to supply the second reference electric potential Vofs to the gate electrode G of the device driving transistor T2. If the gate-source voltage Vgs appearing between the gate and source electrodes of the device driving transistor T2 is increased to a value not smaller than the threshold voltage Vth of the device driving transistor T2 when the signal sampling transistor T1 is put in a turned-on state, the threshold-voltage compensation process can be carried out normally thereafter. Thus, the signal write process and the mobility compensation process can also be carried out as well after the completion of the execution of the threshold-voltage compensation process. Finally, the light emitting device EL is driven to emit light in the light emission state following the signal write process and the mobility compensation process.

Let us think of the seventh embodiment. In the case of the seventh embodiment, the first reference electric potential Vers higher than the second reference electric potential Vofs is used as a light extinction electric potential. As a result, the anode voltage Va appearing on the anode electrode of the light emitting device EL during the threshold-voltage compensation preparatory process can be made smaller than that of the first embodiment as described earlier. That is to say, the absolute value of the anode voltage Va can be made relatively large. Since the anode voltage Va during the threshold-voltage compensation preparatory process can be made relatively small, the threshold-voltage compensation process can be carried out normally. It is thus possible to give a uniform image quality having neither unevenness nor image cords. In addition, since the threshold-voltage compensation process can be carried out normally, it is not necessary to lower the low electric potential Vss. Thus, the drive scanner 5 does not have to be designed as a scanner good enough for withstanding high voltages. On top of that, since a plurality of adjacent power-supply lines DS are treated collectively as a group of power-supply lines DS by making use of a signal common to the power-supply lines DS. As a result, the manufacturing cost can be reduced.

Figure 20:
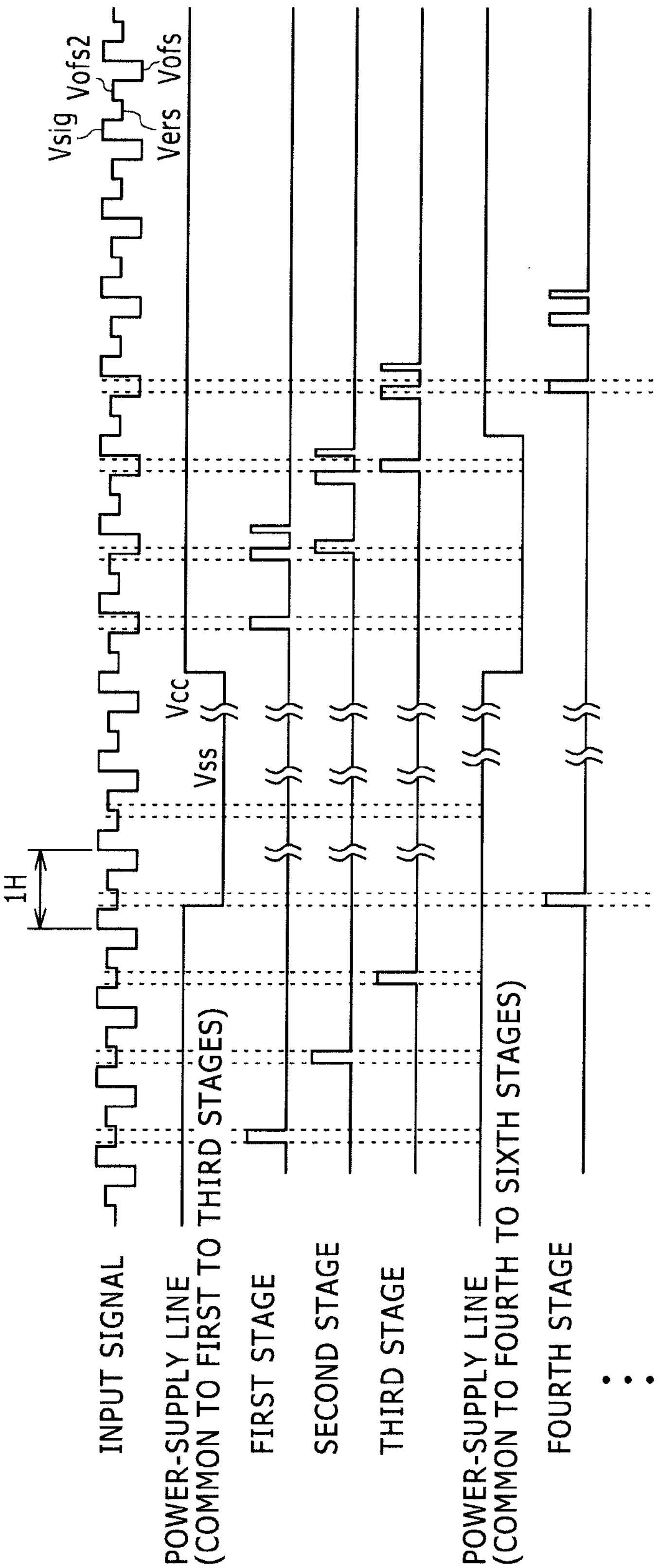
FIG. 20 is a timing diagram showing a timing chart of each signal relevant to a driving method for driving the pixel circuit employed in a display apparatus according to an eighth embodiment of the present invention.

FIG. 20 is a timing diagram showing timing charts of an eighth embodiment implementing a display apparatus provided by the present invention. The eighth embodiment is provided for the purpose of improving the signal write process of storing the video-signal electric potential Vsig in the signal holding capacitor C1. As shown in the timing diagram, the signal write process is started when the signal sampling transistor T1 is put in a turned-on state by making use of a control signal connected to the gate electrode of the signal sampling transistor T1 after the power-supply voltage asserted on the power-supply line DS has been changed from the low electric potential Vss to the high electric potential Vcc and the input signal asserted on the signal line SL has been set at the video-signal electric potential Vsig upon completion of the execution of the threshold-voltage compensation process. At the same time as the signal write process, the mobility compensation process is also carried out as well to compensate the drain-source current Ids flowing through the device driving transistor T2 for variations of the mobility of the device driving transistor T2 from transistor to transistor.

The eighth embodiment has a feature in which the horizontal selector 3 employed in this embodiment asserts a first video-signal electric potential Vofs2 also representing a gradation and a second video-signal electric potential Vsig serving as a second gradation electric potential sequentially and alternately on the signal line SL in addition to the second reference electric potential Vofs and the first reference electric potential Vers. The first video-signal electric potential Vofs2 is supplied to the signal holding capacitor C1 in order to store the first video-signal electric potential Vofs2 in the signal holding capacitor C1 in the so-called first signal write process by way of the signal sampling transistor T1 which is turned on by a control signal appearing on the scan line WS connected to the gate electrode of the signal sampling transistor T1. Then, the second video-signal electric potential Vsig is supplied to the signal holding capacitor C1 in order to store the second video-signal electric potential Vsig in the signal holding capacitor C1 in the so-called second signal write process by way of the signal sampling transistor T1 which is turned on by another control signal appearing on the scan line WS.

Figure 21:
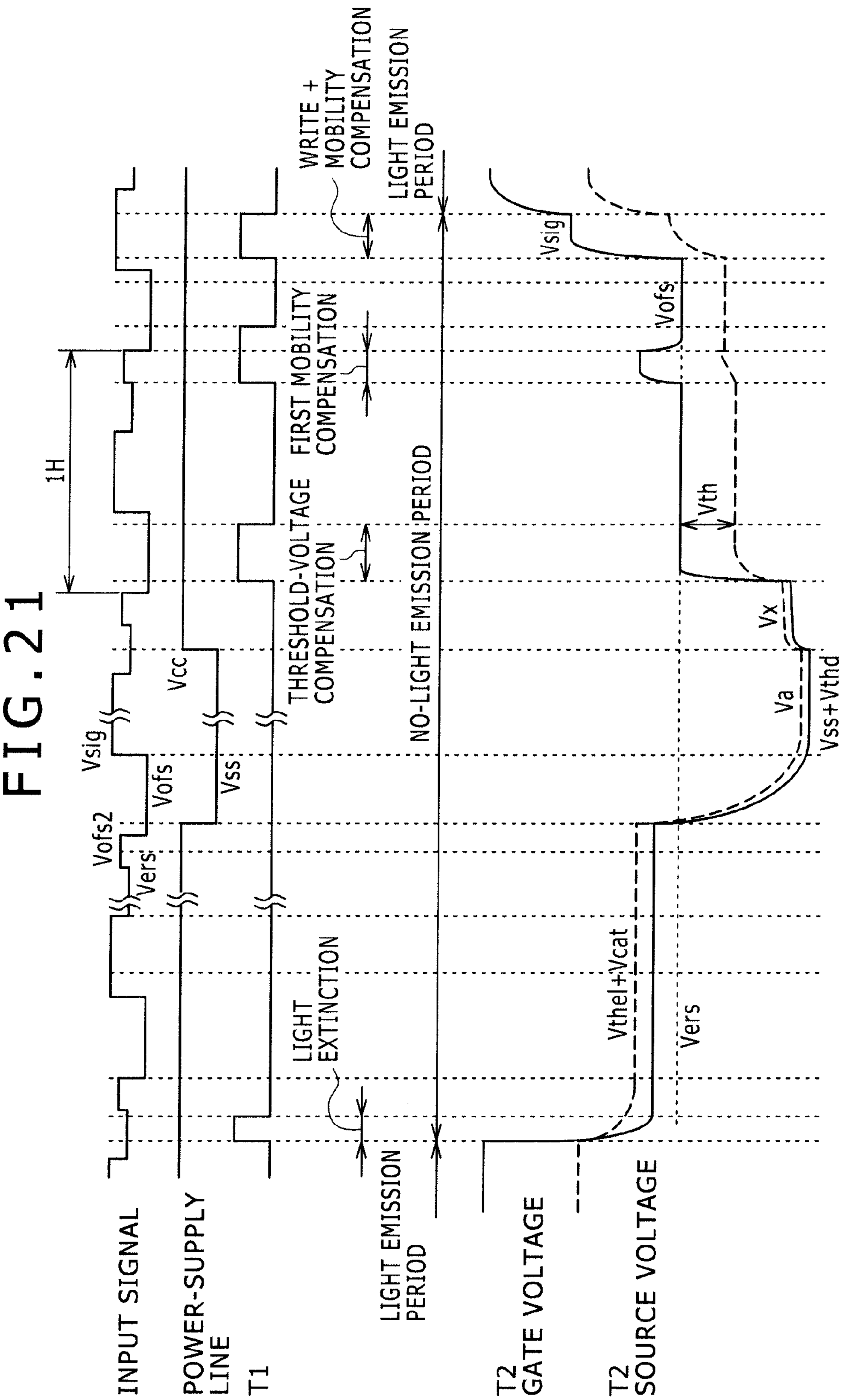
FIG. 21 is a timing diagram showing timing charts for one stage as timing charts of signals each relevant to the driving method for driving the pixel circuit employed in the display apparatus according to the eighth embodiment.

The mobility compensation process according to the eighth embodiment is explained in detail by referring to a timing diagram of FIG. 21. The timing diagram of FIG. 21 shows timing charts of pixel circuits 2 on one matrix row corresponding to one stage cited before. The timing diagram of FIG. 21 also shows timing charts of the gate electric potential Vg appearing on the gate electrode G of the device driving transistor T2 and the source electric potential Vs appearing on the source electrode S of the device driving transistor T2 on a common time axis along with the timing charts of the input signal asserted on the signal line SL, the power-supply voltage asserted on the power-supply line DS and the control signal asserted on the scan line WS in order to make the following description easy to understand. The input signal asserted on the signal line SL can be the new first video-signal electric potential Vofs2, the first reference electric potential Vers, the second reference electric potential Vofs or the second video-signal electric potential Vsig. As described above, the new first video-signal electric potential Vofs2 also varies in accordance with the gradation.

Essentially, in order to normally carry out the mobility compensation process on all gradations, it is necessary to supply the input signal having a timing chart created by an external component to the signal sampling transistor T1 in the signal write process. However, such a scheme is costly. In order to solve this problem, in the case of the eighth, the mobility compensation process is carried out at two stages in order to normally carry out the mobility compensation process on all gradations. Thus, the eighth does not adopt a configuration for supplying the input signal having a timing chart created by an external component to the signal sampling transistor T1 in the signal write process.

In accordance with the eighth embodiment, before a signal write process is carried out, the first video-signal electric potential Vofs2 reflecting a desired gradation is supplied in advance to the gate electrode G of the device driving transistor T2 in a mobility compensation process. In this case, it is necessary to determine the magnitude of the first video-signal electric potential Vofs2 and the timing to supply the first video-signal electric potential Vofs2 in advance so that the mobility compensation process is performed completely at the same time as the actual signal write process instead of completely carrying out only the mobility compensation process. In this way, the mobility compensation process is carried out at two stages in order to allow the mobility compensation process to be normally carried out on all gradations. In addition, the manufacturing cost can be further lowered.

Figure 22:
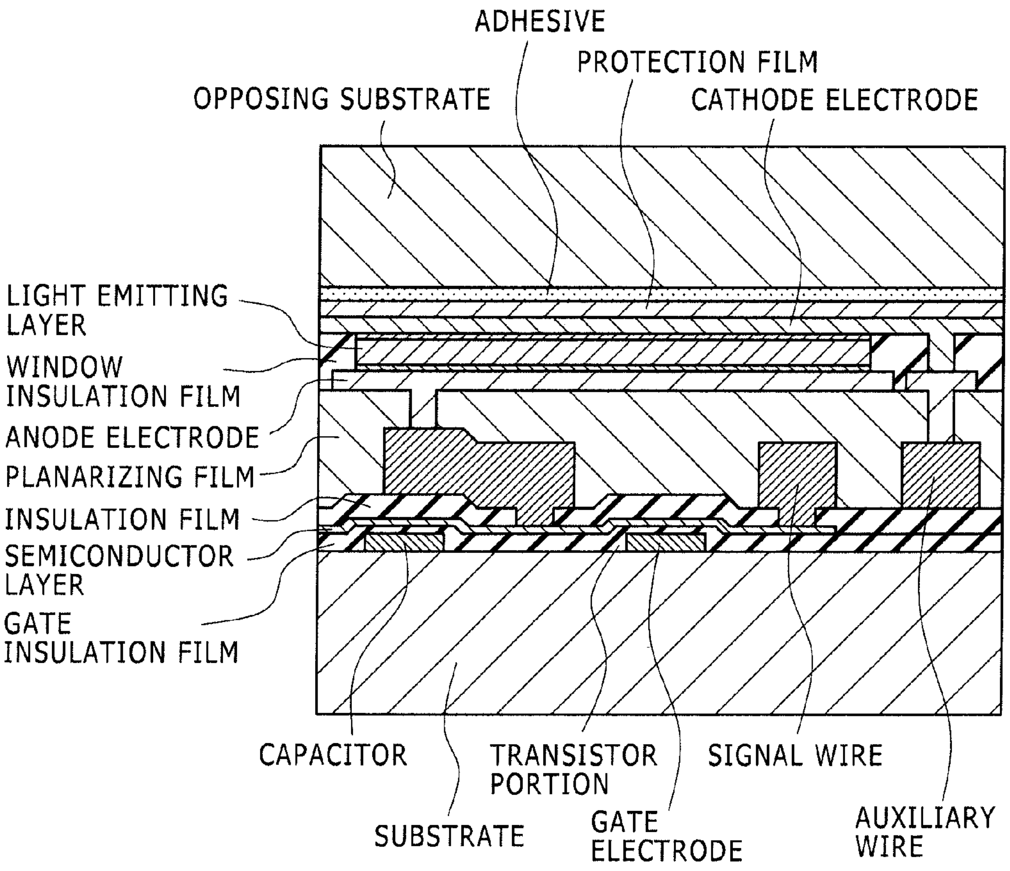
FIG. 22 is a cross-sectional diagram showing a typical configuration of the thin-film pixel circuit employed in the display apparatus provided by an embodiment of the present invention.

FIG. 22 is a cross-sectional diagram showing a typical configuration of the thin-film pixel circuit 2 employed in the display apparatus provided by the present invention. That is to say, FIG. 22 is a diagram showing a model cross section of a pixel circuit 2 created on an insulation substrate. As shown in the cross-sectional diagram, the pixel circuit 2 includes a transistor section having a plurality of transistors. In the cross-sectional diagram, however, the transistor section is shown as only one TFT (Thin Film Transistor). The pixel circuit 2 also has a capacitor section including the signal holding capacitor C1 and a light emitting section including the light emitting device EL. By carrying out a TFT process, the transistor section including a plurality transistors and the capacitor section including the signal holding capacitor C1 are created on the substrate. Then, the light emitting section including the light emitting device EL is created over the transistor section and the capacitor section to form a laminated stack. An adhesive layer is then formed on the light emitting device. Subsequently, a transparent opposing substrate is created on the adhesive layer to form a flat panel.

Figure 23:
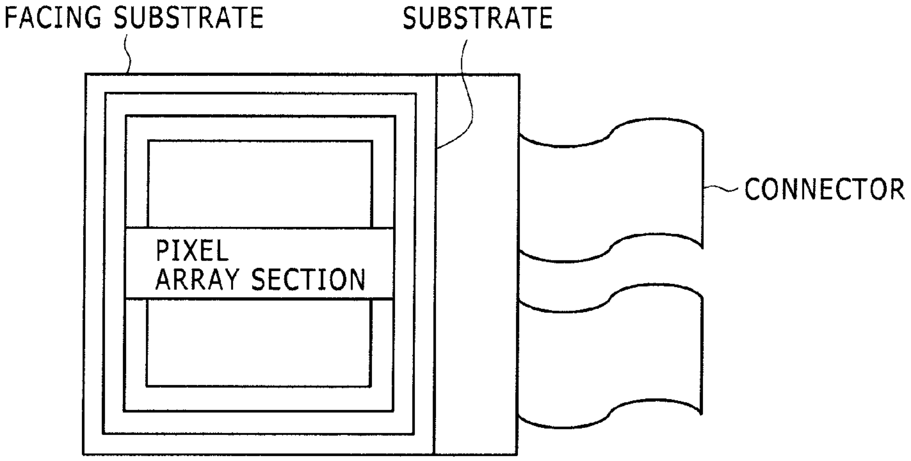
FIG. 23 is a diagram showing a top view of a modular configuration of the display apparatus provided by an embodiment of the present invention.

The display apparatus provided by the present invention can have the shape of a flat display module like one shown in a diagram of FIG. 23. In the flat display module, a pixel array section 1 is created on the insulation substrate by integrating pixel circuits 2 to form a pixel matrix. As described earlier, the pixel circuits 2 each have an organic EL light emitting device, the signal holding capacitor C1 as well as thin-film transistors and serve as the pixel array section 1. Then, the pixel array section 1 also referred to as a pixel matrix section is covered by an adhesive layer on which a opposing substrate made of typically glass is attached to form the flat display module. If necessary, the transparent opposing substrate can be provided with a color filter, a protection film and a light shielding film to mention a few. The flat display module can be provided with for example an FPC (Flexible Print Circuit) to serve as a connector through which signals are exchanged between the pixel array section 1 and a unit external to the display module.

The display apparatus provided by the present invention described above has the shape of a flat display panel which is employed in a variety of electronic instruments such a digital camera, a notebook personal computer, a cellular phone and a video camera. The display apparatus provided by the present invention as a flat display panel can be employed in the electronic instruments used in a variety of fields to serve as a display section for displaying information as an image or a video. The information has been input to the main unit of the electronic instrument or generated in the main unit as a result of operations carried out by the main unit. Typical electronic instruments each employing the display apparatus provided by the present invention as a flat display panel are explained as follows.

Figure 24:
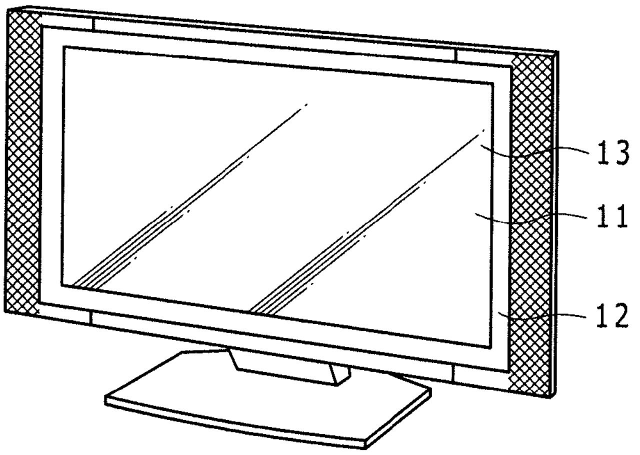
FIG. 24 is a diagram showing a squint view of the external appearance of a TV set serving as an electronic instrument employing a flat display panel provided by an embodiment of the present invention.

A typical example of the electronic instrument is a TV set. FIG. 24 is a diagram showing a squint view of the external appearance of the TV set to which the present invention is applied. The TV set employs a video display screen section 11 which typically includes a front panel 12 and a filter glass plate 13. The TV set is constructed by employing the display apparatus provided by the present invention in the video display screen section 11.

Figure 25:
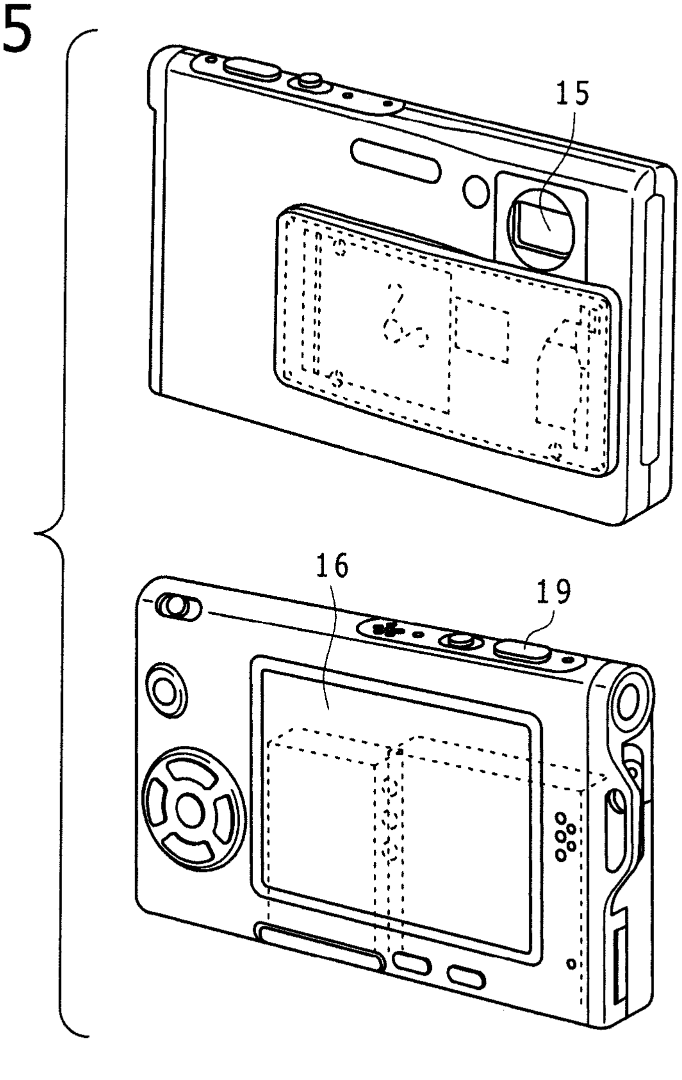
FIG. 25 is a diagram showing a squint view of the external appearance of a digital camera serving as an electronic instrument employing a flat display panel provided by an embodiment of the present invention.

FIG. 25 shows squint views of the digital camera to which the present invention is applied. The upper figure shows a front side of the digital camera whereas the lower figure shows a rear side of the digital camera. The digital camera includes an image pickup lens, a flash light emitting section 15, a display section 16, a control switch, a menu switch and a shutter button 19. The digital camera is constructed by employing the flat display panel provided by the present invention in the digital camera as the display section 16.

Figure 26:
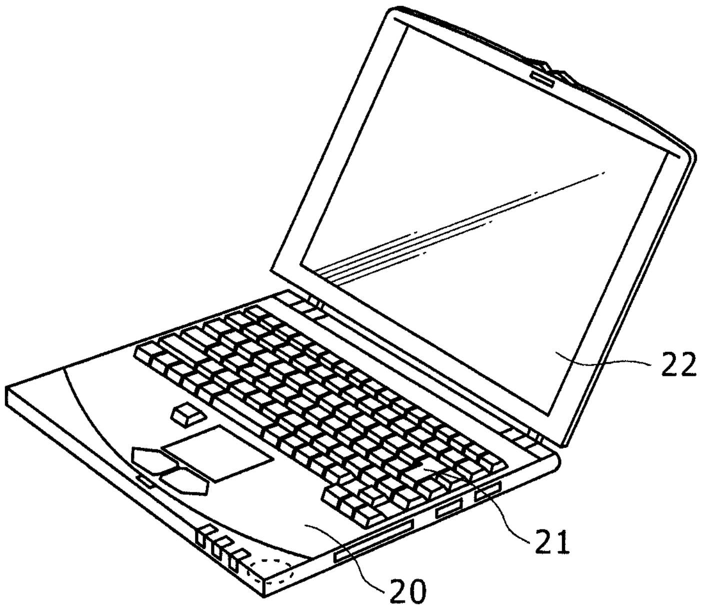
FIG. 26 is a diagram showing a squint view of the external appearance of a notebook personal computer serving as an electronic instrument employing a flat display panel provided by an embodiment of the present invention.

FIG. 26 is a diagram showing a squint view of the notebook personal computer to which the present invention is applied. The notebook personal computer employs a main unit 20 which has a keyboard 21 to be operated by the user for entering characters to the main unit 20 and a display section 22 included in a main-unit cover for displaying an image. The notebook personal computer is constructed by employing the display apparatus provided by the present invention in the personal computer as the display section 22.

Figure 27:
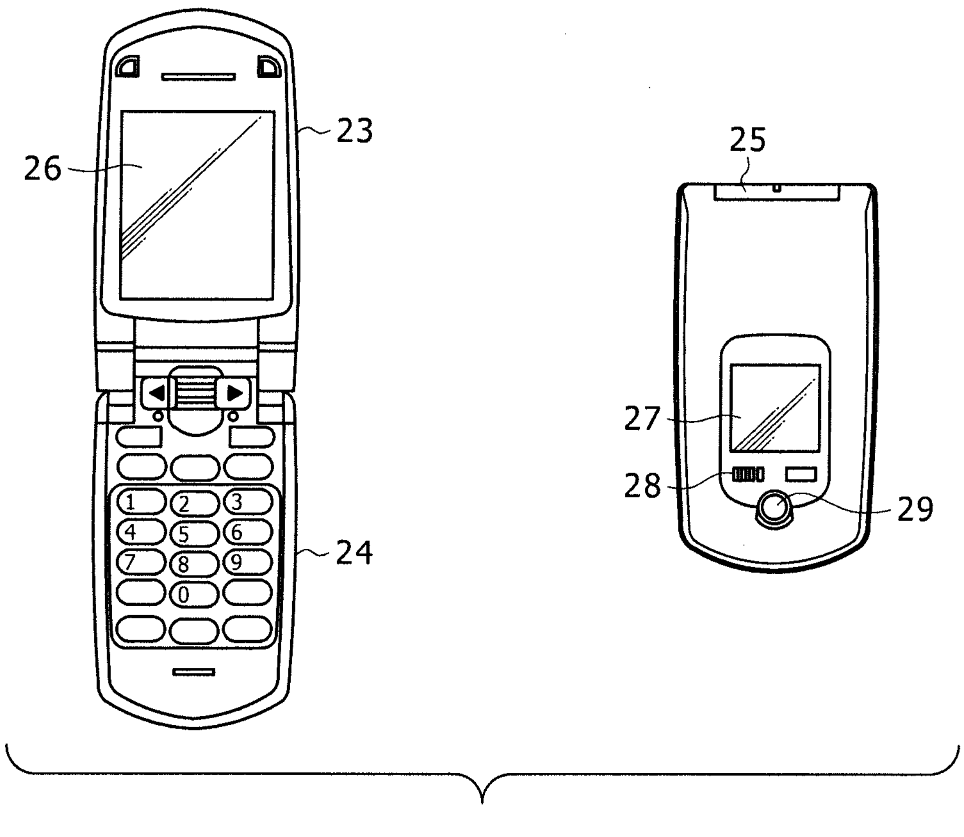
FIG. 27 is a diagram showing the external appearance of a portable terminal such as a cellular phone serving as an electronic instrument employing a flat display panel provided by an embodiment of the present invention.

FIG. 27 shows a portable terminal to which the present invention is applied. The left figure is a diagram showing the front view of the cellular phone in a state of being already opened. The right figure is a diagram showing the top view of the cellular phone in a state of being already closed. The cellular phone employs an upper case 23, a lower case 24, a link section 25 which is a hinge, a display section 26, a display sub-section 27, a picture light 28 and a camera 29. The cellular phone is constructed by employing the display apparatus provided by the present invention in the cellular phone as the display section 26 and/or the display sub-section 27.

Figure 28:
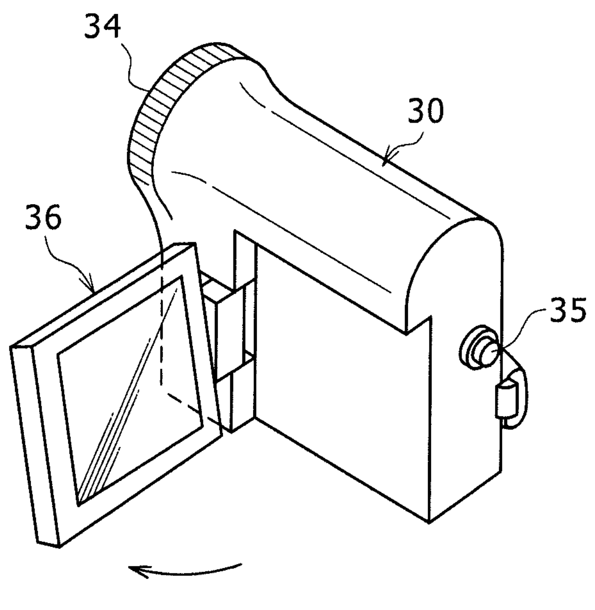
FIG. 28 is a diagram showing a squint view of the external appearance of a video camera serving as an electronic instrument employing a flat display panel provided by an embodiment of the present invention.
Figure 29:
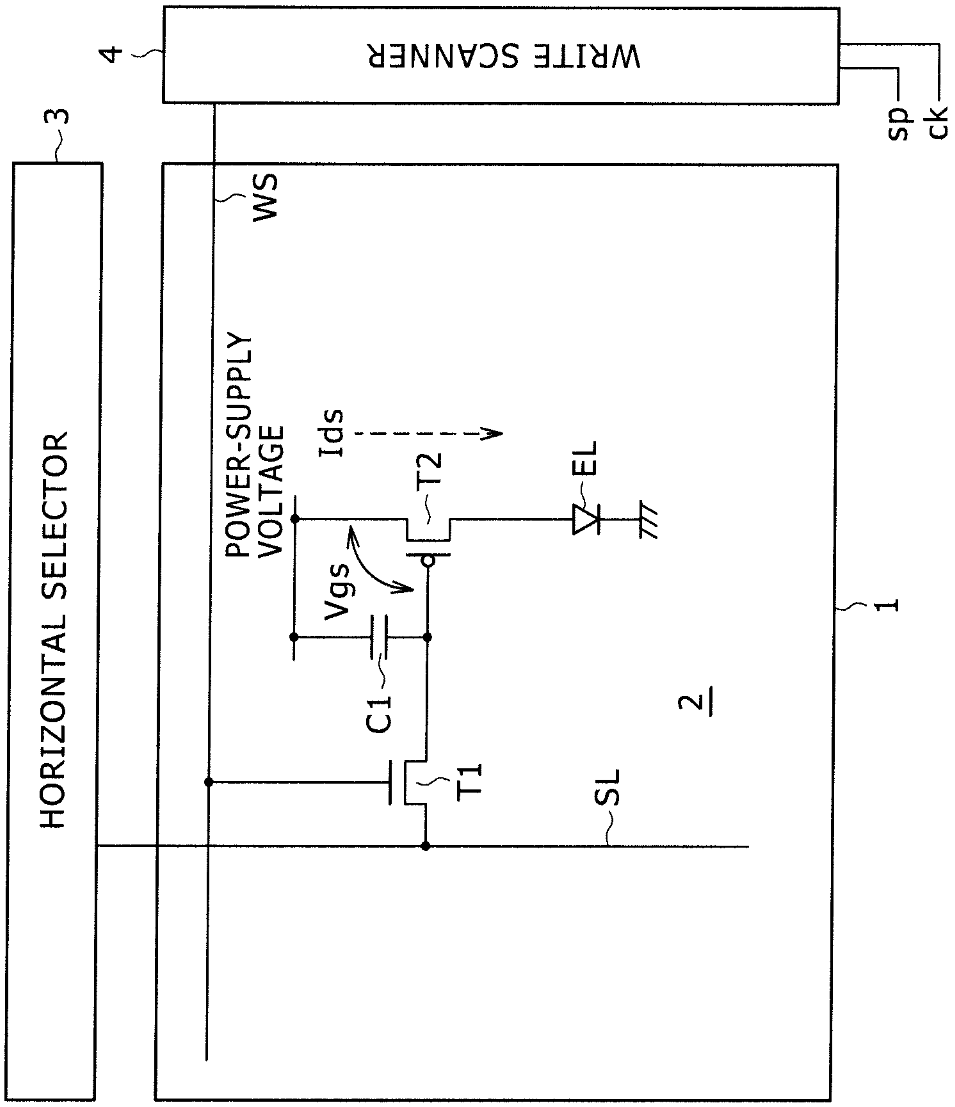
FIG. 29 is a model circuit diagram showing a typical example of the conventional display apparatus of the active-matrix type.
Figure 30:
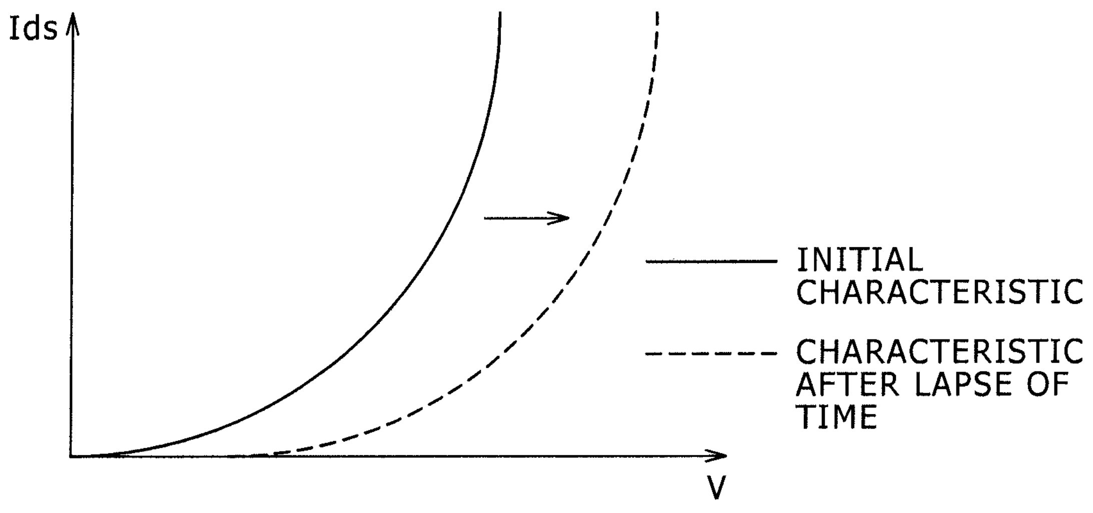
FIG. 30 is a diagram showing graphs each representing a relation between a voltage applied to a light emitting device EL and a current flowing through the light emitting device EL as graphs to be referred to in description of an aging problem.
Figure 31:
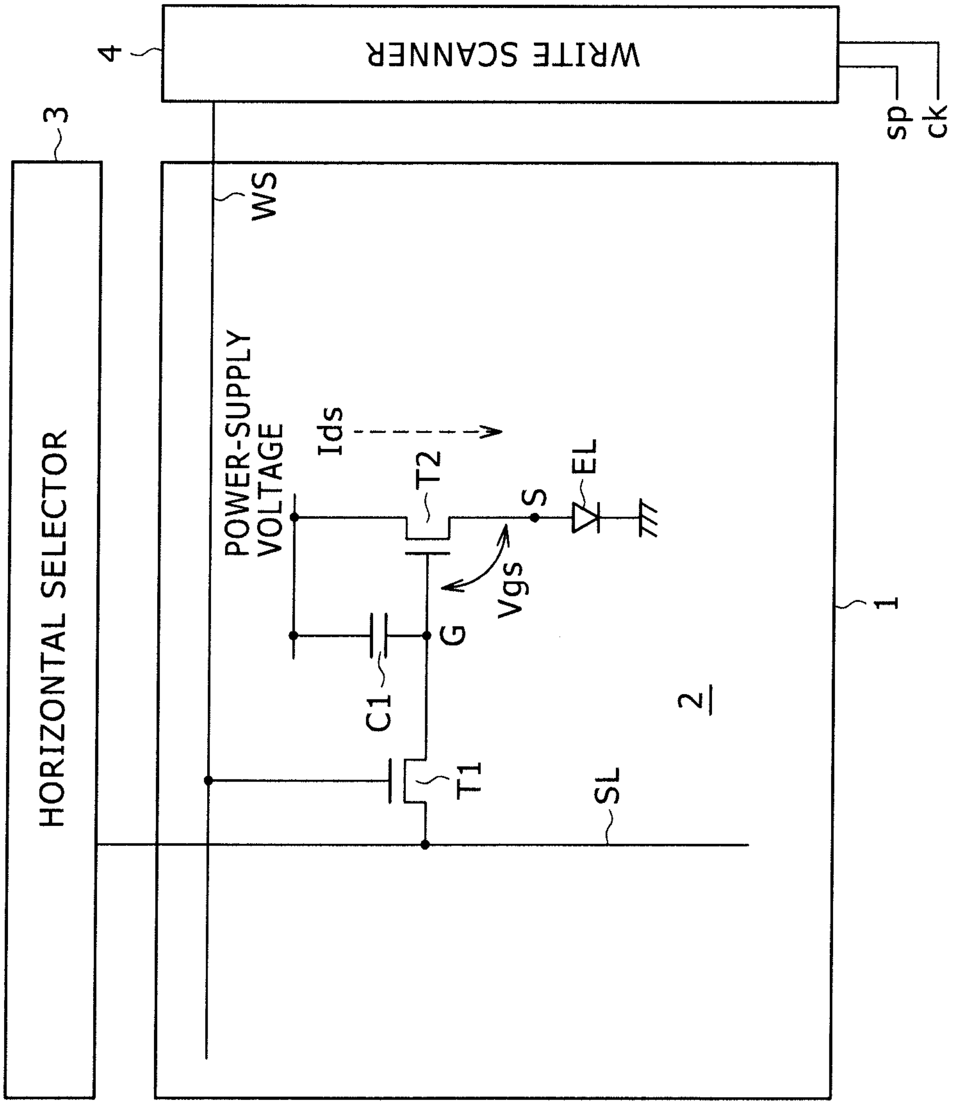
FIG. 31 is another model circuit diagram showing a typical example of the existing display apparatus of the active-matrix type.

FIG. 28 shows a video camera to which the present invention is applied. The video camera employs a main body 30, an image pickup lens 34 for taking an image, a start/stop switch 35 and a monitor 36. Provided on the front face of the video camera, the image-taking lens 34 oriented in the forward direction is a lens for taking an image of a photographing subject located in front of the main body 30. The video camera is constructed by employing the display apparatus provided by the present invention in the video camera as the monitor 36.

The present application contains subject matter related to that disclosed in Japanese Priority Patent Application JP 2008-144359 filed in the Japan Patent Office on Jun. 2, 2008, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. A display apparatus comprising:

a pixel array section; and driving sections, wherein said pixel array section has signal lines each corresponding to one of the columns of said matrix and scan lines each corresponding to one of the rows of said matrix, power-supply lines parallel to said scan lines, each of said pixel circuits is located at an intersection of one of said signal lines and one of said scan lines, said driving sections are a signal selector, a write scanner and a drive scanner, said signal selector is configured to assert a driving signal having an electric potential representing a gradation or a reference electric potential determined in advance on said signal lines each laid as a column of said matrix, said write scanner is configured to assert a control signal on said scan lines each laid as a row of said matrix, said drive scanner is configured to assert a power-supply voltage changing from a high electric potential to a low electric potential alternately on said power-supply lines each laid as a line parallel to said scan lines, each of said pixel circuits includes a signal sampling transistor, a device driving transistor, a signal holding capacitor, and a light emitting device, a specific one of current terminals of said signal sampling transistor is connected to one of said signal lines whereas the gate electrode of said signal sampling transistor is used as the control terminal of said signal sampling transistor and is connected to one of said scan lines, a specific one of current terminals of said device driving transistor serves as the drain electrode of said device driving transistor whereas the gate electrode of said device driving transistor is used as the control terminal of said device driving transistor, said drain electrode of said device driving transistor is connected to one of said power-supply lines whereas said gate terminal of said device driving transistor is connected to the other current terminal of said signal sampling transistor, the other one of said current terminals of said device driving transistor serves as said source electrode of said device driving transistor and is connected to said light emitting device, said signal holding capacitor is wired between said gate and source electrodes of said device driving transistor, when an operation to put said signal sampling transistor in a turned-on state by making use of said control signal is carried out after said high electric potential has been asserted on said power-supply line and said reference electric potential has been asserted on said signal line, a light extinction process is performed as a process to switch said light emitting device from a light emission state to a no-light emission state, thereafter, said signal sampling transistor is put in a turned-off state, then, said power-supply line is switched from said high electric potential to said low electric potential so that a voltage appearing on said source electrode of said device driving transistor is lowered without putting back said signal sampling transistor in a turned-on state in a threshold-voltage compensation preparatory process which is a process of lowering said voltage appearing on said source electrode of said device driving transistor, and subsequently, said power-supply line is switched back from said low electric potential back to said high electric potential and, then, with said signal line sustained at said reference electric potential, said signal sampling transistor is put in a turned-on state by making use of said control signal, causing said voltage appearing on said source electrode of said device driving transistor to rise gradually in a process of electrically charging said signal holding capacitor and, as a result, a voltage appearing between said gate and source electrodes of said device driving transistor is reduced gradually in a direction toward the threshold voltage of said device driving transistor in a threshold-voltage compensation process which is a process to reduce said voltage appearing between said gate and source electrodes of said device driving transistor in a direction toward said threshold voltage.

2. The display apparatus according to claim 1 wherein said drive scanner drives adjacent power-supply lines each laid as one of the rows of said matrix as a power-supply line group;

the number of said adjacent power-supply lines to be driven by said drive scanner as a power-supply line group is determined in advance;

said drive scanner switches a power-supply voltage common to adjacent power-supply lines pertaining to the same power-supply line group from said high electric potential to said low electric potential and vice versa alternately, and sequentially applies said common power-supply voltage to power-supply line groups by shifting the phase of said power-supply voltage from group to group; and said common power-supply voltage is supplied to a power-supply line group at the same phase determined for said power-supply line group and switched from said high electric potential to said low electric potential and vice versa alternately.

3. The display apparatus according to claim 1 wherein, after said light extinction process has been carried out to switch said light emitting device from a light emission state to a no-light emission state, with said power-supply line sustained at said high electric potential and said signal line sustained at said reference electric potential, said signal sampling transistor is put in a turned-on state at least once by making use of said control signal supplied to said gate electrode of said signal sampling transistor through said scan line in order to again execute at least another additional light extinction process.

4. The display apparatus according to claim 3 wherein:

said write scanner asserts a control signal on each of said scan lines sequentially for every horizontal period; and said signal sampling transistor carries out said light extinction process and said additional light extinction processes in accordance with said control signals received at intervals each having a length at least equal to one said horizontal period.

5. The display apparatus according to claim 3 wherein:

adjacent scan lines each laid as one of the rows of said matrix are treated as a scan line group;

the number of adjacent scan lines to be treated as a scan line group is determined in advance;

said write scanner provides each of said power-supply line groups sequentially with a control signal common to adjacent scan lines pertaining to the same scan line group by shifting the phase of said control signal from group to group; and a control signal is supplied to adjacent scan lines pertaining to the same scan line group at the same phase determined for said scan line group in order to carry out said additional light extinction processes with timings common to said adjacent scan lines pertaining to said scan line group.

6. The display apparatus according to claim 1 wherein, after said execution of said light extinction process to switch said light emitting device from a light emission state to a no-light emission state has been completed but before said threshold-voltage compensation preparatory process is carried out, said drive scanner switches said power-supply line from said high electric potential to a middle electric potential between said high and low electric potentials.

7. The display apparatus according to claim 6 wherein:

said drive scanner sequentially switches each of said power-supply line groups from said high electric potential to said middle electric potential by shifting the phase of a switching signal from group to group; and said drive scanner sequentially switches each of adjacent power-supply lines pertaining to the same power-supply line group from said high electric potential to said middle electric potential at the same phase determined for said power-supply line group as the phase of said switching signal.

8. The display apparatus according to claim 7 wherein, with said power-supply line sustained at said middle electric potential and said signal line sustained at said reference electric potential, said signal sampling transistor is put in a turned-on state by making use of said control signal supplied to said gate electrode of said signal sampling transistor through said scan line.

9. The display apparatus according to claim 8 wherein:

adjacent power-supply lines each laid as one of the rows of said matrix are treated as a power-supply line group;

the number of adjacent power-supply lines to be treated as a power-supply line group is determined in advance;

said drive scanner provides each of said power-supply line groups sequentially with a power-supply voltage common to adjacent power-supply lines pertaining to the same power-supply line group by shifting the phase of said power-supply voltage from group to group in order to drive said power-supply lines pertaining to said power-supply line group;

a power-supply voltage is supplied to adjacent power-supply lines pertaining to the same power-supply line group at the same phase determined for said group so as to drive said power-supply lines pertaining to said power-supply line group.

10. The display apparatus according to claim 1 wherein said signal selector asserts a first reference electric potential on said signal line in said light extinction process and asserts a second reference electric potential different from said first reference electric potential on said signal line in said threshold-voltage compensation process.

11. The display apparatus according to claim 10 wherein the magnitude of said first reference electric potential asserted on said signal line by said signal selector is larger than the magnitude of said second reference electric potential but smaller than the sum of an electric potential appearing on a cathode electrode of said light emitting device, the threshold voltage of said light emitting device and the threshold voltage of said device driving transistor.

12. The display apparatus according to claim 1 wherein, after said threshold-voltage compensation process has been carried out, with said signal line sustained at a video-signal electric potential and said power-supply line sustained at said high electric potential, said signal sampling transistor is put in a turned-on state by making use of said control signal supplied to said gate electrode of said signal sampling transistor through said scan line in order to perform a signal write process of storing said video-signal electric potential into said signal holding capacitor.

13. The display apparatus according to claim 12 wherein:

said signal selector asserts a first video-signal electric potential representing a gradation on said signal line, and said signal sampling transistor is put in a turned-on state by making use of said control signal supplied to said gate electrode of said signal sampling transistor through said scan line in order to perform a first signal write process of storing said first video-signal electric potential into said signal holding capacitor; and, then, said signal selector asserts a second video-signal electric potential representing a gradation on said signal line, and said signal sampling transistor is put in a turned-on state by making use of another control signal supplied to said gate electrode of said signal sampling transistor through said scan line in order to perform a second signal write process of storing said second video-signal electric potential into said signal holding capacitor.

14. An electronic instrument comprising:

a display apparatus for displaying information; wherein said display apparatus includes a pixel array section, and driving sections, said pixel array section has signal lines each corresponding to one of the columns of said matrix and scan lines each corresponding to one of the rows of said matrix, power-supply lines parallel to said scan lines, each of said pixel circuits is located at an intersection of one of said signal lines and one of said scan lines, said driving sections include a signal selector, a write scanner and a drive scanner, said signal selector is a section configured to assert a driving signal having an electric potential representing a gradation or a reference electric potential determined in advance on said signal lines each laid as a column of said matrix, said write scanner is configured to assert a control signal on said scan lines each laid as a row of said matrix, said drive scanner is configured to assert a power-supply voltage changing from a high electric potential to a low electric potential alternately on said power-supply lines, each of said pixel circuits includes a signal sampling transistor, a device driving transistor, a signal holding capacitor and a light emitting device, a specific one of current terminals of said signal sampling transistor is connected to one of said signal lines whereas the gate electrode of said signal sampling transistor is used as the control terminal of said signal sampling transistor and is connected to one of said scan lines, a specific one of current terminals of said device driving transistor serves as the drain electrode of said device driving transistor whereas the gate electrode of said device driving transistor is used as the control terminal of said device driving transistor, said drain electrode of said device driving transistor is connected to one of said power-supply lines whereas said gate terminal of said device driving transistor is connected to the other current terminal of said signal sampling transistor, the other one of said current terminals of said device driving transistor serves as said source electrode of said device driving transistor and is connected to said light emitting device, said signal holding capacitor is wired between said gate and source electrodes of said device driving transistor, first of all, when an operation to put said signal sampling transistor in a turned-on state by making use of said control signal is carried out after said high electric potential has been asserted on said power-supply line and said reference electric Potential has been asserted on said signal line, a light extinction process is performed as a process to switch said light emitting device from a light emission state to a no-light emission state, thereafter, said signal sampling transistor is put in a turned-off state, then, said power-supply line is switched from said high electric potential to said low electric potential so that a voltage appearing on said source electrode of said device driving transistor is lowered without putting back said signal sampling transistor in a turned-on state in a threshold-voltage compensation preparatory process which is a process of lowering said voltage appearing on said source electrode of said device driving transistor, and subsequently, said power-supply line is switched back from said low electric potential back to said high electric potential and, then, with said signal line sustained at said reference electric potential, said signal sampling transistor is put in a turned-on state by making use of said control signal, causing said voltage appearing on said source electrode of said device driving transistor to rise gradually in a process of electrically charging said signal holding capacitor and, as a result, a voltage appearing between said gate and source electrodes of said device driving transistor is reduced gradually in a direction toward the threshold voltage of said device driving transistor in a threshold-voltage compensation process which is a process to reduce said voltage appearing between said gate and source electrodes of said device driving transistor in a direction toward said threshold voltage.

15. A driving method for driving a display apparatus including a pixel array section, and driving sections, wherein said pixel array section has signal lines each laid as one of the columns of said matrix and scan lines each laid as one of the rows of said matrix, power-supply lines parallel to said scan lines, each of said pixel circuits is located at an intersection of one of said signal lines and one of said scan lines, said driving sections include a signal selector, a write scanner and a drive scanner, said signal selector is a section configured to assert a driving signal having an electric potential representing a gradation or a reference electric potential determined in advance on said signal lines each laid as a column of said matrix, said write scanner is configured to assert a control signal on said scan lines each laid as a row of said matrix, said drive scanner is configured to assert a power-supply voltage changing from a high electric potential to a low electric potential alternately on said power-supply lines, each of said pixel circuits includes a signal sampling transistor, a device driving transistor, a signal holding capacitor and a light emitting device, a specific one of current terminals of said signal sampling transistor is connected to one of said signal lines whereas the gate electrode of said signal sampling transistor is used as the control terminal of said signal sampling transistor and is connected to one of said scan lines, a specific one of current terminals of said device driving transistor serves as the drain electrode of said device driving transistor whereas the gate electrode of said device driving transistor is used as the control terminal of said device driving transistor, said drain electrode of said device driving transistor is connected to one of said power-supply lines whereas said gate terminal of said device driving transistor is connected to the other current terminal of said signal sampling transistor, the other one of said current terminals of said device driving transistor serves as said source electrode of said device driving transistor and is connected to said light emitting device, and said signal holding capacitor is wired between said gate and source electrodes of said device driving transistor, said driving method comprising:

first of all, when an operation to put said signal sampling transistor in a turned-on state by making use of said control signal is carried out after said high electric potential has been asserted on said power-supply line and said reference electric potential has been asserted on said signal line, performing a light extinction process as a process to switch said light emitting device from a light emission state to a no-light emission state;

putting said signal sampling transistor in a turned-off state;

switching said power-supply line from said high electric potential to said low electric potential so that a voltage appearing on said source electrode of said device driving transistor is lowered without putting back said signal sampling transistor in a turned-on state in a threshold-voltage compensation preparatory process which is a process of lowering said voltage appearing on said source electrode of said device driving transistor; and switching said power-supply line back from said low electric potential back to said high electric potential and, then, with said signal line sustained at said reference electric potential, said signal sampling transistor being put in a turned-on state by making use of said control signal, causing said voltage appearing on said source electrode of said device driving transistor to rise gradually in a process of electrically charging said signal holding capacitor and, as a result, a voltage appearing between said gate and source electrodes of said device driving transistor being reduced gradually in a direction toward the threshold voltage of said device driving transistor in a threshold-voltage compensation process which is a process to reduce said voltage appearing between said gate and source electrodes of said device driving transistor in a direction toward said threshold voltage.

* * * * *